US012560915B2

(12) United States Patent
Maturana et al.

(10) Patent No.: US 12,560,915 B2
(45) Date of Patent: Feb. 24, 2026

(54) RULE ENCODING FOR GENERIC DATA PARSING OF DATA TECHNOLOGY TRANSFER DOCUMENTS

(71) Applicant: Rockwell Automation Technologies, Inc., Mayfield Heights, OH (US)

(72) Inventors: Francisco P. Maturana, Lyndhurst, OH (US); Meiling He, Shorewood, WI (US); Raja Sekhar Katuri, Oak creek, WI (US); Dennis J. Luo, Germantown, WI (US); Brian Taylor, Oshkosh, WI (US); Sachin Misra, Lakeway, TX (US); Jay W. Schiele, Union Grove, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 526 days.

(21) Appl. No.: 18/049,367

(22) Filed: Oct. 25, 2022

(65) Prior Publication Data

US 2024/0134358 A1     Apr. 25, 2024
US 2024/0231337 A9     Jul. 11, 2024

(51) Int. Cl.
*G05B 19/418*          (2006.01)
*G06F 8/41*            (2018.01)

(52) U.S. Cl.
CPC .  *G05B 19/41865* (2013.01); *G05B 19/41845* (2013.01); *G06F 8/427* (2013.01)

(58) Field of Classification Search
USPC ........................................................ 700/100
See application file for complete search history.

(56) References Cited

U.S. PATENT DOCUMENTS 7,047,253 B1 *   5/2006   Murthy .................. G06F 16/86
7,480,640 B1 *   1/2009   Elad ....................... G06Q 10/10
                                                              706/14

(Continued)

FOREIGN PATENT DOCUMENTS

EP          3 696 622 A1      8/2020
EP          3 798 768 A2      3/2021

(Continued)

OTHER PUBLICATIONS

Sachin Misra "Unraveling the Complexity of Tech Transfer", Rockwell Automation, Jun. 8, 2022, p. 1-11. (Year: 2022).*

(Continued)

*Primary Examiner* — Hien D Khuu
(74) *Attorney, Agent, or Firm* — Amin, Turocy & Watson, LLP

(57)          ABSTRACT

A digital technology transfer system transforms technology transfer documents to a set of digitized manufacturing procedures and operations documentation. The system can transform a technology transfer document to a hierarchical structured model representing a package, or product to be manufactured, and the process for manufacturing the product. The resulting package model can be integrated into a larger model representing an ecosystem of manufacturing entities and plant facilities by assigning steps of the manufacturing process to one or more selected production lines. To reduce dependency on custom-built parsers for each type of document format, the system integrating both custom and general parsing mechanisms into a scalable parser orchestration engine.

20 Claims, 43 Drawing Sheets

(56) References Cited

U.S. PATENT DOCUMENTS

| | | | |
|---|---|---|---|
| 7,831,317 B2 | 11/2010 | McGreevy et al. | |
| 8,239,362 B1 | 8/2012 | Frazier | |
| 8,442,940 B1* | 5/2013 | Faletti | G06F 40/30 |
| | | | 707/610 |
| 8,601,438 B2 | 12/2013 | Vasista | |
| 10,671,631 B2* | 6/2020 | Wolfman | G06F 16/35 |
| 10,877,464 B2 | 12/2020 | Chao et al. | |
| 10,885,087 B2 | 1/2021 | Rodrigues De Oliveira et al. | |
| 10,970,270 B2* | 4/2021 | Raman | G06F 16/211 |
| 11,403,541 B2 | 8/2022 | Thomsen et al. | |
| 11,615,231 B1 | 3/2023 | Peck et al. | |
| 11,687,493 B1 | 6/2023 | Maturana et al. | |
| 2003/0004585 A1 | 1/2003 | Horn et al. | |
| 2004/0024662 A1 | 2/2004 | Gray et al. | |
| 2004/0205562 A1 | 10/2004 | Rozek et al. | |
| 2005/0010894 A1 | 1/2005 | Potter et al. | |
| 2005/0096769 A1 | 5/2005 | Bayoumi et al. | |
| 2005/0138160 A1* | 6/2005 | Klein | H04L 41/22 |
| | | | 715/248 |
| 2006/0041840 A1 | 2/2006 | Blair et al. | |
| 2006/0072144 A1 | 4/2006 | Dowling et al. | |
| 2007/0050419 A1 | 3/2007 | Weyl et al. | |
| 2009/0254572 A1 | 10/2009 | Redlich et al. | |
| 2010/0125828 A1 | 5/2010 | Vasista | |
| 2010/0250497 A1 | 9/2010 | Redlich et al. | |
| 2010/0305720 A1 | 12/2010 | Doll et al. | |
| 2011/0271179 A1 | 11/2011 | Jasko et al. | |
| 2011/0313547 A1 | 12/2011 | Hernandez et al. | |
| 2012/0306930 A1 | 12/2012 | Decker et al. | |
| 2013/0144679 A1 | 6/2013 | Burnett et al. | |
| 2014/0201244 A1* | 7/2014 | Zhou | G06F 16/00 |
| | | | 707/803 |
| 2014/0344673 A1* | 11/2014 | Kutty | G09B 5/06 |
| | | | 715/236 |
| 2017/0235848 A1 | 8/2017 | Van Dusen et al. | |
| 2017/0249129 A1 | 8/2017 | McDaniel | |
| 2018/0356792 A1 | 12/2018 | Chao et al. | |
| 2018/0357334 A1 | 12/2018 | Chao et al. | |
| 2018/0373994 A1 | 12/2018 | Doucette et al. | |
| 2019/0114370 A1* | 4/2019 | Cerino | G06F 40/14 |
| 2019/0155884 A1 | 5/2019 | Liu et al. | |
| 2019/0332710 A1 | 10/2019 | Wei et al. | |
| 2020/0012265 A1 | 1/2020 | Thomsen et al. | |
| 2020/0013156 A1 | 1/2020 | Weiss et al. | |
| 2020/0097430 A1 | 3/2020 | Maturana | |
| 2020/0151276 A1* | 5/2020 | Rodrigues De Oliveira | |
| | | | G06F 16/381 |
| 2020/0201301 A1 | 6/2020 | Chao et al. | |
| 2020/0356740 A1 | 11/2020 | Principato | |
| 2020/0371647 A1 | 11/2020 | Gerges et al. | |
| 2021/0089276 A1 | 3/2021 | Dunn et al. | |
| 2021/0096543 A1 | 4/2021 | Stump et al. | |
| 2021/0133669 A1 | 5/2021 | Cella et al. | |
| 2021/0224430 A1 | 7/2021 | Huovila et al. | |
| 2021/0319173 A1 | 10/2021 | Gerber, Jr. et al. | |
| 2021/0405665 A1 | 12/2021 | Martinez et al. | |
| 2022/0027529 A1 | 1/2022 | Zarur et al. | |
| 2022/0092097 A1 | 3/2022 | Gupta | |
| 2022/0188517 A1 | 6/2022 | Wu | |
| 2022/0197231 A1 | 6/2022 | Kim | |
| 2022/0197272 A1 | 6/2022 | Sinha et al. | |
| 2022/0309078 A1 | 9/2022 | Fujii | |
| 2022/0318254 A1 | 10/2022 | Horesh | |
| 2022/0366494 A1 | 11/2022 | Cella et al. | |
| 2022/0374405 A1 | 11/2022 | Morrill et al. | |
| 2023/0153335 A1 | 5/2023 | McNeill | |
| 2023/0229148 A1 | 7/2023 | Law et al. | |
| 2023/0230115 A1 | 7/2023 | Nistala et al. | |
| 2024/0134362 A1 | 4/2024 | Maturana et al. | |
| 2025/0005263 A1 | 1/2025 | Mansour et al. | |
| 2025/0053799 A1 | 2/2025 | Rastogi et al. | |

| | | | |
|---|---|---|---|
| 2025/0077590 A1 | 3/2025 | Tobin et al. | |
| 2025/0110975 A1 | 4/2025 | Shea et al. | |
| 2025/0111335 A1 | 4/2025 | Wilson et al. | |
| 2025/0173523 A1 | 5/2025 | Bender et al. | |
| 2025/0245418 A1 | 7/2025 | Pieris | |

FOREIGN PATENT DOCUMENTS

| | | | |
|---|---|---|---|
| EP | 3 926 423 A1 | 12/2021 | |
| EP | 3 944 034 A1 | 1/2022 | |
| WO | WO 2005111824 A2 * | 11/2005 | |
| WO | 2007/041037 A2 | 4/2007 | |
| WO | 2016/053337 A1 | 4/2016 | |

OTHER PUBLICATIONS

Non-Final Office Action received for U.S. Appl. No. 17/682,638, dated Mar. 13, 2023, 34 pages.
Notice of Allowance received for U.S. Appl. No. 17/682,737 dated Mar. 2, 2023, 20 pages.
Extended European Search Report received for European Patent Application Serial No. 23204044.4, dated Mar. 19, 2024, 9 pages.
Misra, Sachin, "Unraveling the Complexity of Tech Transfer Digital Tools will Play a Key Role in Solving a Time-intensive Challenge", Life Sciences, Jun. 8, 2022, 12 pages.
Anonymous, "ISA-88", Wikipedia, online available at <https://de.wikipedia.org/w/index.php?title=ISA-88&oldid=219274433>, retrieved on Jan. 17, 2022, XP093137899, 10 pages.
Extended European Search Report received for European Patent Application Serial No. 23158010.1 dated Jul. 10, 2023, 8 pages.
Extended European Search Report received for European Patent Application Serial No. 23158268.5 dated Jul. 10, 2023, 8 pages.
Notice of Allowance received for U.S. Appl. No. 17/682,638 dated Oct. 26, 2023, 6 pages.
Extended European Search Report received for European Patent Application Serial No. 23204043.6, dated Dec. 22, 2023, 9 pages.
Extended European Search Report received for European Patent Application Serial No. 23158524.1 dated May 10, 2023, 15 pages.
Extended European Search Report received for European Patent Application Serial No. 23158530.8 dated May 11, 2023, 13 pages.
Notice of Allowance received for U.S. Appl. No. 17/682,638 dated Jul. 6, 2023, 58 pages.
Non-Final Office Action received for U.S. Appl. No. 17/682,605, dated Aug. 15, 2024, 159 pages.
Non-Final Office Action received for U.S. Appl. No. 17/682,703, dated Jun. 27, 2024, 48 pages.
Notice of Allowance received for U.S. Appl. No. 17/682,703, dated Sep. 17, 2024, 19 pages.
Notice of Allowance received for U.S. Appl. No. 17/682,605, dated Jan. 30, 2025, 82 pages.
Non-Final Office Action received for U.S. Appl. No. 18/049,345, dated Feb. 10, 2025, 52 pages.
Communication pursuant to Article 94(3) EPC for European Patent Application Serial No. 23204044.4, dated Feb. 3, 2025.
European Search Report for European Patent Application Serial No. 23204044.4, dated Mar. 19, 2025.
Notice of Allowance received for U.S. Appl. No. 18/049,345 dated May 13, 2025, 13 pages.
Summons to attend oral proceedings pursuant to Rule 115(1) EPC for European Patent Application Serial No. 23204044.4 dated Jun. 23, 2025, 10 pages.
Notice of Allowance received for U.S. Appl. No. 18/431,189 dated Sep. 11, 2025, 12 pages.
Notice of Allowance received for U.S. Appl. No. 18/431,189 dated Sep. 23, 2025, 8 pages.
Preliminary Opinion for European Application No. 23 204 044.4 dated Oct. 7, 2025.

* cited by examiner

Settings / Manufacturer

Dashboard　　Navigate　　Settings ▼

Search

Download ⬇

| Manufacturer Name | Manufacturer Type | Company | Location | Created By | Created On |
|---|---|---|---|---|---|
| Manufacturer 17 | CRO | Pharma 1 | Mumbai | Celldex1 | 10/06/2021 |
| Manufacturer 1 | CRO | Pharma 1 | Mumbai | Celldex1 | 10/05/2021 |
| Manufacturer 18 | CRO | Pharma 1 | Mumbai | BioTech User | 10/05/2021 |
| Manufacturer 20 | CRO | Therepeutics | New Jersey | Celldex1 | 10/08/2021 |
| Manufacturer 19 | CRO | Pharma 1 | Mumbai | BioTech User | 10/05/2021 |
| Manufacturer 10 | CRO | QA Test | 33.98259116200, -118.2730775313 | Pharma Innovator - C | 11/19/2021 |
| Manufacturer 5 | CRO | Pharma 3 | 49.9929 N, 8.2473 E | Picreator | 11/24/2021 |
| Manufacturer 18 | CRO | QA Test | 47.60229559308, -122.2047451760 | Pharma Innovator - C | 11/02/2021 |
| Manufacturer 22 | CRO | QA Test | Mumbai | BioTech User | 11/02/2021 |

Settings / User Roles

902

Search	Download ✱

| User Role | Description | Created On | Created By | |
|---|---|---|---|---|
| Pharma Innovator - Viewer | 3 Pharma Innovator - Viewer | 11/17/2021 | SaaS administrator | ✎ ▦ |
| CDMO - Viewer | 5 CDMO Viewer | 11/17/2021 | SaaS administrator | ✎ ▦ |
| CDMO - Viewer | 4 CDMO Viewer | 11/17/2021 | SaaS administrator | ✎ ▦ |
| Pharma Innovator - Creator | 3 Pharma Innovator - Creator | 11/17/2021 | SaaS administrator | ✎ ▦ |
| Administrator | 1 Administrator | 11/17/2021 | SaaS administrator | ✎ ▦ |
| Reviewer | Dttp Reviewer | 11/17/2021 | SaaS administrator | ✎ ▦ |

CDMO Name

Page 4 of 57

1.0   SUMMARY

1.1   Overview

1.2   Molecule and Client Information

FIG. 12a

| Medium Description | Organized Chemicals | Conc. | Storage Conditions | | Observation |
| --- | --- | --- | --- | --- | --- |
| | | | Range | Acceptable | |
| Cm67 + 25mM M5X | RR64-XX454 | 1 L/L | ≤ 44°C Temperature | A total of 48 hours upon medium fill is allowed. | Add 4ml of X solution to the mixture |
| | 34mM KLS 5544 | 2ml/L | | Maximum of 24 hours. | |

1702

1704

1706

1708

1710

1712

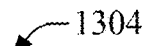
1304

```
TABLE SEMANTIC RULES FILE

1. GLOBAL RULES a. Duplicate cell content (column/row) when merged b. Column 1 as level 2 object (parent) and use remaining columns on
    the same row as children c. If the column 1 has multiple merged rows, then the parents
    will have multiple children form the remaining columns

2. CUSTOMER 1 – DOWNSTREAM RULES a. Inherit all global rules

3. CUSTOMER 2 – UPSTREAM RULES a. Inherit all global rules b. If header of column 1 equals header of column 2, change
    header of column 1 to "Step"

c. If header of column 1 = "" and if header of column 2 =
    "Parameter", change header of column 1 to "Step"

4. CUSTOMER 2 – DOWNSTREAM RULES a. Inherit all global rules b. If header of column 1 equals header of column 2, change
    header of column 1 to "Step"

c. If header of column 1 = "" and if header of column 2 =
    "Parameter", change header of column 1 to "Step"

d. If header of column 1 = "" and if header of column 2 =
    "Process Attribute", change header of column 1 to "Step"
```

| LOOK-UP TABLE | | |
| --- | --- | --- |
| AND = And | En = End | Re = Remaining |
| Ch = Change | Eq = Equal | Rn = Rename |
| Chd = Children | Gch = Grandchildren | Ro = Row |
| CNm = Chapter Name | Hd = Header | Ro1 = Row Number 1 |
| Co = Column | If = If | Sk = Skip |
| Co1 = Column number 1 | Mg = Merge | SuTb = Sub-Table |
| Cp = Copy | Mu = Multiple | Tb = Table |
| Cv = Cover | Mv = Move | Th = Then |
| Del = Delete | Nm = Name | Tx = Text |
| Dr = Drop | Or = Or | Du = Duplicate |
| Pr = Parent | | |

2.0 Procedure 1
2.1 Table Procedure 1

~1702a

| Medium Description | Organized Chemicals | Conc. | Storage Conditions | | Observation |
|---|---|---|---|---|---|
| | | | Range | Acceptable | |
| Cm67 + 25mM M5X | RR64-XX454 | 1 L/L | ≤ 44°C Temperature | A total of 48 hours upon medium fill is allowed. Maximum of 24 hours. | Add 4ml of X solution to the mixture |
| | 34mM KLS 5544 | 2ml/L | | | |

1304

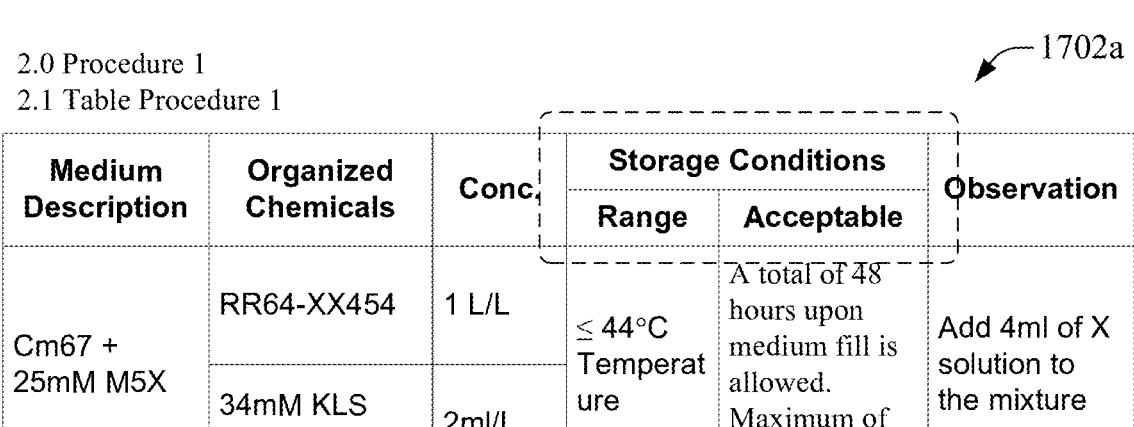

2.0 Procedure 1
2.1 Table Procedure 1

~1702b

| Medium Description | Organized Chemicals | Conc. | Storage Conditions Range | Storage Conditions Acceptable | Observation |
|---|---|---|---|---|---|
| Cm67 + 25mM M5X | RR64-XX454 | 1 L/L | ≤ 44°C Temperature | A total of 48 hours upon medium fill is allowed. Maximum of 24 hours. | Add 4ml of X solution to the mixture |
| | 34mM KLS 5544 | 2ml/L | | | |

FIG. 20

2.0 Procedure 1
2.1 Table Procedure 1

1702b

| Medium Description | Organized Chemicals | Conc. | Storage Conditions - Range | Storage Conditions - Acceptable | Observation |
|---|---|---|---|---|---|
| Cm67 + 25mM M5X | RR64-XX454 | 1 L/L | ≤ 44°C Temperature | A total of 48 hours upon medium fill is allowed. Maximum of 24 hours. | Add 4ml of X solution to the mixture |
| | 34mM KLS 5544 | 2ml/L | | | |

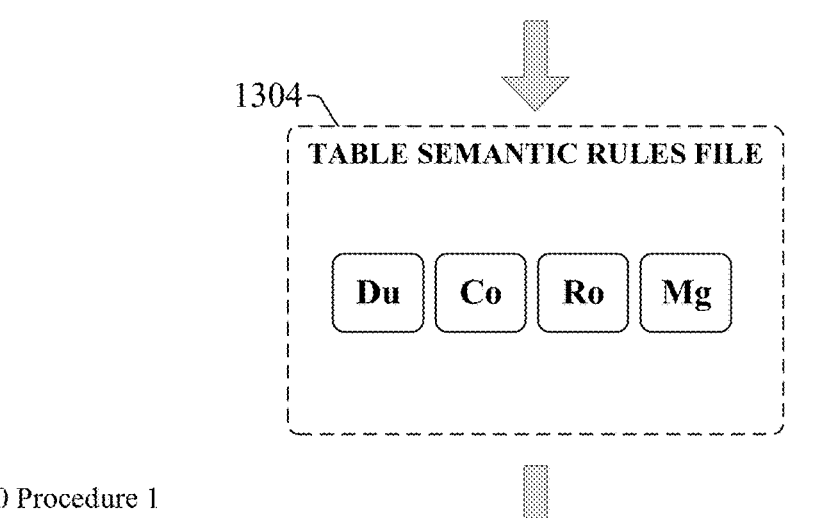

1304 —

TABLE SEMANTIC RULES FILE

| Du | Co | Ro | Mg |

2.0 Procedure 1
2.1 Table Procedure 1

1702c

| Medium Description | Organized Chemicals | Conc. | Storage Conditions - Range | Storage Conditions - Acceptable | Observation |
|---|---|---|---|---|---|
| Cm67 + 25mM M5X | RR64-XX454 | 1 L/L | ≤ 44°C Temperature | A total of 48 hours upon medium fill is allowed. Maximum of 24 hours. | Add 4ml of X solution to the mixture |
| Cm67 + 25mM M5X | 34mM KLS 5544 | 2ml/L | ≤ 44°C Temperature | A total of 48 hours upon medium fill is allowed. Maximum of 24 hours. | Add 4ml of X solution to the mixture |

"children"

```
[{"level": "2",                                    1302

Header: "Table One"

"Content_type: "list

"Content": [{

"Data_Type": "table"

"key": "Table One"

"tdata"

{"table_data":
                                                   2202
                    [

{"Parameter": "absolute membrane1",

"UOM": "RPM"

"Target": "XXX"

"NOR": "XXX"

"PAR": "N/A"

"Critical Ranking": "TBD"

"Remarks": "N/A"

{"Parameter": "absolute membrane 1"

"UOM": "N/A"

"Target": "XXX"

"NOR": "XXX"

"PAR": "N/A"

"Critical Ranking": "TBD"

"Remarks": "N/A"
```

FIG. 22

STRUCTURED
HIERARCHICAL MODEL

208

3502

MODEL EDITS

3508

PERFORMANCE
FEEDBACK

108

CONVERSION
COMPONENT

106

MODEL BUILDER
COMPONENT

104

USER INTERFACE
COMPONENT

**TECHNOLOGY
TRANSFER SYSTEM
(102)**

**MANUFACTURING
ENTITIES
(214)**

DOCUMENT
EDITS

3504

214

MANUFACTURING
ENTITY

STRUCTURED
HIERARCHICAL MODEL

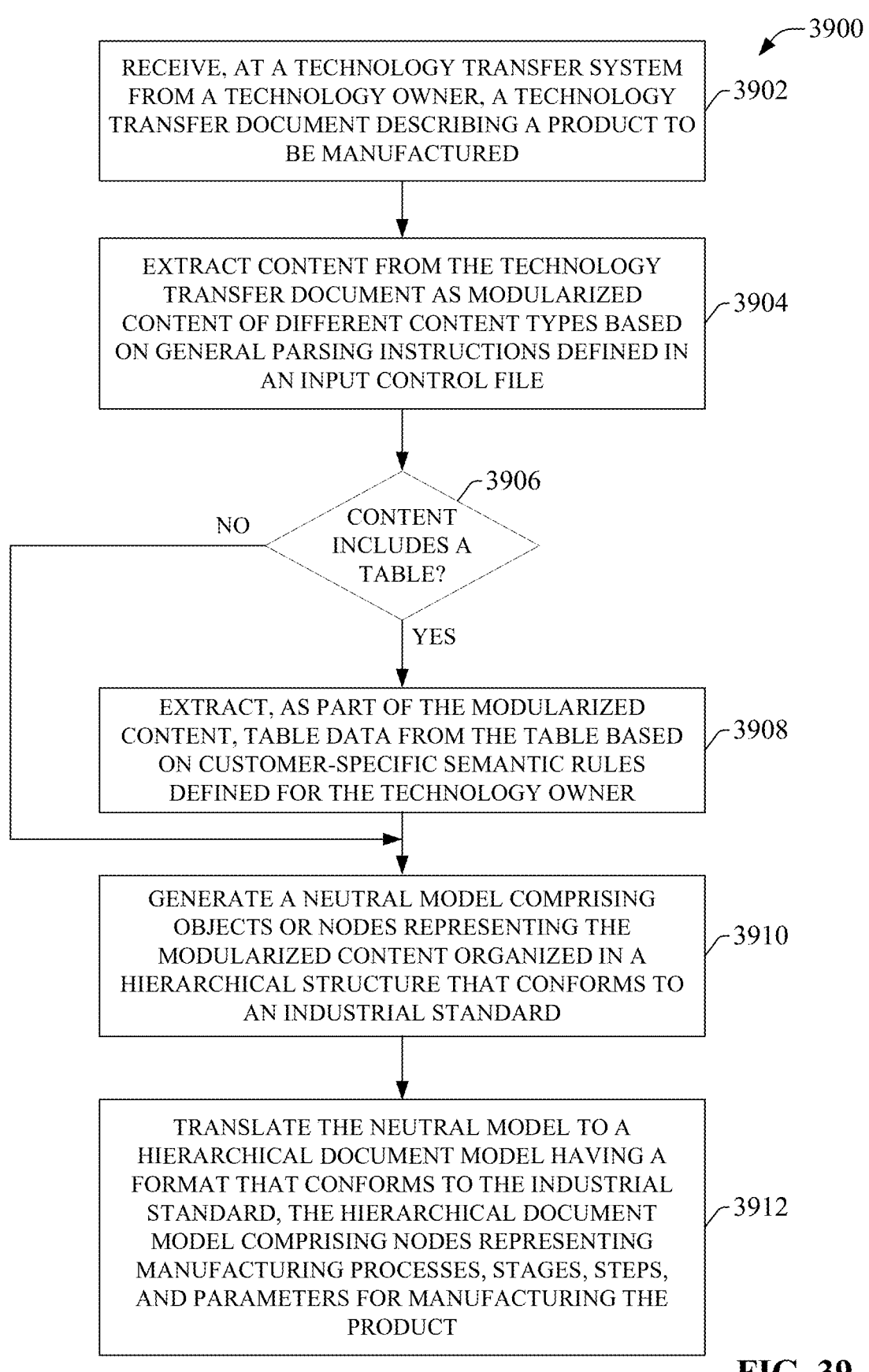

3900

RECEIVE, AT A TECHNOLOGY TRANSFER SYSTEM FROM A TECHNOLOGY OWNER, A TECHNOLOGY TRANSFER DOCUMENT DESCRIBING A PRODUCT TO BE MANUFACTURED ⌐3902

EXTRACT CONTENT FROM THE TECHNOLOGY TRANSFER DOCUMENT AS MODULARIZED CONTENT OF DIFFERENT CONTENT TYPES BASED ON GENERAL PARSING INSTRUCTIONS DEFINED IN AN INPUT CONTROL FILE ⌐3904

CONTENT INCLUDES A TABLE? ⌐3906

NO

YES

EXTRACT, AS PART OF THE MODULARIZED CONTENT, TABLE DATA FROM THE TABLE BASED ON CUSTOMER-SPECIFIC SEMANTIC RULES DEFINED FOR THE TECHNOLOGY OWNER ⌐3908

GENERATE A NEUTRAL MODEL COMPRISING OBJECTS OR NODES REPRESENTING THE MODULARIZED CONTENT ORGANIZED IN A HIERARCHICAL STRUCTURE THAT CONFORMS TO AN INDUSTRIAL STANDARD ⌐3910

TRANSLATE THE NEUTRAL MODEL TO A HIERARCHICAL DOCUMENT MODEL HAVING A FORMAT THAT CONFORMS TO THE INDUSTRIAL STANDARD, THE HIERARCHICAL DOCUMENT MODEL COMPRISING NODES REPRESENTING MANUFACTURING PROCESSES, STAGES, STEPS, AND PARAMETERS FOR MANUFACTURING THE PRODUCT ⌐3912

FIG. 39

RULE ENCODING FOR GENERIC DATA PARSING OF DATA TECHNOLOGY TRANSFER DOCUMENTS

TECHNICAL FIELD

The subject matter disclosed herein relates generally to industrial data sharing, and, for example, to distribution of technology transfer documents.

BACKGROUND ART

Technology owners in some industrial verticals often distribute the specifics of their technical innovations to partners or third-party entities for manufacture using a protocol known as technology transfer. In an example technology transfer scenario, a pharmaceutical company that holds ownership of the manufacturing details of a pharmaceutical product can send these details, in the form of a technology transfer document, to partner manufacturing entities, who use these documents as an instructional guide for producing the product. These technology transfer documents are typically written in a structured natural language format and include such information as a summary of the product, descriptions of the steps of the industrial process for manufacturing the product, and control parameters for the industrial process. As part of the manufacturing process description, these technology transfer documents may also include data formatted as charts, tables, or other documentation.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a a user interface component configured to receive, from a technology owner, a technology transfer document containing information about a product to be manufactured and describing a manufacturing process for manufacturing the product; a conversion table configured to extract a table contained in the technology transfer document, select a set of semantic rules, from multiple sets of semantic rules defined for respective different technology owners, corresponding to the technology owner, extract table data from the table in accordance with custom parsing instructions defined by the set of custom semantic rules, and generate at least a portion of a package model comprising a hierarchically structured organization of the table data organized based in part on the custom parsing instructions, wherein the custom parsing instructions are coded in a semantic rules file using a syntax that represents elements of the custom parsing instructions using respective codes of four characters or less, and the conversion component is configured to translate a string of the codes into a custom parsing instruction.

Also, one or more embodiments provide a method, comprising receiving, by a system comprising a processor, a technology transfer document from a technology owner, the technology transfer document containing information about a product to be manufactured and describing a manufacturing process for manufacturing the product; extracting, by the system, a table contained in the technology transfer document; selecting, by the system, a set of semantic rules, from multiple sets of semantic rules defined for respective different technology owners, corresponding to the technology owner; extracting, by the system, table data from the table in accordance with custom parsing instructions defined by the set of custom semantic rules; and generating, by the system, at least a portion of a package model comprising a hierarchically structured organization of the table data organized based in part on the custom parsing instructions, wherein the custom parsing instruction are coded using a syntax in which elements of the custom parsing instructions are represented by respective codes comprising four characters or less, and the extracting of the table data comprises translating a string of the codes into a custom parsing instruction and applying the custom parsing instruction to the table.

Also, according to one or more embodiments, a non-transitory computer-readable medium is provided having stored thereon instructions that, in response to execution, cause a technology transfer system comprising a processor to perform operations, the operations comprising importing a technology transfer document associated with a technology owner, the technology transfer document comprising information describing a product to be manufactured and a manufacturing process for manufacturing the product; extracting a table contained in the technology transfer document; selecting a set of semantic rules, from multiple sets of semantic rules defined for respective different technology owners, corresponding to the technology owner; extracting table data from the table in accordance with custom parsing instructions defined by the set of custom semantic rules; and generating at least a portion of a package model comprising a hierarchically structured organization of the table data organized based in part on the custom parsing instructions, wherein the custom parsing instructions are coded in a semantic rules file using a syntax that represents elements of the custom parsing instructions using respective codes of four characters or less, and the conversion component is configured to translate a string of the codes into a custom parsing instruction.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 7 is an example manufacturer summary display that lists defined manufacturing entities that have been registered with the technology transfer system.

FIG. 9 is an example user role summary screen that lists user roles registered with the technology transfer system.

FIG. 12a is a first segment of an example technology transfer document.

FIG. 18 is an example semantic rules file that defines a set of global and customer-specific parsing rules for normalizing table formats and nomenclature prior to extracting data from the tables.

FIG. 20 is a diagram illustrating translation of an example customer-specific table in accordance with a first example semantic rule defined in a semantic rules file.

FIG. 21 is a diagram illustrating application of a subsequent second semantic rule to the table.

FIG. 22 is a segment of an example neutral model containing table data that was extracted from a table within a document using custom parsing.

FIG. 39 is a flowchart of an example methodology for translating a technology transfer document to a digitized hierarchical object model notation.

DETAILED DESCRIPTION

Figure 1:
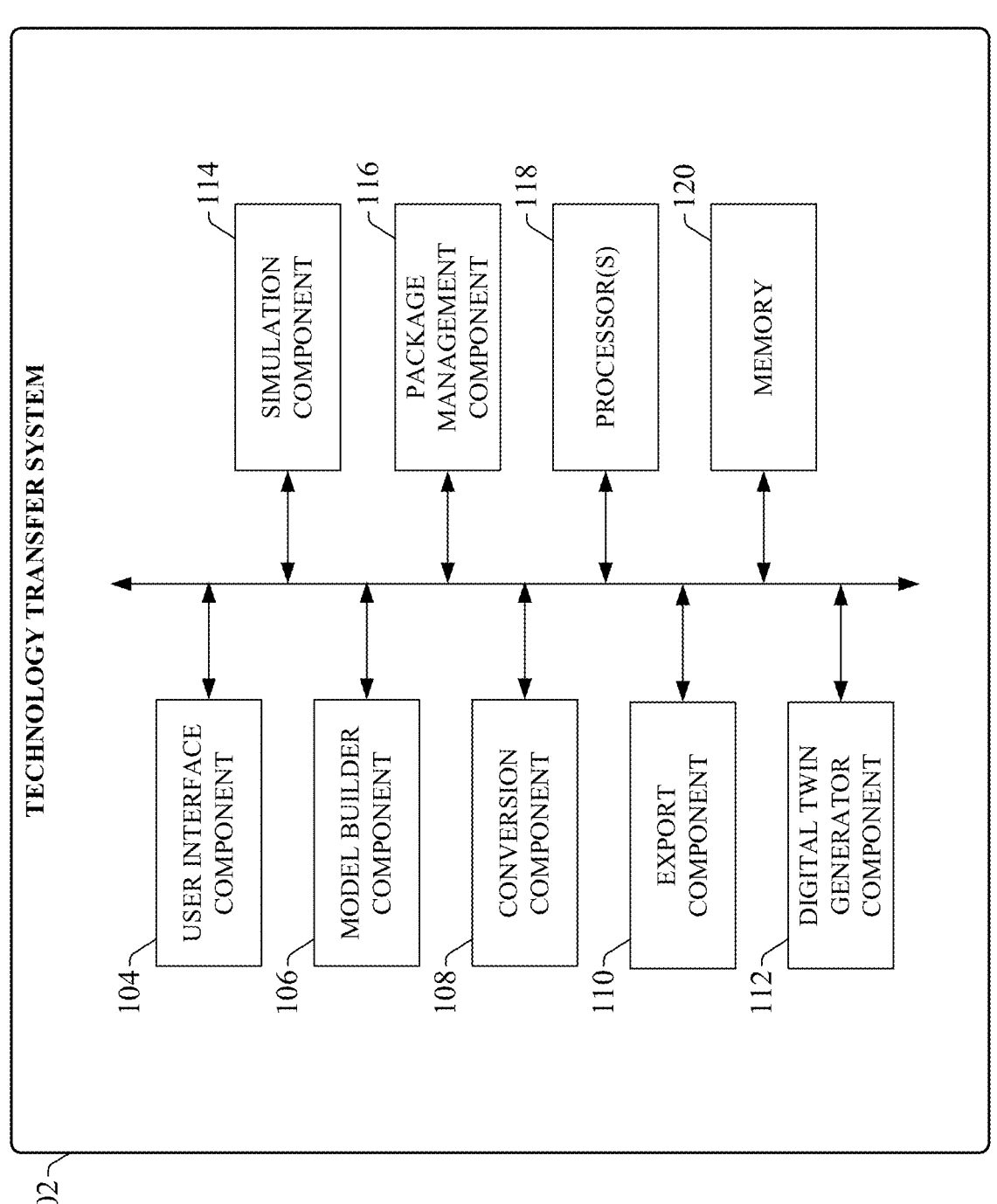
FIG. 1 is a block diagram of an example technology transfer system according to one or more embodiments of this disclosure.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Technology owners in some industrial verticals often distribute the specifics of their technical innovations to partners or third-party entities for manufacture using a protocol known as technology transfer. In an example technology transfer scenario, a pharmaceutical company that holds ownership of the manufacturing details of a pharmaceutical product can send these details, in the form of a technology transfer document, to partner manufacturing entities, who use these documents as an instructional guide for producing the product. These technology transfer documents are typically written in a structured natural language format and include such information as a summary of the product, descriptions of the steps of the industrial process for manufacturing the product, and control parameters for the industrial process. As part of the manufacturing process description, these technology transfer documents may also include data formatted as charts, tables, or other documentation.

There are a number of inefficiencies in the manner in which these technical documents are exchanged between entities. For example, because of the asynchronous approval and editing process, whereby multiple managers and engineers may submit review feedback or edits to the document in parallel, there may be multiple different versions of a given document in circulation before the finalized document is approved for deployment and implementation. Tracking these different versions of the technical document can be difficult and may result in the loss of information. Moreover, the absence of a formalized approval collection process can make collection of document approvals difficult. Distribution of finalized technology transfer documents and implementation of the documented manufacturing processes at the manufacturing facilities can also benefit from a greater degree of digital formalization of the technology transfer process.

To address these and other issues, one or more embodiments described herein provide a digital technology transfer system capable of transforming technology transfer documents to a set of digitized manufacturing procedures and operations documentation. To this end, the technology transfer system can transform a technology transfer document to a hierarchical structured model representing a package, or product to be manufactured, and the process for manufacturing the product. The resulting package model can then be integrated into a larger model representing an ecosystem of manufacturing entities by assigning steps of the manufacturing process to one or more selected production lines. User interface features allow participants in the ecosystem to browse the resulting hierarchical model and view information about the manufacturing entities, their plant facilities, and the packages assigned to the respective facilities. The system offers filtered role-specific views of the technology transfer documents, their approval statuses, and their plant assignments. In some embodiments, the system can also translate portions of the package model to control configuration data that can be exported to industrial systems and devices to facilitate configuring those systems and devices to manufacture the product represented by the package model.

FIG. 1 is a block diagram of an example technology transfer system 102 according to one or more embodiments of this disclosure. Aspects of the systems, apparatuses, or processes explained in this disclosure can constitute machine-executable components embodied within machine (s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Technology transfer system 102 can include a user interface component 104, a model builder component 106, a conversion component 108, an export component 110, a digital twin generator component 112, a simulation component 114, a package management component 116, one or more processors 118, and memory 120. In various embodiments, one or more of the user interface component 104, model builder component 106, conversion component 108, export component 110, digital twin generator component 112, simulation component 114, package management component 116, the one or more processors 118, and memory 120 can be electrically and/or communicatively coupled to one another to perform one or more of the functions of the technology transfer system 102. In some embodiments, components 104, 106, 108, 110, 112, 114, and 116 can comprise software instructions stored on memory 120 and executed by processor(s) 118. Technology transfer system 102 may also interact with other hardware and/or software components not depicted in FIG. 1. For example, processor (s) 118 may interact with one or more external user interface devices, such as a keyboard, a mouse, a display monitor, a touchscreen, a smart phone, a tablet computer, an AR/VR wearable appliance, or other such interface devices.

User interface component 104 can be configured to receive user input and to render output to a user in any suitable format (e.g., visual, audio, tactile, etc.). In some embodiments, user interface component 104 can render interactive interface displays on a display device (e.g., a display device associated with a desktop computer, a laptop computer, a tablet computer, a smart phone, etc.), where the interface displays serve as the interface for the technology transfer system 102. The user interface component 104 can render various interface displays and associated tools that allow a user to build a hierarchical innovator model describing an ecosystem of manufacturing entities and their locations and capabilities; submit a technology transfer document (e.g., a portable document format (PDF) document) and assign manufacturing processes described in the document to selected manufacturing entities; view and submit document review statuses; browse technology packages that have been submitted to the system; and other such interface functions.

Model builder component 106 can be configured to generate a digital hierarchical innovator model comprising nodes representing manufacturing entities or other partner entities associated with a technology owner (e.g., a pharmaceutical company or other innovator), as well as the capabilities and manufacturing lines associated with the respective entities. The model builder component 106 can also define users, user roles, and access permissions for users permitted to view and interact with this innovator model.

Conversion component 108 can be configured to covert a digital technology transfer document from a native format (e.g., a PDF format or other natural language format) to a digital hierarchical package model comprising nodes representing the various process stages, steps, and parameters described in the document. The conversion component 108 also assigns relevant portions of the document—including text-based process descriptions, charts, tables, and process parameters—to the respective nodes of the package model. The conversion component 108 can also integrate the resulting document model into the larger innovator model based on defined assignments of manufacturing processes or steps to respective production lines operated by the manufacturing entities.

Export component 110 can be configured to export selected information contained in the digitized technology transfer document to external systems, including but not limited to manufacturing execution systems (MES) that monitor and manage control operations on the control level, enterprise resource planning (ERP) systems that integrate and collectively manage high-level business operations, industrial controllers that monitor and control industrial machines and processes at the plant level, or other such systems or devices. In some embodiments, the export component 110 can export control configuration data that configures respective industrial devices or systems to execute steps of the manufacturing process described in the technology transfer document.

Digital twin generator component 112 can be configured to generate a digital twin of a product manufacturing process based on information about the process and its associated production lines obtained from the hierarchical models. Simulation component 114 can be configured to simulate, based on the digital twin, manufacture of the product on designated production lines in accordance with the processes described in the technology transfer document. Package management component 116 can be configured to collect and manage approval statuses for the package and, in some embodiments, register content of the package model in a blockchain in a secure an immutable manner.

The one or more processors 118 can perform one or more of the functions described herein with reference to the systems and/or methods disclosed. Memory 120 can be a computer-readable storage medium storing computer-executable instructions and/or information for performing the functions described herein with reference to the systems and/or methods disclosed.

Figure 2:
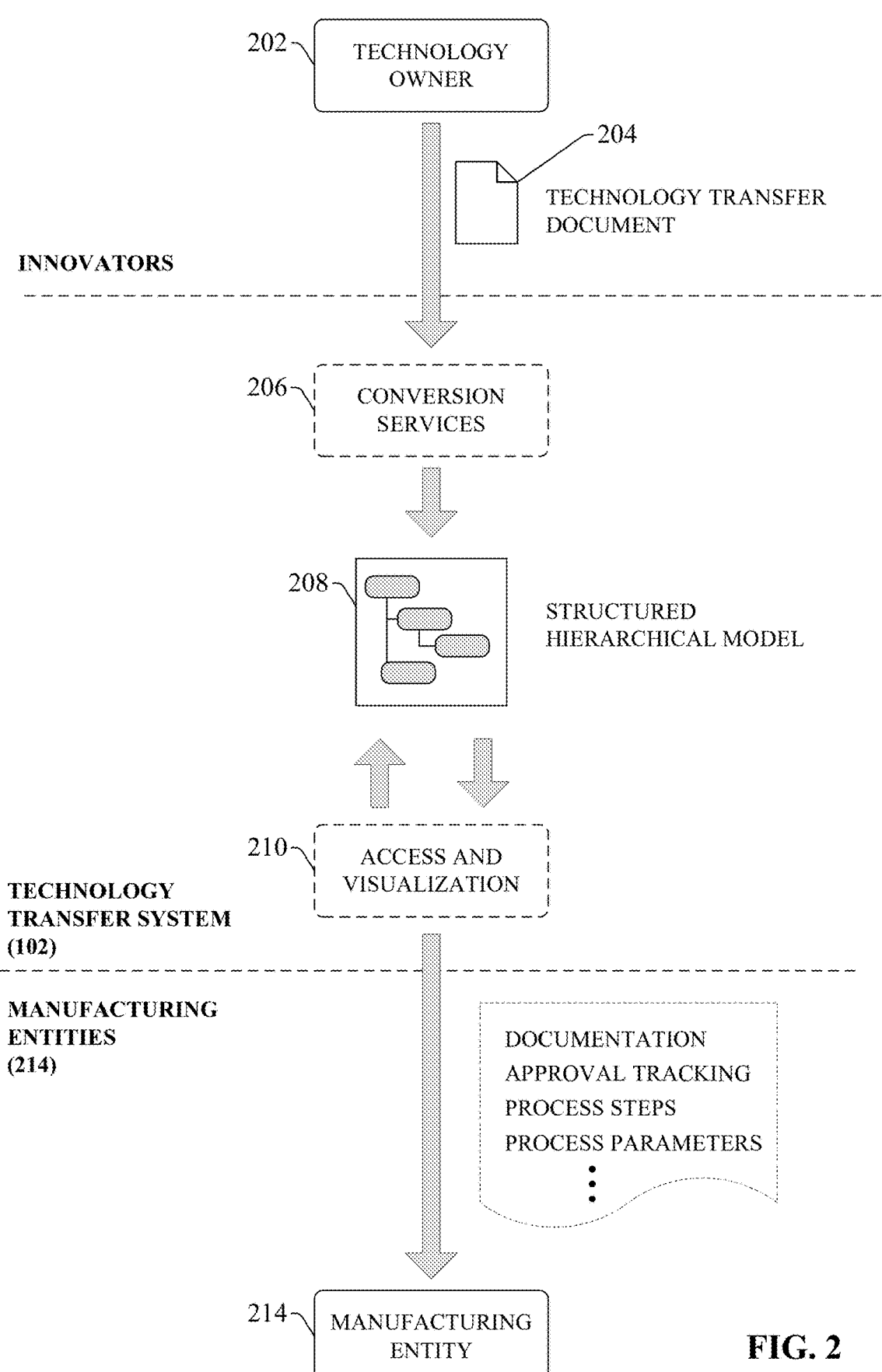
FIG. 2 is a diagram illustrating an example flow of technology documentation from a technology owner to a manufacturing entity using embodiments of the technology transfer system.

FIG. 2 is a diagram illustrating an example flow of technology documentation from a technology owner 202 to a manufacturing entity 214 using embodiments of the technology transfer system 102. Although the examples illustrated and described herein depict the use of system 102 to manage pharmaceutical technology data, the technology transfer system 102 can be used to manage transfer of technology within the context of substantially any industrial vertical, including but not limited to automotive, food and drug, textiles, oil and gas, or other verticals.

The technology transfer system 102 can be implemented on any suitable high-level system or platform accessible to the participants involved in the technology transfer. For example, in some embodiments the system 102 can be implemented as a set of cloud-based services on a cloud platform using a software-as-a-service (SaaS) model. In other embodiments, the system 102 may be implemented on one or more servers accessible to authorized users via a public and/or private network.

In general, the technology transfer system 102 supports digitalization of pharmaceutical manufacturing procedures and operational documentation provided in a natural language format, such as a PDF document or another type of natural language document format. The system 102 serves as a hub that allows technology owners 202 to transfer technical documents relating to a product to manufacturing entities 214, such as contract development and manufacturing organizations (CDMOs), thus acting as a bridge between technology owners and the manufacturers that will be producing physical instances of the technology.

A technology owner 202, such as a pharmaceutical company, can create a technology transfer document 204 describing specifics of a technology transfer package. The technology document 204 can describe a product to be manufactured (e.g., a pharmaceutical product) as well as manufacturing details for producing the product. Document 204 can be formatted as a combination of natural language and, if appropriate, other informational structures including but not limited to charts, tables, or graphs. In some scenarios, the document 204 can comprise a digital PDF file. However, other file formats for document 204 are also within the scope of one or more embodiments, including but not limited to word processing documents or image documents.

When the technology owner 202 submits the document 204 to the technology transfer system 102, conversion services 206 supported by the system 102 perform natural language processing on the document 204 to identify content sections contained in the document, including but not limited to product summaries, descriptions of stages of a manufacturing process, descriptions of process steps that make up the respective stages, process parameters associated with steps of the manufacturing stages, tables, charts, or other such elements. The conversion services 206 translate these discovered document elements to a hierarchical model 208 having a tree-like structure that conforms to a relevant industrial standard such as ISA-88.

Once the model 208 is created, access and visualization services 210 supported by the system 102 allow manufacturing entities 214, such as CDMOs, to view and interact with the organized document elements encoded in the model 208. These services 210 support workflows for viewing and editing the document data through interaction with the model 208 in accordance with role-specific access permissions. The system 102 also includes approval tracking tools that collect and track document approvals from authorized users who are part of the approval chain. In some embodiments, product recipe data obtained from the document 204 and integrated into the model 208 can be exported to manufacturing or control systems—e.g., MES or ERP systems—associated with relevant manufacturing entities 214.

Figure 3:
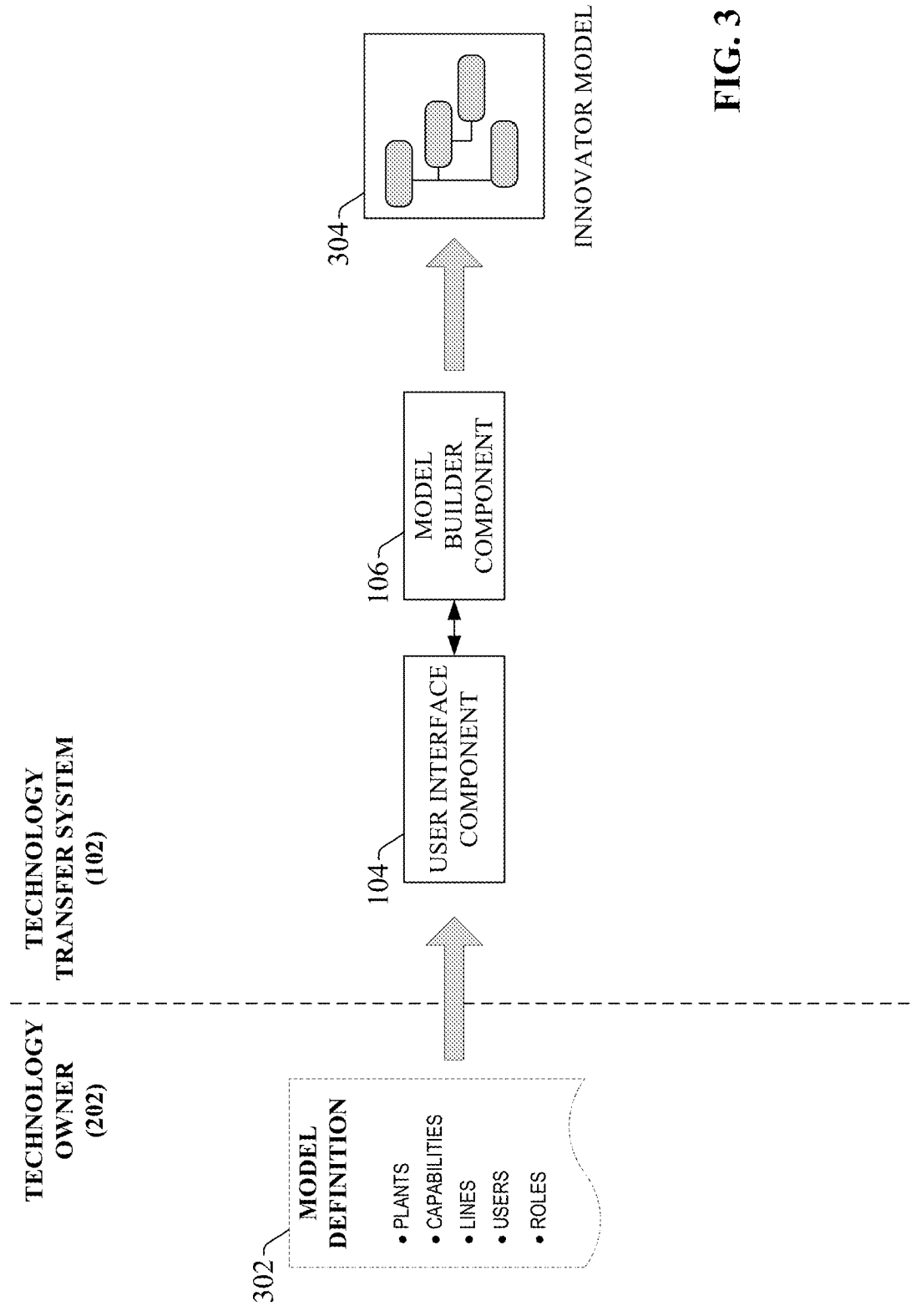
FIG. 3 is a diagram illustrating creation of an innovator model by the technology transfer system.

Prior to distribution of technology documents 204, the technology transfer system 102 allows a technology owner 202 to create an innovator model that represents the various manufacturing entities 214 who have a business relationship with the technology owner 202, as well as the capabilities, users, and access permissions associated with those manufacturing entities 214. FIG. 3 is a diagram illustrating creation of an innovator model 304 by the technology transfer system 102. In an example scenario, a technology owner 202, such as a pharmaceutical company that develops drug formulations, contracts with multiple manufacturing entities 214 to manufacture pharmaceutical products (e.g., topical or oral medications). To facilitate translation and distribution of technology transfer documents 204 to these manufacturing entities 214, tools supported by the system 102 allow an administrator associated with the technology owner 202 (or innovator) to create an innovator model 304 that represents these various manufacturing entities and their respective capabilities as a hierarchical structure of nodes.

Figure 4:
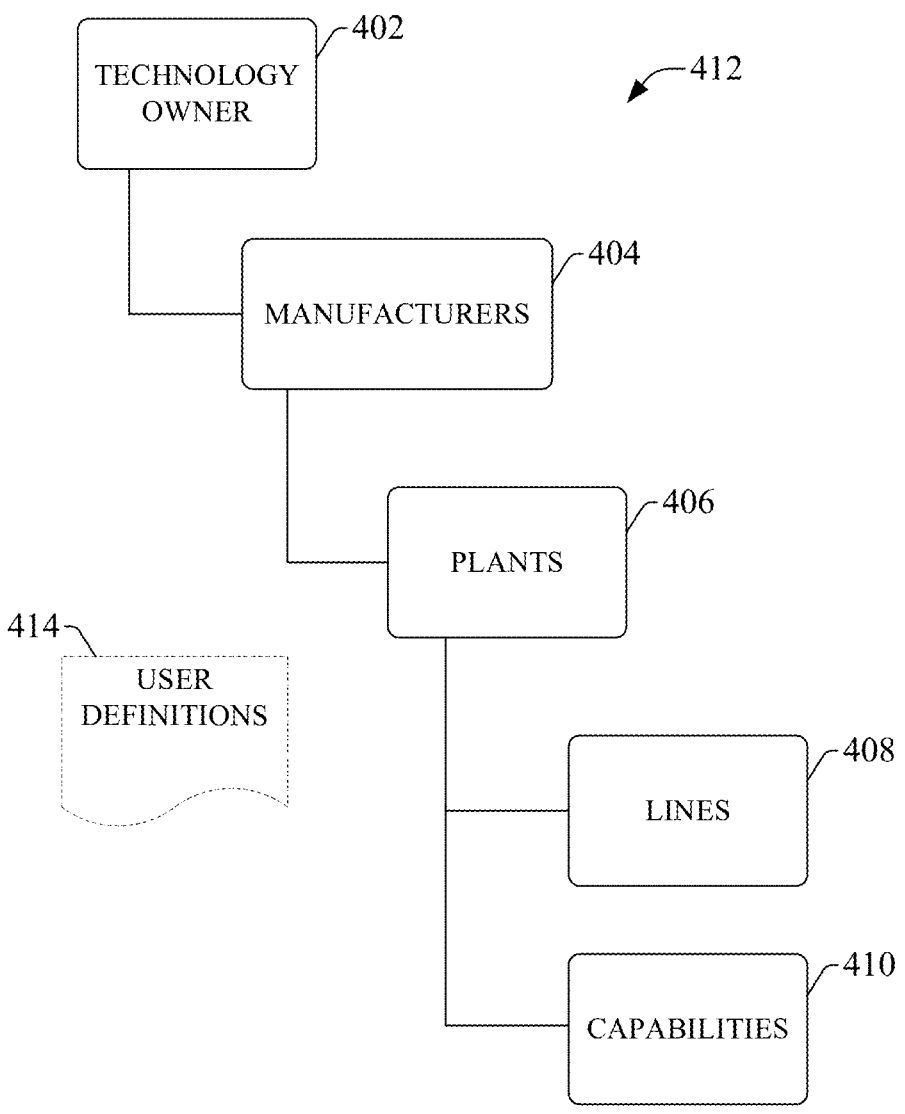
FIG. 4 is an example hierarchical schema for an innovator model.

To this end, the user interface component 104 can render configuration interface displays on an authorized user's client device that allow the user to submit model definition information 302 describing the entities to be represented by the model 304. The model builder component 106 then uses this model definition input 302 to create the innovator model 304. The format of innovator model 304 can conform to any suitable hierarchical schema depicting relationships between the technology owner 202, the manufacturing entities 214, and the respective plant facilities associated with the manufacturing entities 214. FIG. 4 is an example hierarchical schema 412 for the innovator model 304 according to one or more embodiments. In this example, the technology owner is represented by the highest level 402 of the schema. Since the innovator model 304 is specific to a given technology owner 202 in this scenario, there is only one such technology owner node in this example. In some embodiments, the model builder component 106 can enforce conformance of the innovator model 304 with an industrial standard, such as ISA-88.

Below the technology owner level 402, a manufacturers level 404 comprises one or more manufacturer nodes representing manufacturing entities 214 employed by the technology owner 202 to manufacture products in accordance with the formulations described in the technology transfer documents 204. Each manufacturer node is associated with one or more plant nodes defined in a plant level 406. The plant nodes are defined as child nodes of the plant nodes and represent the plant facilities owned by the manufacturer and available to manufacture product. The production lines and manufacturing capabilities of each plant are defined under a line level 408 and a capability level 410, respectively, which reside under the plant level 406. It is to be appreciated that the hierarchical schema 412 depicted in FIG. 4 is only intended to be exemplary, and that innovator model 304 can conform to any suitable schema in which the manufacturers and their plant facilities are represented. As will be described in more detail herein, information contained in technology transfer documents 204 submitted to the system 102 will be translated and integrated into this innovator model 304 as additional nodes within the schema 412.

In addition to defining the hierarchical structure of the plant ecosystem as represented by schema 412, the model definition input 302 can also define users associated with the various entities defined by the model 304 (technology owner 202 and manufacturing entities 214) and their respective roles. This user and role information is stored in association with the model 304 as user definition data 414. The role of each user will determine the degree of visibility and access the user has to the information contained in the model 304.

Figure 5:
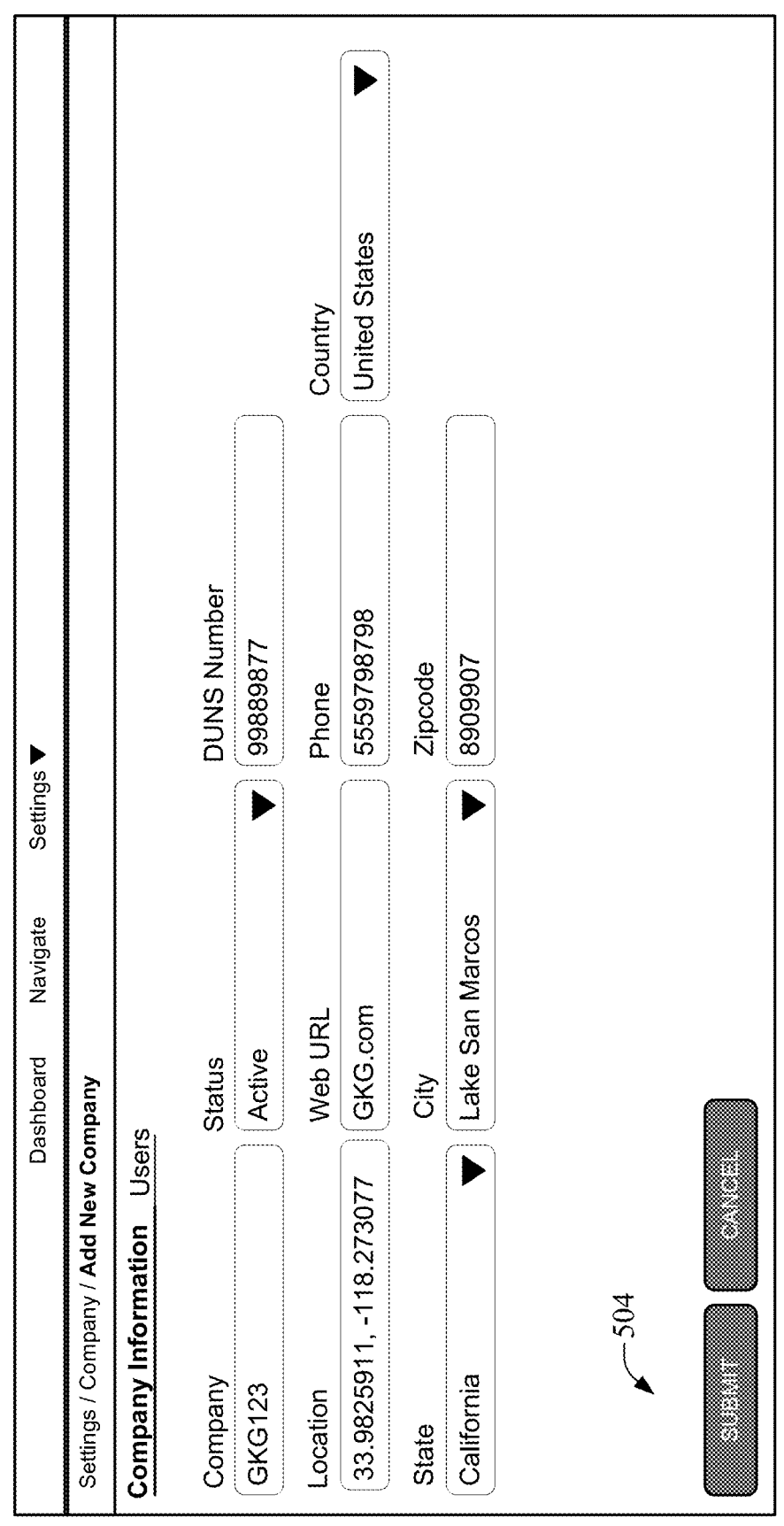
FIG. 5 is an example company definition display that can be used to submit information about a technology owner for which an innovator model is being built.

FIGS. 5-10 illustrate various example interface displays that can be rendered by the user interface component 104 and used to submit model definition input 302. FIG. 5 is an example company definition display 502 that can be used to submit information about the technology owner 202 for which the innovator model 304 is being built. Display 502 can include data entry fields for submitting information about the technology owner 202 (or company), including the owner's name, status, location (country, state, city, zip code, etc.) web address, and phone number. Once this company information is entered, selecting the submit button 504 on the display 502 registers the technology owner 202 and allows the owner's innovator model 304 to be built.

Figure 6:
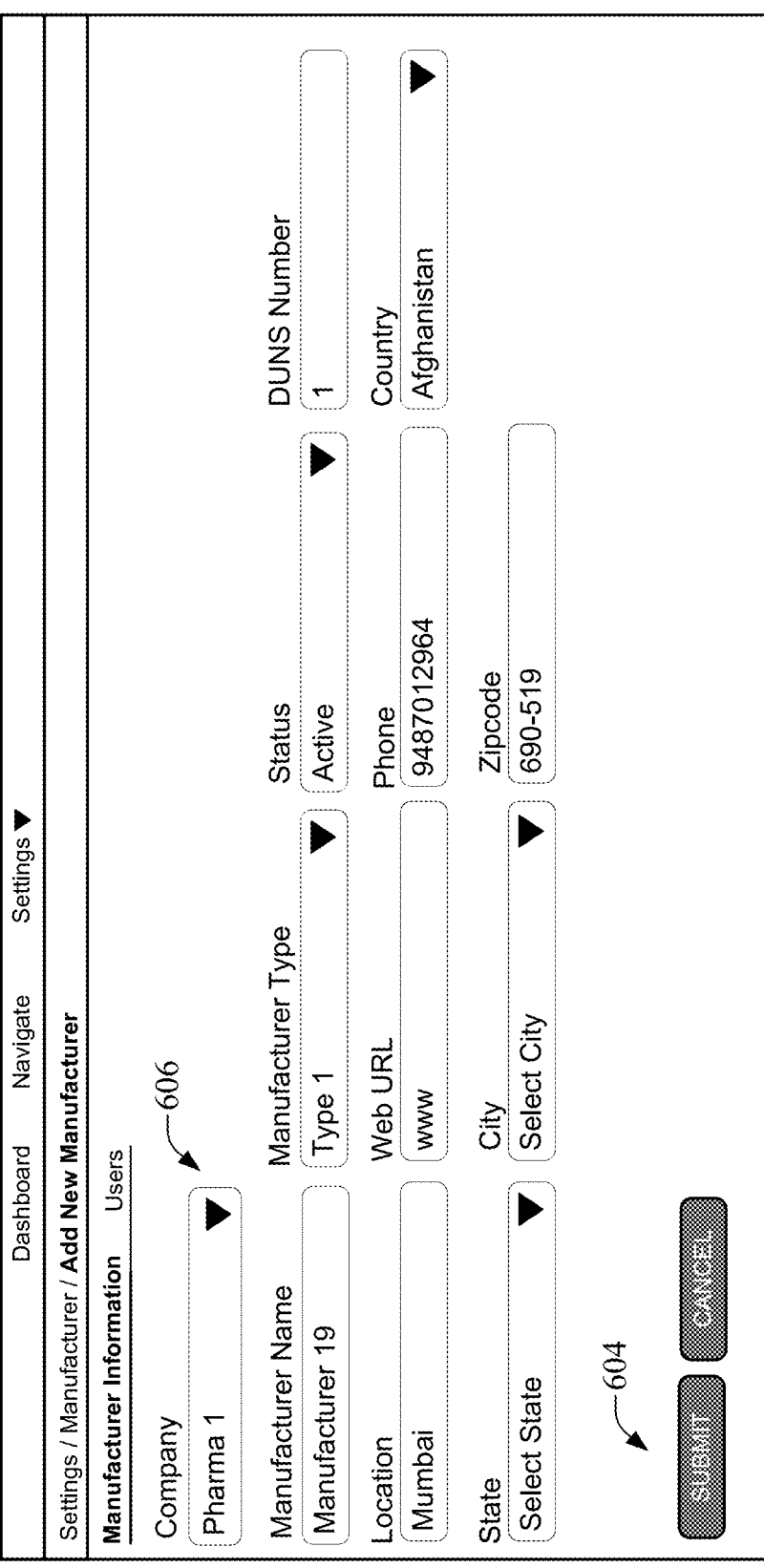
FIG. 6 is an example manufacturer definition display that can be used to submit information about a manufacturing entity to be associated with a technology owner.

FIG. 6 is an example manufacturer definition display 602 that can be used to submit information about a manufacturing entity 214 to be associated with a technology owner 202. Display 602 includes a drop-down selection field 606 for selecting the technology owner 202 for which a manufacturer is being defined. The selection field 606 is populated with the names of any registered technology owners 202 that were registered using display 502 illustrated in FIG. 5. Interface display 602 also includes data entry fields for entering information about the manufacturing entity to be defined for the selected technology owner 202, including the manufacturer's name, type, status, location (country, city, state, zip code, etc.), web address, and phone number. Once values of these fields have been entered, selecting a Submit button 604 causes the submitted manufacturer information to be added to the technology owner's innovator model 304.

FIG. 7 is an example manufacturer summary display 702 that lists all defined manufacturing entities 214 that have been registered with the system 102 using interface display 602. This summary display 702 lists the registered manufacturing entities in tabular form, including columns that indicate each manufacturer's type and location, as well as the technology owner 202 (company) with which the manufacturer is associated. Display 702 also indicates, for each registered manufacturer, a date on which the manufacturer was registered with the system 102 and an identity of the authorized user who registered the manufacturer. From this display 702, a user can invoke display 602 to register another manufacturing entity 214 by selecting the Add New Manufacturer button 704.

Figure 8A:
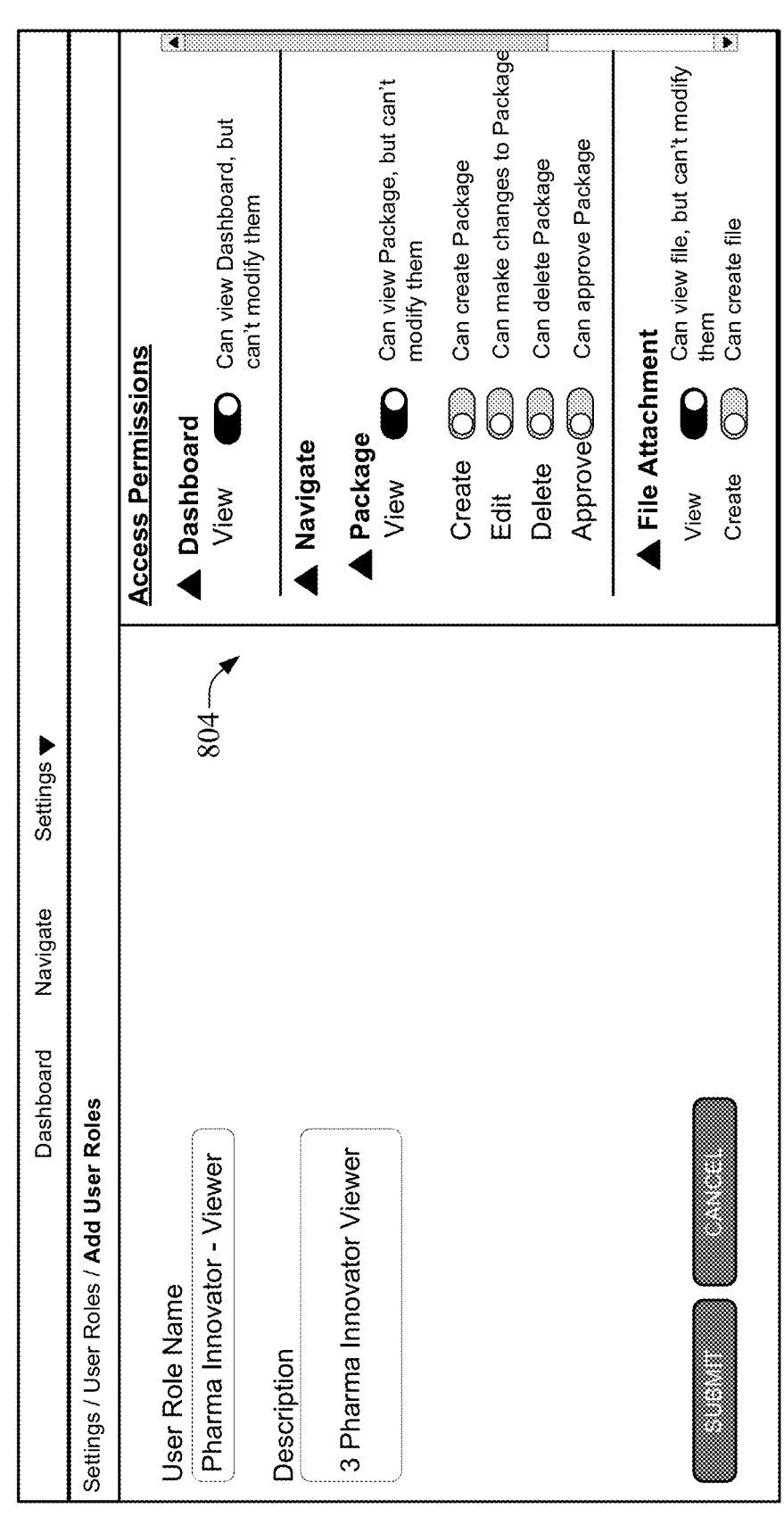
FIG. 8a is a first view of an example user role definition interface that can be used to define user roles and their associated permissions.
Figure 8B:
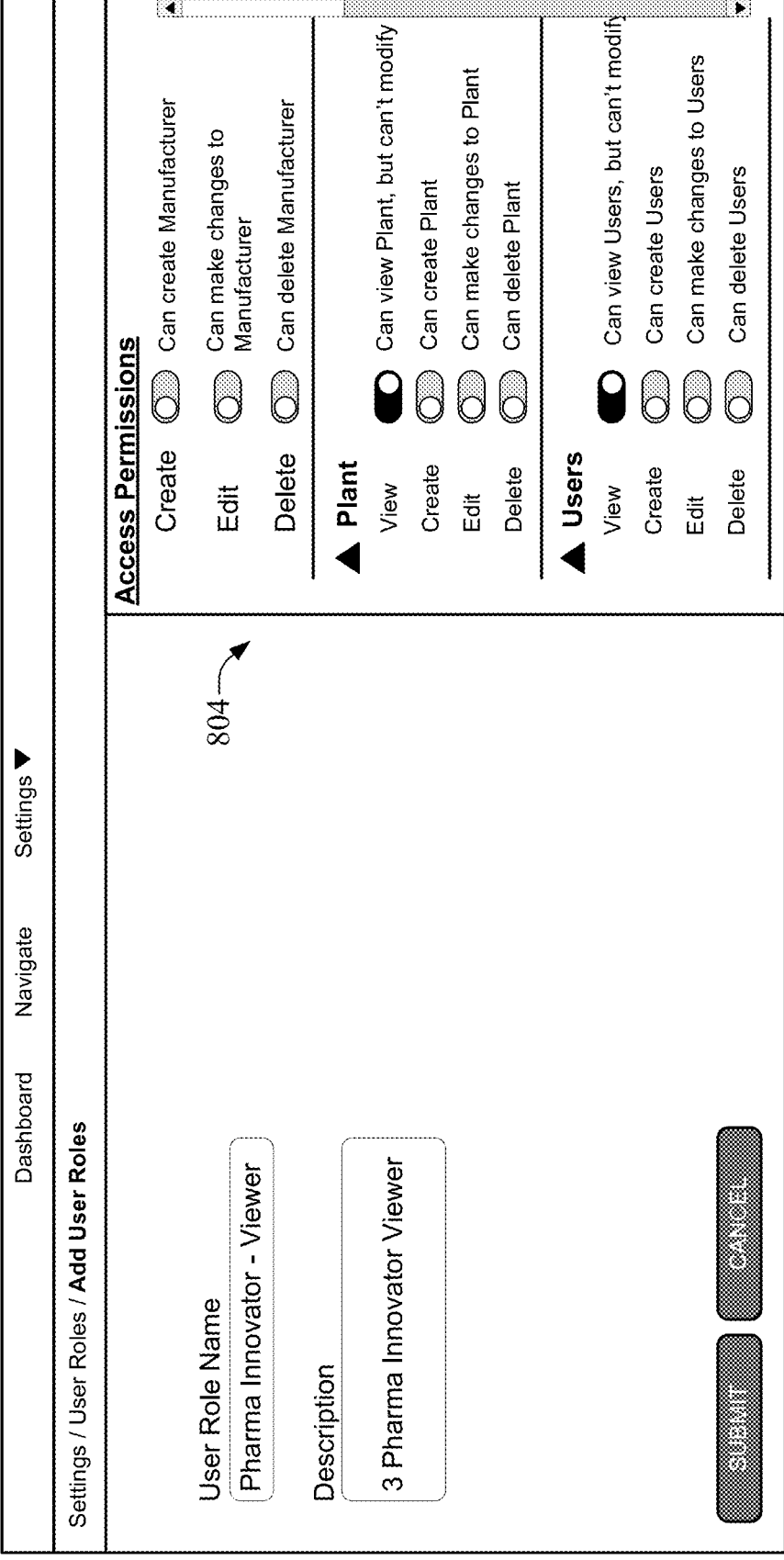
FIG. 8b is a second view of the example user role definition interface that can be used to define user roles and their associated permissions.

FIGS. 8*a* and 8*b* are views of an example user role definition interface 802 that can be used to define user roles and their associated permissions. Interface 802 includes data entry fields for entering a name and description of the user role, as well as an Access Permissions switchboard panel 804 that lists configurable permission categories that can be set for the user role. The access permissions configured using switchboard panel 804 determine the degree to which users assigned to the role are permitted to view and engage with information in the model 304. Permissions that can be set using control panel 804 can include, but are not limited to, the user's ability to invoke dashboards that provide a view into the data contained in the model 304; the user's ability to view, create, edit, delete, or approve a product package (that is, package represented by technology transfer document 204); the user's ability to view or create a file attachment; the user's ability to view, create, edit, or delete manufacturer information registered with the system 102; the user's ability to view, create, edit, or delete plant information registered with the system 102; the user's ability to view, create, edit, or delete user information; the user's ability to submit package approvals; or other such permissions.

The panel 804 allow access permissions for various access categories to be set at substantially any degree of granularity in various embodiments. In the illustrated example, the panel 804 segregates the access permissions according to category (e.g., package permissions, file attachment permissions, manufacturer permissions, plant permissions, user permissions, etc.), and specific permissions under each category can be set via interaction with binary switches next to each permission, such that the switch setting indicates whether the user role is to be permitted or denied the corresponding permission.

FIG. 9 is an example user role summary display 902 that lists the user roles currently registered with the system 102. The user roles are listed in a tabular format, with columns indicating, for each defined user role, a description of the role, a date on which the role was registered, and an identity of a user who registered the user role. Example user roles can include, but are not limited to, a viewer associated with the technology owner 202, a viewer associated with a manufacturing entity 214 (which may be afforded more limited access to the model 304 whereby the viewer can only view information associated with his or her affiliated manufacturing entity), an administrator, a reviewer, an operator, an engineer, a maintenance person, or other such roles. A user with suitable editing privileges can edit any of the user roles listed on display 902 by selecting an editing control 904 next to the role, which invokes the user role configuration interface 802 for a selected user role.

Figure 10:
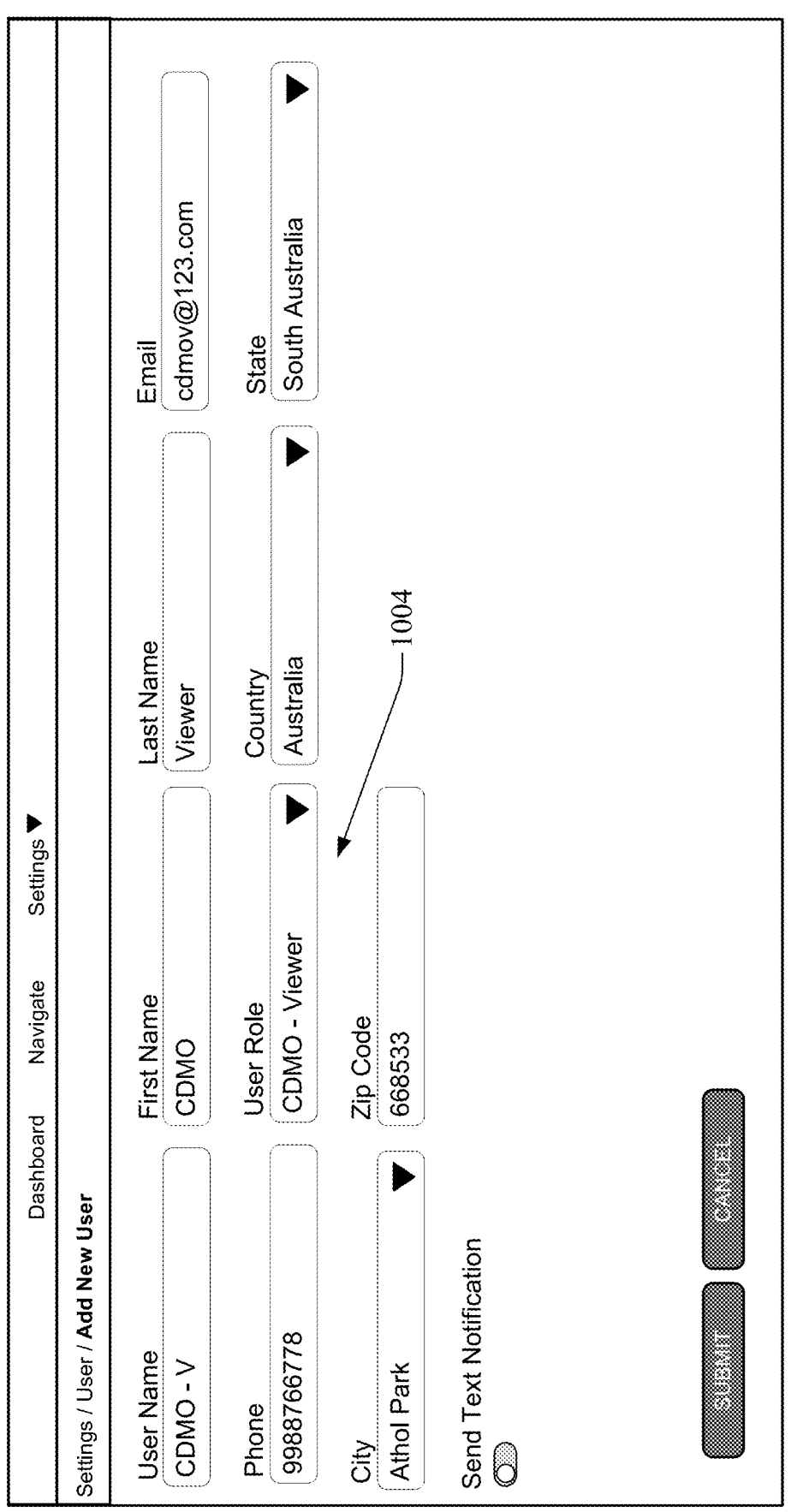
FIG. 10 is an example user definition display that can be used to register new users with the technology transfer system.

FIG. 10 is an example user definition display 1002 that can be used to register new users with the system 102. Display 1002 comprises data entry fields for entering a user's name, contact information (email address, phone number, etc.), and location (country, state, city, zip code, etc.). Display 1002 also includes a drop-down selection field 1004 for selecting a user role to which the user is to be assigned. Selection field 1004 is populated with the user roles that were defined using interface 802 illustrated in FIGS. 8*a* and 8*b*. Designating a pre-defined user role to the user in this way assigns the user the same access permissions that were defined for the role.

Based on information provided by a user using the model configuration displays described above in connection with FIGS. 5-10, or other model configuration displays having similar functionalities, the model builder component 106 creates a hierarchical innovator model 304 that is specific to a given technology owner 202 and which represents manufacturing entities 214 having a business relationship with the technology owner 202. Plant facilities owned by the respective manufacturing entities 214, as well as their respective capabilities and lines, are also represented in the model 304. Since a given technology owner 202 may have contracts with multiple manufacturing entities 214, the model 302 represents a one-to-many relationship between the technology owner 202 and its associated manufacturing entities 214.

Figure 11:
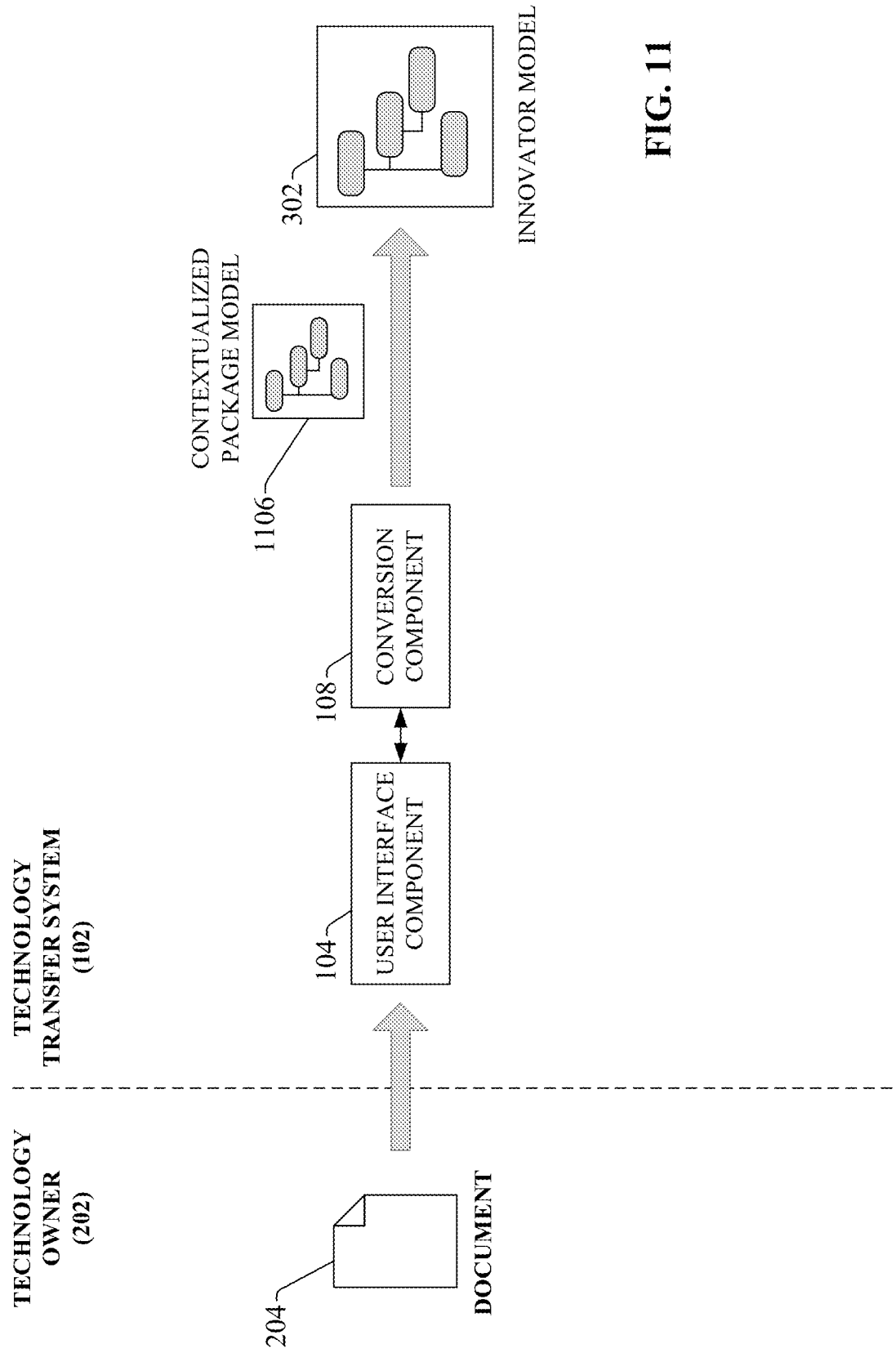
FIG. 11 is a diagram illustrating submission of a technology transfer document to the technology transfer system by a technology owner.

Once the innovator model 304 established, the technology owner 202 can begin submitting technology transfer documents 204 to the system 102 for translation and deployment to selected manufacturing entities 214 via interaction with the model 302. FIG. 11 is a diagram illustrating submission of a technology transfer document 204 to the technology transfer system 102 by a technology owner 202. User interface component 104 can render, on a client device associated with an authorized representative of the technology owner 202, a document submission interface that allows the authorized representative to upload a technology transfer document 204 to the system 102. Technology transfer document 204 can be submitted to the system 102 in substantially any digital format, including but not limited to a PDF file, a word processing file, an image file such as a joint photographic exports group (JPEG) file, or another format containing natural language content. In general, technology transfer documents 204 are written to convey information about a manufacturing process for a given product (e.g., a pharmaceutical product) from a technology owner 202 to a manufacturing entity 214. These documents 204 can describe the manufacturing operations, process stages, process steps, and process parameters to be followed as part of the process of producing the product. An example technology transfer document 204 can be written as a structured natural language document comprising various sections and sub-sections that convey different aspects of the manufacturing process.

Figure 12A:
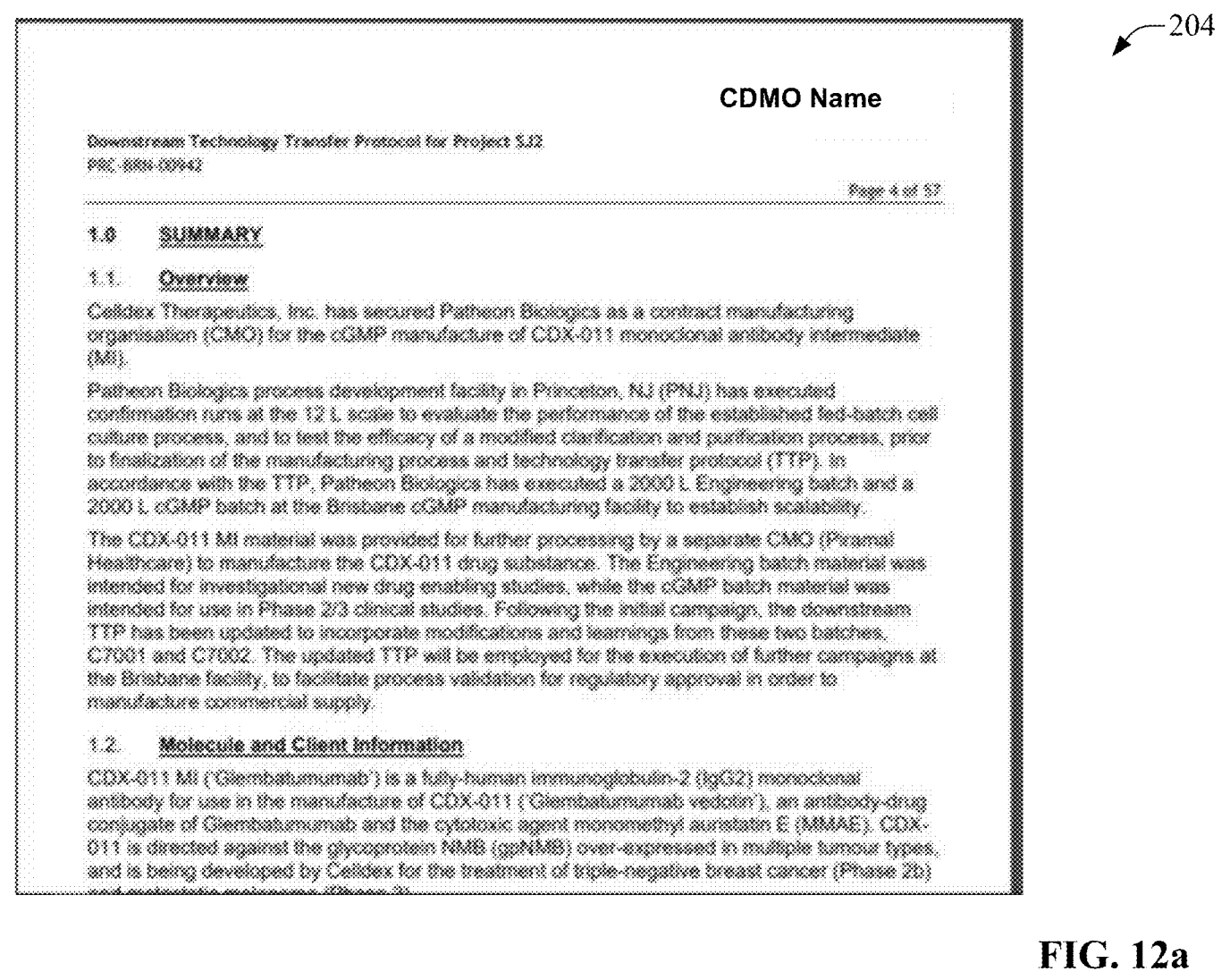
Figure 12B:
FIG. 12b is a second segment of the example technology transfer document.

FIGS. 12*a* and 12*b* are two segments of an example technology transfer document 204. As shown in FIG. 12*a*, document 204 can include a summary section (Section 1.0) under which are various summary sub-sections, including an overview sub-section (Section 1.1) that describes the product to be manufactured and background information regarding the development of the product. Other sub-sections can provide further background information for the product. Other sections of the document 204 can describe the process stages and associated process steps for manufacturing the product in more detail. This process information can include natural language descriptions of the process as well as any figures, charts, tables, or process parameters necessary to describe the process to the manufacturing entity 214 at a level of detail sufficient to carry out the manufacturing process.

Returning to FIG. 11, once the technology owner 202 has submitted or uploaded the technology transfer document 204 to the system 102, the conversion component 108 processes and translates the document 204 to a contextualized package model 1106 that digitally represents the document 204 in a hierarchical object notation. The package model 1106 can comprise a hierarchical structure having nodes representing respective aspects of the document 204, including the manufacturing processes, stages, steps, and control parameters described in the document 204.

Figure 13:
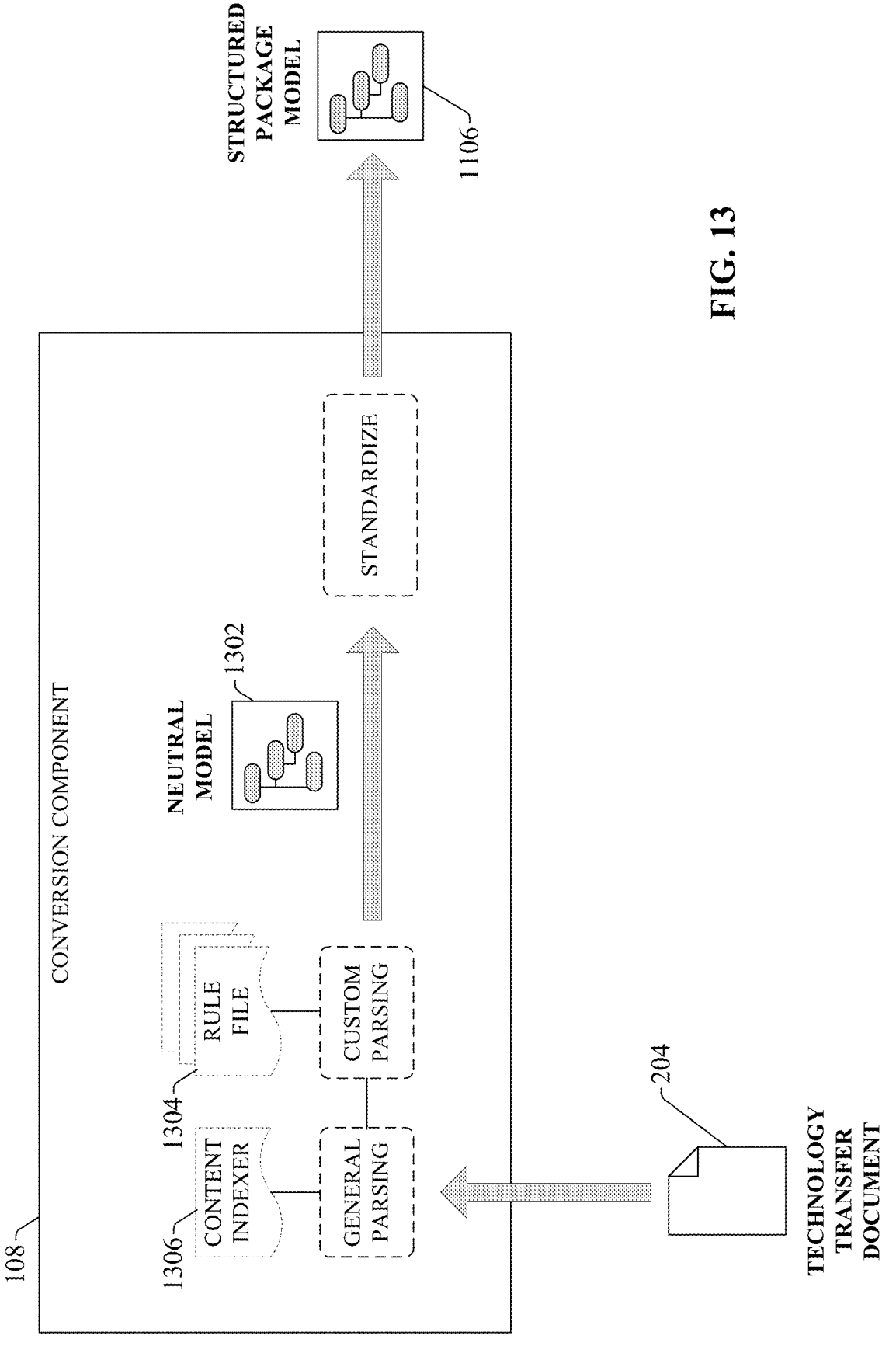
FIG. 13 is a diagram illustrating an example translation process that can be carried out by the conversion component of the technology transfer system.

FIG. 13 is a diagram illustrating an example translation process that can be carried out by the conversion component 108 in one or more embodiments. In one or more embodiments, content is extracted from the technology transfer document 204 using parsing engines that extract and organize the text, images, and tables into a package model 1106. Although technology transfer documents 204 submitted by different technology owners 202 have some commonality in terms of the types of information or elements contained in their documents 204 (e.g., text, images, flow diagrams, and tables), the organization and formatting of these elements in the document 204, as well as the terminology used to identify certain items of information, may vary between technology owners 202. In the absence of a scalable approach to extracting and mapping information from these documents 204 to a common standardized format (e.g., a format conforming the ISA-88 standard), it would be necessary to create a custom parser for each customer-specific document 204 to identify the locations of each type of document content and to translate the content to a standard format (the package model 1106). This approach is not easily scalable across multiple technology owners 202, since creating new custom parsers for each customer-specific document style is time consuming, complicated, and expensive.

Tables contained in the documents 204—which may contain organized information about a manufacturing process, including process variables and descriptions—can be particularly difficult to translate, since different technology owners 202 may use proprietary formatting for their tables, resulting in customer-specific tables having unique cell structures (e.g., due to customized horizontal or vertical cell merging). The header text used to identify rows or columns of a table may also be inconsistent across different technology owners 202.

To address these and other issues, the conversion component 108 can apply a data extraction process to technology transfer documents 204 that reduces the dependency on custom-built parsers by integrating both custom and general parsers into a scalable parser orchestration engine. The conversion component 108 uses intelligent parser component management to orchestrate extraction of all required pieces of data from different technology transfer documents 204 and organization of that data into a standardized format (e.g., a format based on ISA-88 standard). Rather than using document-specific parsers, the conversion component 108 uses control and semantic rules to orchestrate and synchronize extracted modules, based on human-driven directives.

In general, conversion component 108 uses a modularized general parsing mechanism—based on a content indexer 1306—capable extracting text, table, and images from a variety of documents 204. The conversion component 108 also uses custom parsing rules—defined in one or more rules files 1304—to parse and extract document-specific content from the documents 204 that cannot be generalized due to variations across documents 204, such as tables having customer-specific cell formatting and nomenclature. Based on this extracted modularized content, the conversion component 108 generates a neutral model 1302 representing the document 204. The neutral model 1302 can be formatted according to any suitable object notation, such as JavaScript Object Notation (JSON). The neutral model 1302 comprises objects, nodes, or modules representing the various sections, sub-sections, and data content discovered in the document 204 by the extraction processing, organized to reflect any parent-child relationships between items of the content. Details of the document parsing and extraction orchestration will be described in more detail below.

Once the neutral model 1302 has been generated, the conversion component 108 can, if necessary, apply standardization processing to the neutral model 1302 to organize the objects of the neutral model 1302 into a meaningful hierarchical structure (e.g., a structure conforming to the ISA-88 batch process model), yielding the contextualized package model 1106. The package model 1106 comprises a hierarchical organization of nodes representing the various content items contained in the document 204, where the hierarchical structure reflects the relationships between the different items of content. For example, a node representing a section of the document may be defined in the package model 1106 as a parent node of multiple child nodes representing the sub-sections within that section. In another example, a parent node representing a process stage may have associated child nodes representing process steps that make up the stage. These process step nodes may have associated child nodes representing control parameters (e.g., temperatures, fill levels, etc.), graphs, or tables associated with that step of the process.

As noted above, the conversion component 108 can organize the objects defined in the neutral model 1302 to conform to an ISA-88 standard for modeling or describing industrial processes in terms of plant facilities, plant areas, lines, equipment, devices, stages, steps, and other units of an industrial process. Applying this standardization to the neutral model 1302 yields the finalized package model 1106, which digitally represents the contents of the technology transfer document 204 as a contextualized hierarchical structure of nodes or objects. The resulting package model 1106 represents a digital technology transfer package for a given product to be produced by one or more of the manufacturing facilities defined in the innovator model 304.

Figure 14:
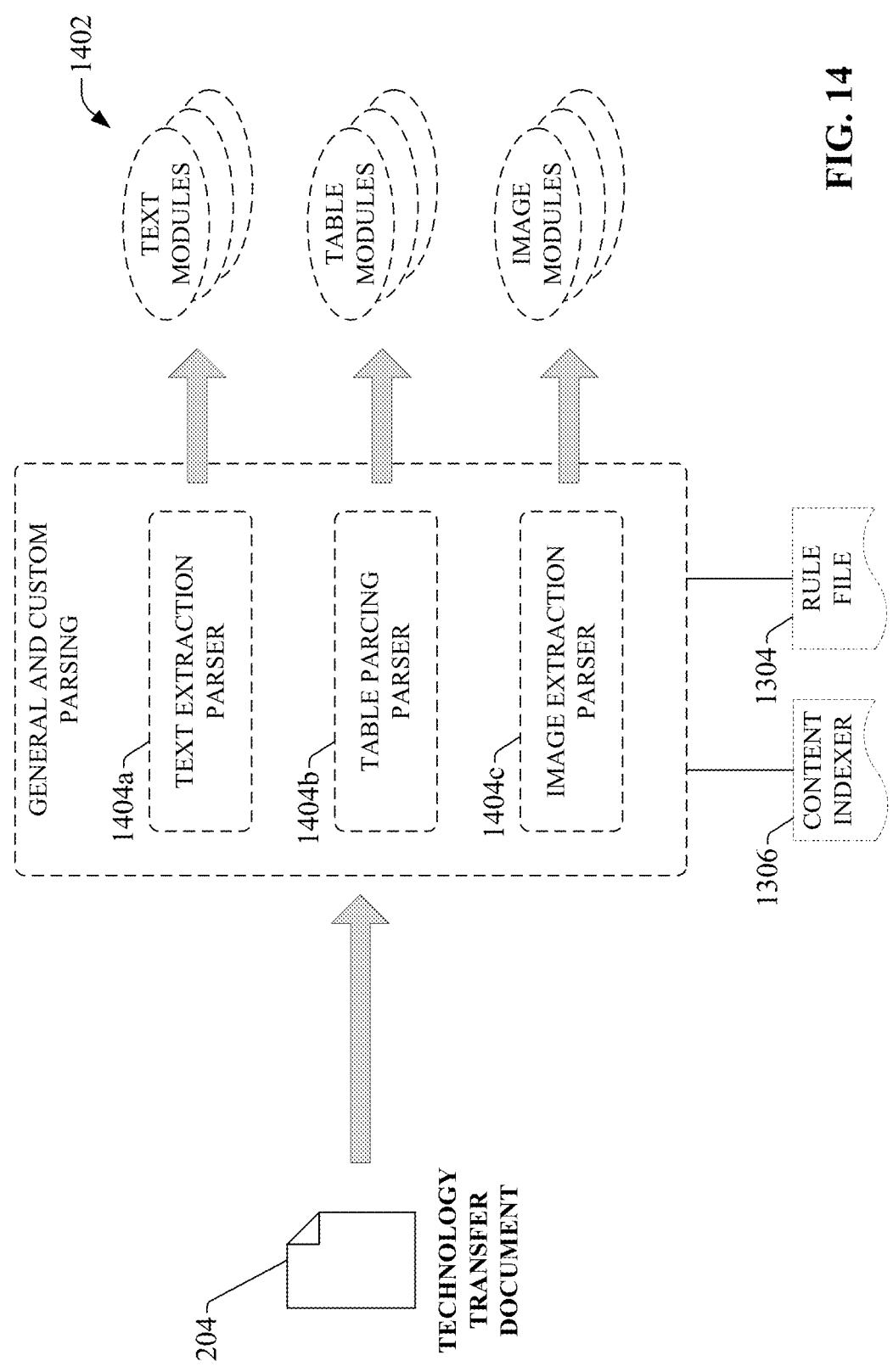
FIG. 14 is a diagram illustrating the modularized content extraction carried out by embodiments of the conversion component on an example technology transfer document.

The document parsing and content extraction carried out by the conversion component 108 is now described. FIG. 14 is a diagram illustrating the modularized content extraction carried out by embodiments of the conversion component 108 on an example technology transfer document 204. As noted above, the conversion component 108 can initially carry out a general parsing mechanism, applicable to all documents 204, that extracts text, tables, images, or other types of content from those documents 204. This general parsing subdivides content of the document 204 into modules 1402 representing the text, images, flow diagrams, tables, or other types of document content (for simplicity, only text, table, and image modules 1402 are illustrated in FIG. 14).

The general parsing carried out by the conversion component 108 uses modularized document parsers 1404 that are each specific to a type of content to be extracted (e.g., text, table, image, flow diagrams, etc.). Each modularized parser 1404 locates and extracts document content corresponding to its content type into respective sets of modules 1402, thereby sub-dividing the document 204 into type-specific modules 1402 (e.g., text modules, table modules, image modules, etc.). Each parser 1404 can use a set of extraction tools specific to its type of content. For example, the text extraction parser 1404*a* can use optical character recognition, natural language processing, or other such tools for recognizing and extracting text items from the document 204. The table extraction parser 1404*b* can use optical character recognition, table parsing and extraction applications, or other such tools to identify and extract tables from the document 204. The image extraction parser 1404*c* can use object detection, computer vision applications, image recognition applications, or other such tools to identify and extract images from the document 204.

Figure 15:
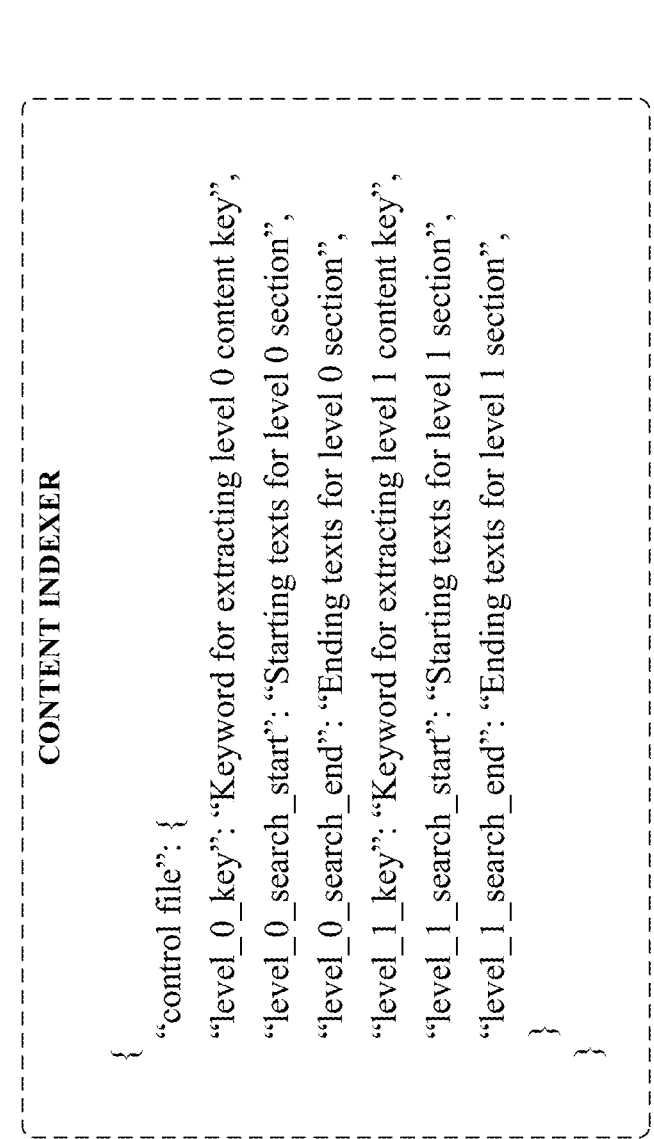
FIG. 15 is a segment of an example generalized content indexer.

The extraction processing carried out by the parsers 1404 is controlled and orchestrated by the content indexer 1306, which is a file or other type of software document that represents the range of content to be extracted from the document 204 and defines how to locate, within the document 204, each item of content—text blocks, images, tables, flow diagrams, etc.—that will be required to build the structured package model 1106. FIG. 15 is a segment of an example generalized content indexer 1306. In general, the content indexer 1306 defines the keywords of a corresponding key session (e.g., level_0_key, level_1_key, etc.), as well as the ranges of each key session from which content is to be extracted in terms of start text (e.g., level_0_search_start, level_1_ search_start, etc.) and end text (e.g., level_0_search_end, level_1_ search_end, etc.). Level designations (level 0, level 1, level 2, etc.) can delineate nested or hierarchical levels of content. For example, in the case of a manufacturing process comprising multiple stages, level 0 of a given section of extracted content may comprise text and figures describing a manufacturing process, level 1 may comprise text and figures describing a specific stage of the manufacturing process, and level 2 may represent content of one or more tables associated with the stage. These levels of content may be organized in hierarchical sections of the document 204, and the content indexer 1306 can be written to extract content from the document 204 to reflect this hierarchy.

The conversion component 108 executes the parsers 1404 on the document 204 as directed by the general parsing instructions defined by the content indexer 1306. That is, for each key defined in the content indexer 1306, the conversion component 108 will use the appropriate parser 1404 (or combination of parsers 1404) to extract the content from the range defined by the search_start and search_end designations associated with that key. In the case of text extraction, the search_start and search_end designations can be defined, for a given key, as respective strings of text within the document 204, with the search_start string being located before the search_end string. Based on this definition in the content indexer 1306, the conversion component 108 will extract the block of text starting with the search_start string and ending with the search_end string, and assign this resulting text module 1402 to the key in the neutral model 1302. The content indexer 1306 can specify the locations of images, tables, flowcharts, and other types of extractible content in a similar manner, and the conversion component 108 will use the appropriate parsers 1404 to extract the specified content as modules 1402. The modules 1402 are then used to build the neutral model 1302 and will ultimately be mapped to the structured package model 1106 (e.g., organized according to the ISA-88 standard or another suitable standard).

Figure 16:
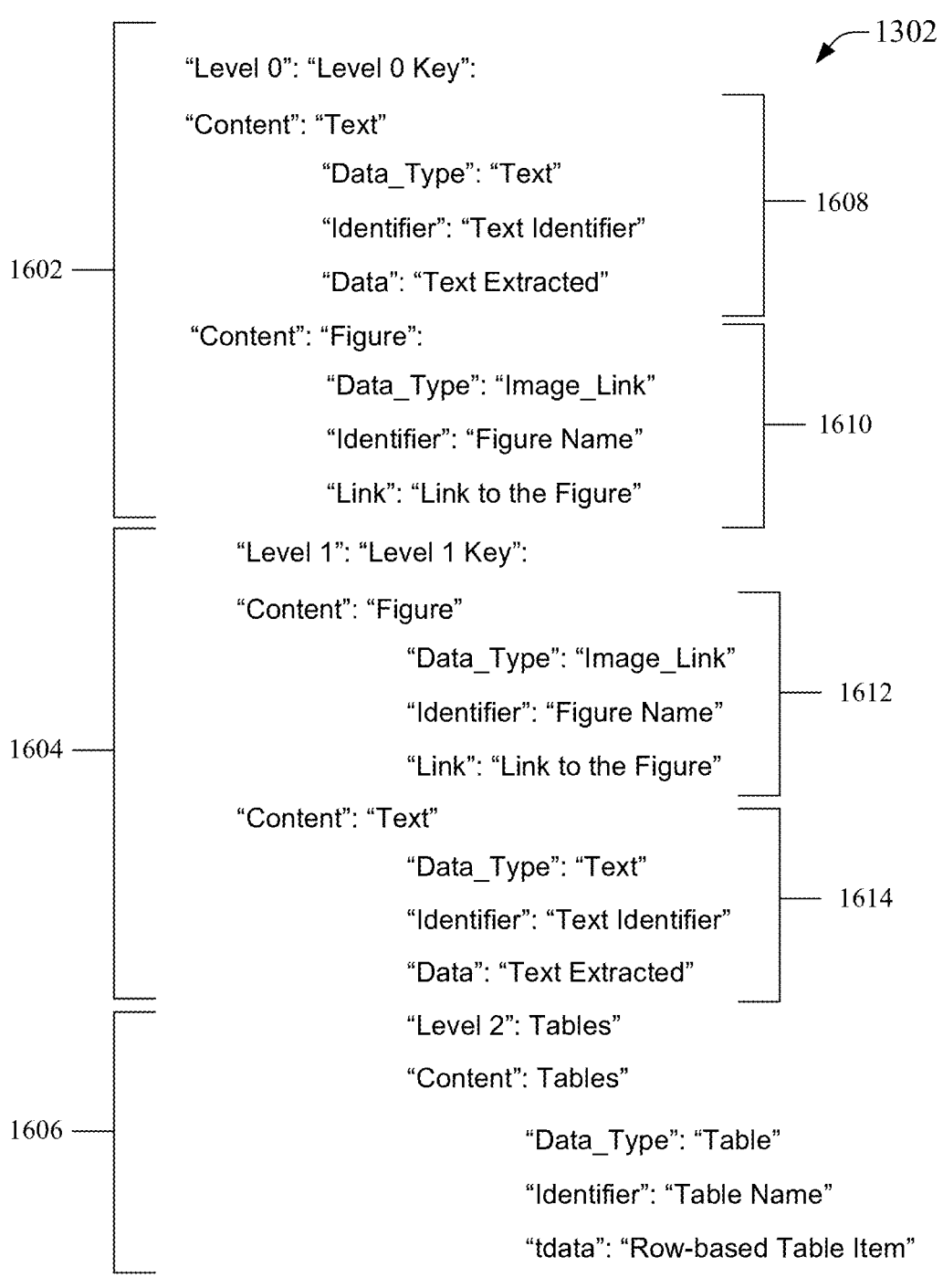
FIG. 16 is a portion of an example generalized neutral model generated by the conversion component based on general document parsing.

Under the orchestration of the content indexer 1306, the conversion component 108 performs general parsing of the document 204 to obtain the modules 1402 representing the text, images, flow diagrams, tables, or other types of document content (see FIG. 14) and generates the neutral model 1302 using these modules 1402 (see FIG. 13). FIG. 16 is a portion of an example generalized neutral model 1302 generated by the conversion component 108 based on the general document parsing. The neutral model 1302 may be formatted as a JSON file or another suitable format. The structure of the neutral model 1302 follows the level-based structure defined by the content indexer 1306.

The neutral model 1302 renders the modularized content in a page-based key to link text, tables, and figures together as needed to align the structure of the modularized content with that of the original document content. In the illustrated example, the neutral model 1302 comprises respective sections representing the hierarchical levels specified in the content indexer 1306. A level 0 section 1602—which may represent a high-level summary of a manufacturing process—is delineated by the level 0 keyword, below which is the modularized content extracted for that keyword by the general parsing (that is, the content of the modules 1402 extracted for the keyword). In the illustrated example, the level 0 section 1608 comprises a text section 1608 indicating the data type (text), an identifier for the extracted text content (e.g., "Summary"), and the extracted text content itself (the block of text located between the search_start string and the search_end string of the document 204 for the keyword, as specified by the content indexer 1306). The level 0 section 1608 also includes a figure section 1608 indicating the data type (image link), an identifier for the extracted figure, and a link to the extracted figure.

Below the level 0 section 1602 is a level 1 section 1604 (a child of the level 0 section 1602), which may represent a specific stage of the manufacturing process summarized by the level 0 section 1602. Similar to the level 0 section 1602, the level 1 section 1604 is designated by a level 1 keyword, and comprises a figure section 1612 specifying a data type and an identifier for a figure associated with the stage, as well as a link to the figure. The level 1 section 1604 also includes a text section 1614 a data type (text) and identifier for a text description of the stage, as well as the text description itself, as extracted from the document 204 based on the instructions defined in the content indexer 1306.

In this example, the stage represented by the level 1 section 1604 includes an associated table containing tabulated information about the stage (e.g., procedure descriptions, ingredients or chemicals involved, concentrations, process parameters or acceptable parameter ranges, etc.). Accordingly, a level 2 section 1606 is included below the level 1 section 1604 (that is, as a child of the level 1 section 1604) containing the modularized table information for the table. This level 2 section 1606 specifies the data type (tables) and an identifier for the table, as well as table data extracted from the table (designated as tdata). As with the other extraction levels, the content indexer 1306 can include instructions for locating the tables within the document 204 for level 2 extraction, and the information contained in the table section 1606 comprises the modularized table data extracted from the document 204 in accordance with the general parsing instructions contained in the content indexer 1306.

Although the examples described herein depict only three levels of extraction (levels 0-2), the content indexer 1306 can define any number of extraction levels as required for general parsing of documents 204.

Figure 17:
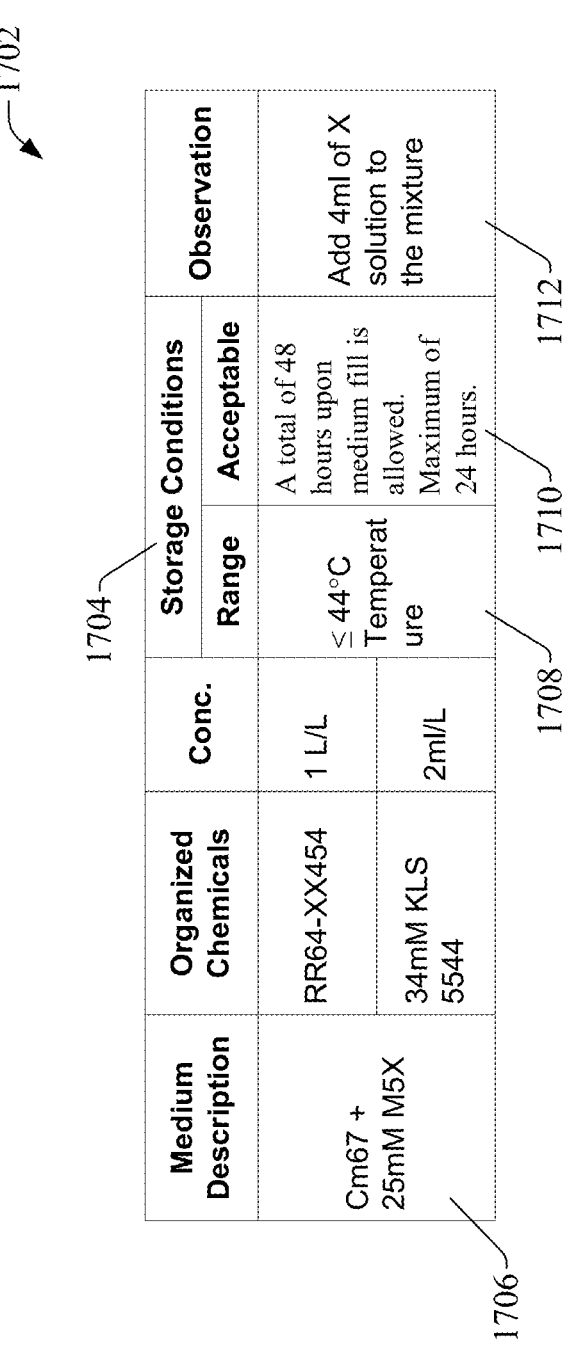
FIG. 17 is an example table illustrating customized cell merging.

The formatting of tables contained in technology transfer documents 204 may vary between in customer-specific documents 204, even in the case of tables that convey similar sets of information. For example, a given technology owner 202 may merge selected cells of the table in a customized manner, resulting in a unique table formatting. FIG. 17 is an example table 1702 illustrating customized cell merging. In this example, the table 1702 comprises columns for a description of a medium, organized chemicals that make up the medium, respective concentrations of the organized chemicals, a storage condition range for the medium, a description of acceptable storage conditions for the medium, and observation data. The table 1702 comprises merged cells, including a horizontally merged cell 1704 above the Range and Acceptable column header cells (serving as a common Storage Conditions header for the Range and Acceptable columns), and four vertically merged cells 1706, 1708, 1710, and 1712. Other tables conveying similar types of information found in other customers' document 204 may not conform to this same cell formatting, but instead may follow proprietary cell formatting preferred by those customers.

Moreover, different technology owners 202 may use different terminology to refer to the same concept or idea. For example, the word "process" and "procedure" may be used interchangeably by different technology owners 202. Also, some technology owners 202 may place the title of a table on the top of the table while others may place the title on the bottom or omit the title altogether.

Given these table formatting variations, a generalized parsing mechanism may not be suitable for extracting data from tables contained in a document 204. Accordingly, in addition to the general parsing described above, in which the content indexer 1306 is used to modularize the content of documents 204, the conversion component 108 can apply custom parsing rules to tables to extract document-specific table data that cannot be obtained using generalized parsing rules. These custom parsing rules are defined in one or more semantic rules files 1304.

FIG. 18 is an example semantic rules file 1304 that defines a set of global and customer-specific parsing rules for normalizing table formats and nomenclature prior to extracting data from the tables. In general, the semantic rules defined in the semantic rules file 1304 define directives for parsing tables that require additional modification in order to align with the target structure of the neutral model 1302. After performing general parsing of the document 204 to obtain content modules 1402, the conversion component 108 performs custom processing on the content of each extracted table based on the rules defined in the semantic rules file 1304, and maps the output of this custom parsing to the neutral model 1302.

As shown in the example depicted in FIG. 18, semantic rules file 1304 can define a set of global rules that define general table processing to be performed on all tables extracted from any document 204, regardless of the customer (technology owner 202) who provides the document 204. A given semantic rule can define how to process or transform the format or content of a cell or group of cells given a particular formatting or content condition found in the table. The semantic rules can include rules to be applied when merged cells are discovered (including rules specific to vertically merged cells, horizontally merged cells, or cells that are merged both horizontally and vertically), when specific words or terms are found within a cell (any cell in the table or a specified cell identified by the rule), or other such criteria. Rule conditions can also be defined as a set of multiple conditions that are to trigger application of the rule when all defined conditions are present in the table. Rules may also define how selected items of content from the table are to be mapped to the neutral model 1302.

An example rule can specify that, when merged cells are discovered in the table (either horizontally or vertically merged cells), the merged cell is to be unmerged into its component cells and the content of the original merged cell is to be duplicated across the resulting unmerged cells (see global rule (a) in FIG. 18). Another example rule may specify that each cell of column 1 of the table is to be represented in the neutral model 1302 as a parent object for the level 2 section, and the cells of the remaining columns corresponding to the column 1 cell are to be represented as children under the column 1 parent object (see global rule (b) in FIG. 18).

In addition to the global semantic rules, the semantic rules file 1304 can also define sets of customer-specific rules. Each set of customer-specific rules is defined for a specific technology owner 202 and will be applied only to tables extracted from documents 204 received from that technology owner 202. The customer-specific semantic rules for a given technology owner 202 are written to translate the cell formatting and nomenclature used by the technology owner 202 to a format that can be parsed and mapped to the schema of the neutral model 1302.

Two technology owners 202—Customer 1 and Customer 2—are represented in the example semantic rules file 1304 illustrated in FIG. 18. In this example, it is assumed that tables included in documents 204 provided by Customer 1 can be properly mapped to the neutral model 1302 by applying only the global semantic rules, and so the only customer-specific rule defined for Customer 1 is to inherit all global rules. In the case of Customer 2, the example semantic rules file 1304 defines separate sets of customer-specific rules for different types of tables (upstream and downstream). Similar to Customer 1, Customer 2 inherits all global rules. Additionally, two custom rules are defined for Customer 2's upstream tables. The first custom rule (rule 3b) specifies that, if the content of header cell of column 1 of the table equals the content of the header cell of column 2, the content of the header cell of column 1 is to be set to "Step." The second custom rule (rule 3c) specifies that if the content of the header cell of column 1 is empty and if the content of the header cell of column 2 is "Parameter," the content of the header cell of column 1 is to be set to "Step." The downstream rules for Customer 2 include the same rules used for upstream tables, as well as an additional rule specifying that, if the content of the header cell of column 1 is empty and the content of the header cell of column 2 is "Process Attribute," the content of the header cell of column 1 is to be set to "Step."

During the custom parsing step, each table (that is, each table module 1402) extracted from a technology owner's document 204 is translated and parsed according to the custom semantic rules defined for that technology owner in the semantic rules file 1304 (which may include both global semantic rules and customer-specific rules). The semantic rules specify how a customer-specific table is to be translated or converted so that the table's data can be mapped to the neutral structure of the neutral model 1302. In some embodiments, a single semantic rules file 1304 can contain the global rules and all customer-specific rules to be applied to incoming document 204. Alternatively, a separate semantic rules file 1304 can be created and stored for each technology owner 202 and applied to that customer's documents 204 as needed.

Figure 19:
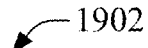
FIG. 19 is a look-up table defining example syntax that can be used for respective different elements of a custom rule defined in the semantic rules file.

In general, a semantic rule can be built using any combination of conditions (e.g., IF statements), logical operators (e.g., AND and OR operators), and actions (e.g., instructions to change the content of a specified cell of the table, instructions to unmerge cells that are horizontally and/or vertically merged in the table, etc.). To simplify the creation of semantic rules, some embodiments of the technology transfer system 102 can support a condensed rule definition coding standard that allows elements of a semantic rule—conditions, actions, table element identifiers, etc.—to be written using a condensed syntax. FIG. 19 is a look-up table 1902 defining example syntax that can be used for respective different elements of a custom rule defined in the semantic rules file 1304. As shown in this table 1902, each code element of a semantic rule is defined using a 2-, 3-, or 4-character code. In addition to logical operators AND, Or, and If, condensed codes are provided for table elements such as columns (Co), Column numbers (Con, where n is the column number), rows (Ro), row numbers (Ron, where n is the row number), tables (Tb), sub-tables (SuTb), text (Tx), headers (Hd), column or row names (Nm), and chapter names (CNm). Codes are also provided for actions to be applied to tables, selected table elements, or table cell content, including change (Ch), copy (Cp), delete (Del), drop (Dr), merge (Mg), move (Mv), rename (Rn), skip (Sk), and duplicate (Du). Codes are also provided for specifying parent-child relationships of selected items of table data, which will be reflected in the output neutral model 1302. These include codes for specifying children (Chd), parents (Pr), and grandchildren (Gch). Other miscellaneous codes can represent adjectives such as remaining (Re, to indicate remaining cells, rows, or columns) and multiple (Mu, to indicate multiple cells, rows, or columns), or verbs such as cover (Cv, to indicate a scenario in which one table element covers another).

A semantic rule can be defined in the semantic rules file 1304 as a string of these codes selected from the look-up table 1902. The conversion component's interpreter can read and decipher this string of codes and apply the equivalent rule to the table being processed. For example, a rule specifying that cell content of columns and rows is to be duplicated when merged can be written as DuCoRoMg which is a string comprising the codes for Duplicate (Du), Column (Co), Row (Ro), and Merge (Mg). A similar rule specifying only that cell content of rows (but not columns) is to be duplicated when merged can be written as DuRoMg In another example, a rule specifying that the first column of the table is to be dropped if the first column covers the header row and the rest of the rows can be written as If-Co1Cv-Th-Dr In this example, different clauses of the rule are separated by hyphens (or another type of delineator) such that the string follows the general format If-[if-condition]-Then-[action].

In yet another example, a rule can specify that, if the first column of the table contains the names "Column Information" and "Column Qualification," then this column is to be moved to the end of the table and its header renamed as "Info." This rule can be written using the condensed codes as If-Co1-Eq-Column Information-AND-Column Qualification-Th-MvEnRn-Info As shown in this example, arguments or variables—such as the cell content that is to trigger a rule ("Column Information" and "Column Qualification" in the present example) or text that is to be written to a cell (such as "Info" in the present example) can be inserted into the rule string between the appropriate codes.

Another example rule can specify that, if the header of column 1 of the table is empty and the header of column 2 contains the word "Parameter," the header of column 1 is to be populated with the word "Step." This rule can be encoded as If-Co1Hd-Eq-Null-AND-Co2Hd-Eq-Parameter-Th-ChCo1Hd-Step As shown in this example, the header of a column can be identified using this condensed notation by combining the codes for the column (Con, where n is the column number) with the header code (Hd). Similar notation can be used to identify row headers within a semantic rule.

Each semantic rule defined in the semantic rules file 1304 can be written using this nomenclature to simplify creation of custom parsing rules for tables. If a given table type requires application of multiple semantic rules to properly translate and map the table data to the neutral model 1302, the rules can be written in the file 1304 in the order in which they should be applied to the tables, and the conversion component 108 will sequentially apply each rule to the table in the designated order. A sequential application of two example semantic rules is illustrated in FIGS. 20 and 21. FIG. 20 is a diagram illustrating application of a first example semantic rule defined in the semantic rules file 1304 to the example customer-specific table 1702 depicted in FIG. 17, as part of the custom parsing phase of the document conversion process. In this example, the semantic rule specifies that, if any of the column names have multiple rows, the cell texts are to be merged to create the new column names. This rule is notated using the condensed notation described above in connection with FIG. 19, and so is written as:

If-CoNmMuRo-Th-MgTxCoNm which conveys that if (H) a column name (CoNm) has multiple rows (MuRo), then (Th) merge the cell text (Mg) to create new column names (CoNm).

In the original version of the table 1702a extracted from the document 204, the two Storage Conditions columns comprise column names having two rows—a first row comprising two horizontally merged cells and containing the name Storage Conditions, and a second row comprising two individual cells containing the names Range and Acceptable, respectively. These two columns therefore satisfy the IF condition of the semantic rule. Accordingly, for each of these columns, the conversion component 108 merges the names contained in the two rows to yield a combined row name, as shown in the translated version of the table 1702b.

FIG. 21 is a diagram illustrating application of a subsequent second semantic rule to the table 1702. In this example, the semantic rules file 1304 specifies that the two rules depicted in FIGS. 20 and 21 are to be applied sequentially, so that after the first rule is applied to the original version of the table 1702a to yield the translated table 1702b, the second rule is applied to the resulting translated table 1702b to yield a final translated table 1702c.

21

The second semantic rule specifies that, when cells are merged, the content of the merged cell is to be duplicated for the resulting unmerged cells, in the case of both rows and columns. This is written using the condensed notation as DuCoRoMg which instructs the conversion component 108 to duplicate (Du) cell content for both columns (Co) and rows (Ro) when merged (Mg).

The previously translated table 1702*b* to which this rule is being applied comprises four vertically merged cells under the Medium Description, Storage Conditions Range, Storage Conditions Acceptable, and Observation columns, respectively. In accordance with the rule, the conversion component 108 unmerges each of these merged cells into their component cells and duplicates the content of the original merged cell in each of the resulting unmerged cells, as shown in the final translated version of the table 1702*c*.

To ensure that the semantic rules defined in the semantic rules file 1304 accurately extract and map data from each document type to the structured neutral model 1302, the system 102 can support a human-in-the-loop validation process for new document types to incrementally improve the accuracy of the data parsing based on human input. Prior to submission of a new type of document 204—e.g., a document 204 from a new technology owner 202—any custom semantic rules that may be necessary to parse tables contained in the new document 204 are written and added to the semantic rules file 1304 (or to a new semantic rules file 1304 created for the technology owner 202). When the new document 204 is submitted, the general parsing process described above (based on the content indexer 1306) extracts and modularizes the content of the document 204, and the general parsing process uses the semantic rules to parse any table data extracted from the document 204. The extracted data is mapped to the neutral model 1302—which may be organized in accordance with the ISA-88 standard or another industrial standard—and visualized for review by a human user (e.g., by the user interface component 104). If the user determines, based on visual inspection, that the content of the neutral model 1302 includes errors—e.g., incorrectly extracted data, data that was not mapped to the correct level or node within the neutral model structure, etc.—the user can edit the semantic rules as needed to correct the extraction issue. These corrections can be made in consultation with the technology owner 202 to ensure that the necessary information is being extracted from their document structure and correctly mapped to the target neutral model 1302. The new document 204 can then be re-parsed using the modified rules and the results inspected. This correction process can be repeated as needed until the user visually confirms that the document 204 is being correctly mapped to the neutral model 1302. The finalized semantic rules can then be stored for use by the conversion component 108 in connection with parsing future documents 204 submitted to the system 102 by the technology owner 202.

FIG. 22 is a segment of an example neutral model 1302—e.g., an expanded level 2 section 1606 (see FIG. 16)—containing table data that was extracted from a table within a document 204 using the custom parsing described above. As noted above, this level 2 section can be organized within the neutral model 1302 as a child section of a level 1 section (representing, for example, a stage of a manufacturing process), which itself is a child of a level 0 section (representing the manufacturing process itself). As can be seen in this example, the parsed table data—including column and/or row header names, keywords, and cell content—has been mapped to respective positions within the organized structure of the neutral model 1302. Data items extracted from the table's cells can be organized to reflect their locations within the table (as translated by the semantic rules), such that each data item is correctly associated with the header names of the column and row in which the content is located.

Using the combination of general parsing that is applicable to documents 204 across different customers (orchestrated by the content indexer 1306) and custom parsing based on customer-specific semantic rules that parse and map table data that cannot be parsed in a generalized manner, the technology transfer system 102 can translate a wide range of document styles and formats from different technology owners 202 without the need to create a custom parser for each different document style. This approach reduces the dependency on custom-built parsers by integrating both custom and general parsing mechanisms into a scalable parser orchestration engine.

Returning to FIG. 13, the conversion component 108 organizes the extracted and modularized document content—modules 1402 representing extracted text, images, and table data—into the target neutral model 1302. In some embodiments, the general and custom parsing and data extraction can organize the modularized data content within the neutral model 1302 according to a required standard, such as ISA-88. Alternatively, if further formatting of the neutral model 1302 is required to standardize the model, the conversion component 108 can perform a standardization processing on the neutral model 1302 to obtain the structured package model 1106.

Returning to FIG. 11, the resulting contextualized package model 1106 is then partitioned and integrated into the innovator model 304 in accordance with distribution information 1102 submitted by the technology owner 202. Once the package model 1106 has been generated, the technology transfer system 102 allows the technology owner 202 to identify which of the available manufacturing facilities defined in the innovator model 304 are to be assigned to carry out the respective process stages or steps represented in the package model 1106. Integration of one or more package models 1106 into the innovator model 304 yields the aggregate hierarchical model 208 (see FIG. 2)

Figure 23:
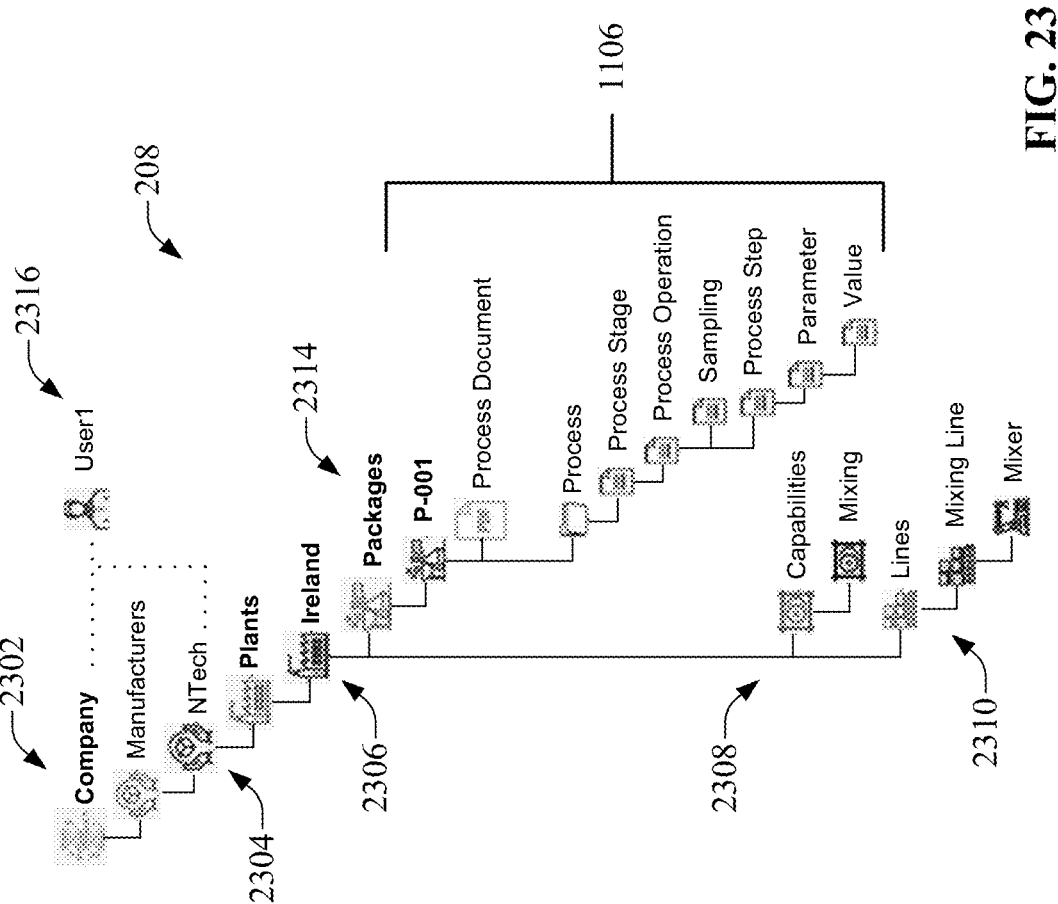
FIG. 23 is a hierarchical representation of an example aggregate model comprising an innovator model into which a package model representing a technology transfer document has been integrated.

FIG. 23 is a hierarchical representation of an example aggregate model 208 comprising an innovator model 304 into which a package model 1106 has been integrated. As described above, the innovator model 304, which serves as the basis for the aggregate model 208, comprises a parent node 2302 representing the technology owner 202 (Company), below which are a number of manufacturer nodes 1404 representing manufacturing entities 214 that were defined as having a business relationship with the technology owner 202 using configuration displays 602 and 702. Although only a single manufacturing node 2304 is depicted in FIG. 23 for clarity, the model 208 may comprise multiple manufacturers nodes 2304 defined in the Manufacturers layer. Below each manufacturer node 2304 are one or more plant nodes 2306 representing plant facilities that are owned and managed by the corresponding manufacturer. In some scenarios, the plant node 2306 may be named after the country, state, or city in which the plant facility is located.

Each plant node 2306 has an associated Capabilities layer 2308 that defies, as child nodes, in-plant capabilities supported by the corresponding plant (e.g., mixing, machining, packaging, etc.). A Line layer 2310 under each plant node 2306 comprises child nodes representing the production lines in operation within the plant facility, and which support the capabilities defined under the Capabilities layer 2308. The production line nodes under the Lines layer 2310 can comprise child nodes representing items of equipment (e.g., mixers) that make up each production line. In some embodiments, the system 102 can set information about a given plant's manufacturing capabilities or production lines based on analysis of plant documentation uploaded to the system 102, such as plant capability documents or line layout drawings.

Technology transfer system 102 allows a technology owner 202 to assign technology package information, as represented by the contextualized package model 1106, to selected plants defined in the model 208. To this end, each plant node 2306 defined in the model 208 can have an associated Packages layer 2314, below which one or more technology transfer packages—represented by package model 1106—can be created. Within the context of the model 208, a technology transfer package comprises the hierarchical structure of nodes defined by the contextualized package model 1106, which itself represents a technology transfer document 204. Once the conversion component 108 has translated a technology transfer document 204 to a hierarchical package model 1106 as described above, the technology owner 202 can selectively assign the resulting package model 1106 to one or more plants defined in the larger hierarchical model 208. Typically, the selected plants will belong to manufacturing entities 214 who will be contracted to execute one or more of the manufacturing process stages or steps described in the document 204.

In an example workflow, the user interface component 104 can render, on a client device associated with an authorized representative of the technology owner 202, a browsable representation of the innovator model 304 that allows the representative to browse the available manufacturers, their plant facilities, and the lines and capabilities of those facilities. The representative can then selectively assign a package—represented by package model 1106—to a selected one or more of the plant facilities. Based on this selective association, the system 102 integrates the package model 1106 into the larger innovator model 304 by adding the hierarchical structure of the package model 1106 to the Packages layer 2314 of the selected plant, yielding the aggregate model 208. As shown in FIG. 23, the package is represented by a parent node identifying the package (e.g., "P-001") below which are nodes representing the process document for the product represented by the package as well as the process for manufacturing the process. The Process Document node represents documentation describing the product, as obtained from the original technology transfer document 204, and may comprise child nodes (not shown in FIG. 23) representing various sections and subsections of the descriptive portions of the document 204. Below the Process node are child nodes representing one or more stages of the manufacturing process for producing the products. A given stage may comprise one or more operations, which are also represented as child nodes below the Process Stage node. Process steps that make up a given operation of the process stage are also represented as child nodes below the Process Operation node. Any control parameters (e.g., temperatures, pressures, etc.) associated with a given process step are represented as child nodes below the Process Step node. At least some of this information—e.g., process parameters and values, descriptions of the process step, acceptable value ranges for different parameters, etc.—can comprise table data extracted from tables within the original document 204 using the custom parsing mechanism described above. Other informational entities contained in the original document 204, such as flow diagrams or charts, can also be represented as nodes of the package. The package has been assigned to a plant facility located in Ireland, and consequently the package model 1106 has been added below the plant node 1406 corresponding to that plant.

In general, each package encapsulates the contents of a given technology transfer document 204 as a digital structure formatted in accordance with an industrial standard, such as ISA-88. The nodes of the package model 1106 can be expanded to view the processes steps, stages, and parameters that make up the package, and which convey to the manufacturing entities 214 the recipes and processes for manufacturing the product represented by the document 204.

Although FIG. 23 depicts a single package that has been assigned in its entirety to a single plant (Ireland), any number of packages representing translated documents 204 can be submitted to the system 102 and assigned to one or more plants. Moreover, a given package may be partitioned among multiple different plants if different stages of the package's manufacturing process are to be carried out at different plant facilities. In such scenarios, the user can reference information in the Capabilities layer 1408 for each plant to determine whether a given plant has the necessary capabilities for carrying out a particular operation or stage of the manufacturing process. In some embodiments, the system 102 can verify that each operation of the package has been assigned to a plant whose capabilities satisfy the requirements of the operation. In response to determining that the technology owner 202 has attempted to assign a process operation or stage requiring a capability (e.g., mixing) to a plant that does not support that capability, the user interface component 104 can render a warning or notification that the selected plant may not be capable of carrying out the operation.

Figure 24:
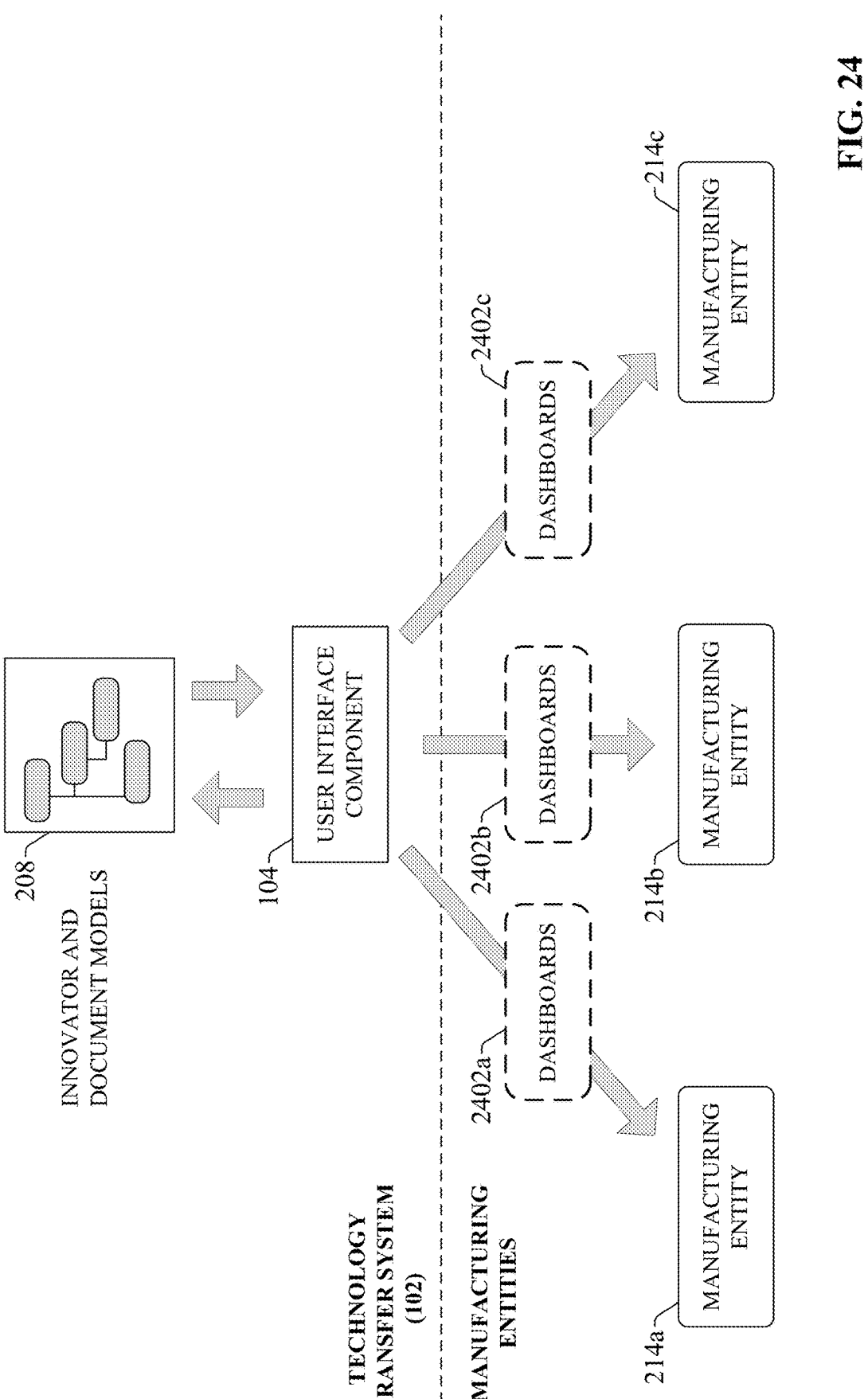
FIG. 24 is a diagram illustrating the multi-tenant architecture of the technology transfer system whereby users associated with different manufacturing entities are permitted their own role-specific views of the data contained in an aggregated innovator and document model.

The system 102 permits various types of users to view and interact with the model 208 in different ways based on the role-specific access permissions defined using interface 802 as described above, and further based on their entity affiliations. For example, users 2116 that are affiliated with the technology owner 202 (represented by company node 2302) can access all data below the company node 2302, including data associated with multiple different manufacturing entities that have a business relationship with the technology owner 202. By contrast, users affiliated with a given manufacturing entity 214 can only access data under their own manufacturer node 2304, while being prevented from accessing data associated with other manufacturers. FIG. 24 is a diagram illustrating the multi-tenant architecture of the technology transfer system 102, whereby users associated with different manufacturing entities 214 are permitted their own role-specific views of the data contained in the model 208, which are presented via dashboards 2402 generated by the user interface component 104. Since there may be a one-to-many relationship between a technology owner 202 and the manufacturing entities 214 contracted to manufacture product for the technology owner 202, users associated with each manufacturing entity 214 defined in the model 208 are permitted to view and interact with limited sections of the model 208.

Figure 25:
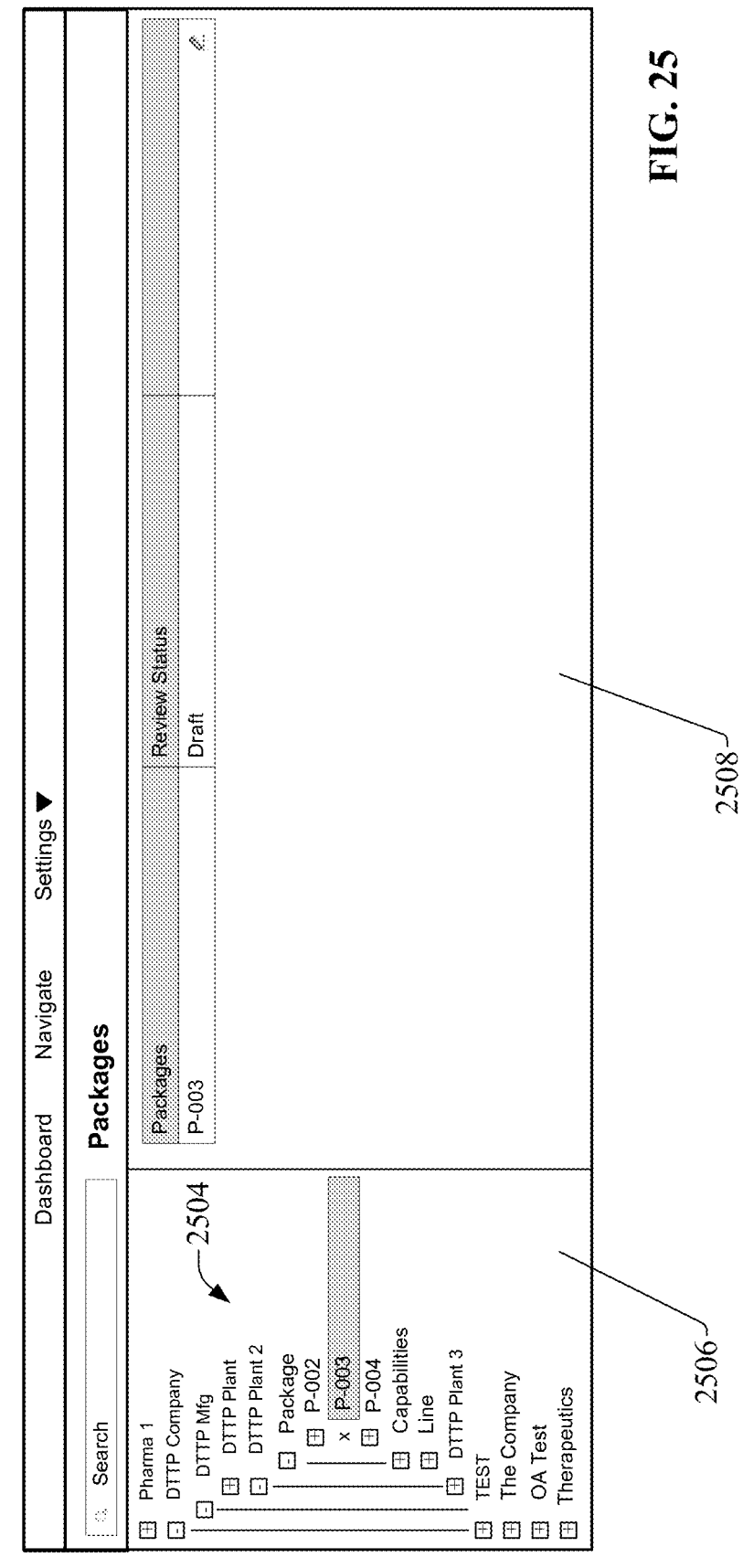
FIG. 25 is an example dashboard interface that can be generated by the technology transfer system for browsing package data and other elements of the model.

The user interface component 104 can render entity- and role-specific dashboards 2402 or other types of user interfaces to client devices associated with users affiliated with respective manufacturing entities 214, or with the technology owner 202. These dashboards allow a user to browse portions of the model 208, including components of the package model 1106, that are within the scope of the user's defined access permissions. The dashboards 2402 also allow the user to interact with or edit portions of the model 208 to a degree permitted by the user's role and entity affiliation. FIG. 25 is an example dashboard interface 2502 that can be generated by user interface component 104 for browsing package data and other elements of the model 208. This example interface 2502 comprises a navigation window 2506 that renders a navigation tree 2504 comprising the hierarchical structure of elements (manufacturers, plants, packages, etc.) defined by the model 208. Navigation tree 2504 serves as a visualization of the model 208 that has been filtered or customized based on the user's access permissions. For example, if the user is affiliated with the technology owner 202, all nodes and data of the model 208 are visible and accessible via navigation tree 2504. Alternatively, if the user is affiliated with a manufacturing entity 214, the navigation tree 2504 may only reflect the portion of the model 208 relating to the user's affiliated manufacturing entity 214.

Selecting a node of the navigation tree 2504 causes summary information for packages associated with the selected node to be displayed in a results window 2508. In the illustrated example, the user has selected package P-003, which has been assigned to a plant DTTP Plant 2 owned by manufacturing entity DTTP Mfg. This causes information about the selected package P-003 to be displayed in the results window 2508. The results rendered in window 2508 can depend on the level of the tree 2504 that is selected. For example, selection of a node representing a manufacturing entity or plant facility causes all packages assigned to that manufacturer or plant to be displayed in window 2508.

As will be described in more detail below, once a technology transfer document 204 for a new package has been translated to a contextualized package model 1106 and integrated into the aggregate model 208, the technology transfer system 102 can manage editing, version control, approval, and sign-off for the package. Accordingly, the summary information for the selected package displayed in the results window 2508 includes the current review status of the selected package. At various stages of the package's lifecycle, the package may transition through such statuses as "Draft," "In Review," "Rejected," "Accepted," or "In Production." System 102 provides tools for package reviewers to view packages that are currently in review, to submit their approval or rejection of the package, and to share comments or proposed edits with other reviewers. The status of the package is updated in accordance with these interactions.

Figure 26:
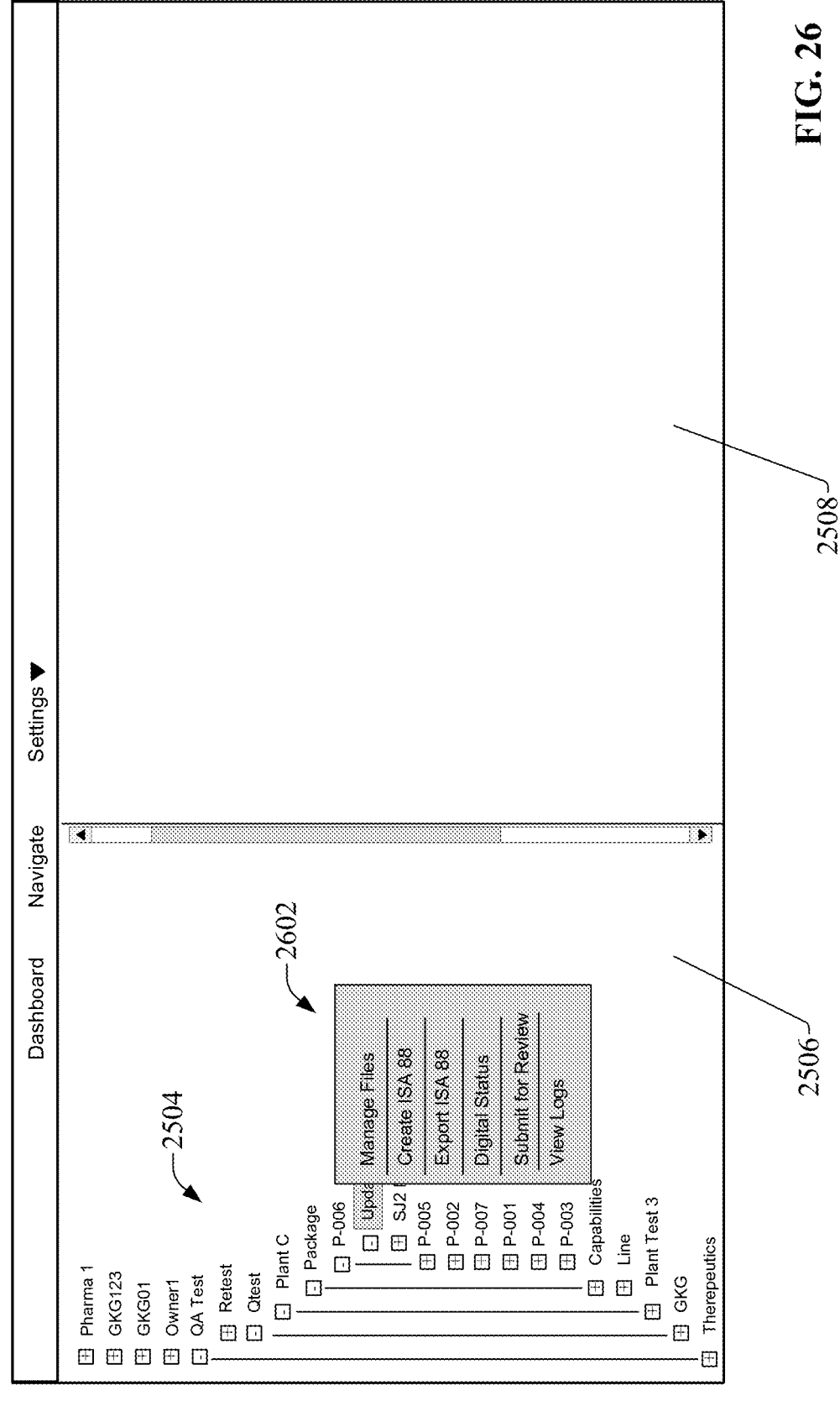
FIG. 26 is another view of the dashboard interface illustrating submission of a package for review.

FIG. 26 is another view of interface 2502 illustrating submission of a package for review. A package that has been submitted to the system 102 and integrated into model 208 can be assigned to a designated set of reviewers, and the package is only permitted to be put into production after all reviewers have approved a finalized version of the package. To initiate the review process, an administrator can invoke a menu window 2602 via interaction with the node representing the package (e.g., P-006). Menu window 2602 lists various selectable actions relating to the package, including file management, exporting the package's hierarchical model, invoking the digital status of the package, or invoking a log of interactions with the package. The menu window 2602 also includes a selection for submitting the package for review, selection of which places the package in "Review" status. When the package is submitted for review, the system 102 (e.g., the package management component 116) can send notifications directed to users who have been designated to review the package. Package reviewers can be identified as users whose user role affords permission to approve a package, as defined using the Access Permissions configuration control panel 804 (see the Package section of the control panel 804 illustrated in FIG. 8*a*). The reviewers may also have been expressly assigned to review the package in some scenarios. The notification informs the reviewers that the new package is available for review.

Figure 27:
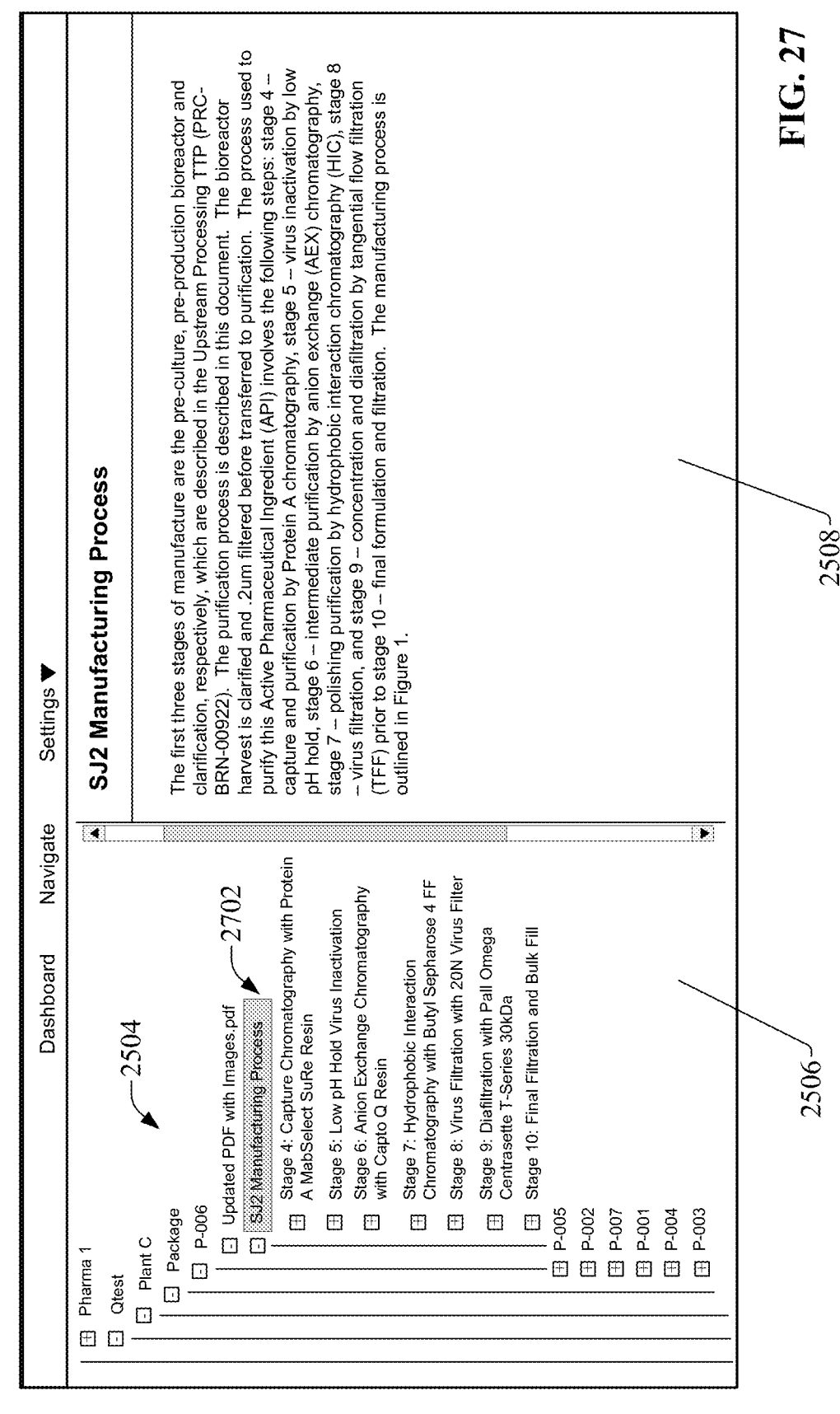
FIG. 27 is a view of the dashboard interface in which a section of a package has been selected for review.

Designated users can review content of the package by browsing the navigation tree 2504 and selecting nodes representing sections of the package. FIG. 27 is a view of interface 2502 in which a section of a package has been selected for review. As shown in this view, a selected package (e.g., P-006) can be expanded in the navigation tree 2504 to reveal a hierarchical organization of nodes representing the package's content, including the stages and steps that make up the manufacturing process for the package. The package nodes correspond to sections of the original technology transfer document 204, and the arrangement of these nodes reflects the hierarchical model 1106 of the package (see FIG. 23) generated from the original document 204. In the example depicted in FIG. 27, selection of the P-006 package node has expanded the package model to review a manufacturing process node 2702 (SJ2 Manufacturing Process), below which are nodes representing the various stages that make up this process. Selection of the manufacturing process node 2702 causes a description of the process to be displayed in the results window 2508. This description is drawn from the original technology transfer document 204 and was extracted from document by the conversion component 108 during the document translation process described above.

Figure 28:
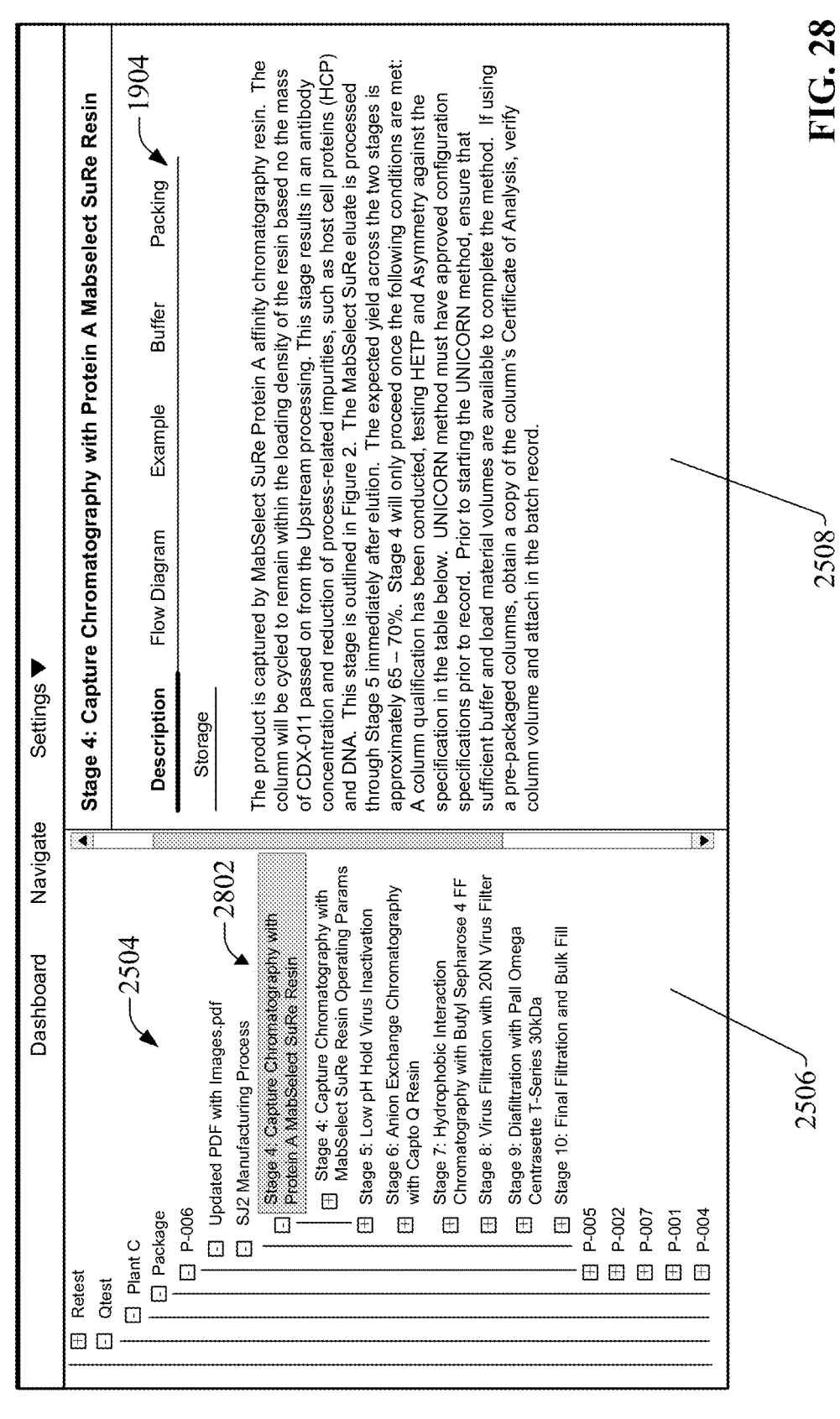
FIG. 28 is a view of the dashboard interface when one of the stage nodes is selected.

FIG. 28 is a view of interface 2502 when one of the stage nodes is selected. In this example, the user has selected the node 2802 corresponding to Stage 4 of the manufacturing process. Selection of this Stage node 2802 causes detailed information about the corresponding stage to be displayed in the results window 2508. If more than one type of information is associated with the selected stage, the results window 2508 displays a set of category tabs 2804 representing the different types of information available. Example types of information that can be associated with a selected stage of a manufacturing process can include, but are not limited to, a description of the stage; flow diagrams, charts, or tables associated with the stage; illustrative examples; control parameters for the stage; or other such information. Selection of one of the category tabs 2804 causes the information associated with the selected category to be displayed in the results window 2508.

Figure 29:
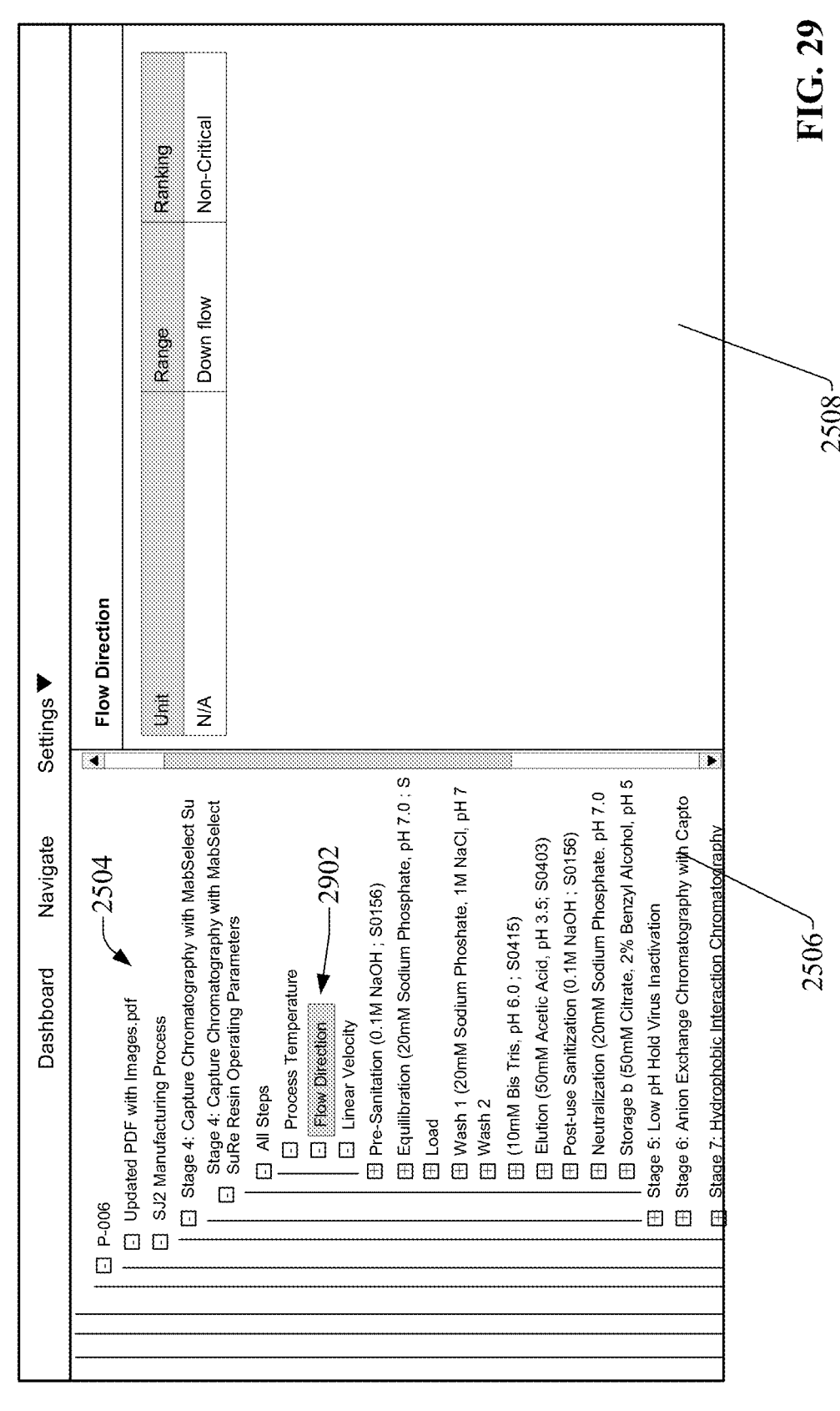
FIG. 29 is another view of the dashboard interface in which the user has navigated further down into the selected stage of the manufacturing process.

FIG. 29 is another view of interface 2502 in which the user has navigated further down into the selected stage of the manufacturing process. Selecting a Stage node 2802 in the navigation tree 2504 can expand the node to reveal one or more Step nodes 2902 representing the steps that make up the stage. Selection of one of these Step nodes 2902 causes detailed information about the selected step to be displayed in the results window 2508. Step information that can be displayed in this manner can include, but is not limited to, a natural language description of the step as well as process or control parameters for the step (e.g., process temperatures, flow directions, linear velocities, pH levels, mixing rates, mixing times, conductivities, paus times, etc.). This information can be used by the manufacturing entity 214 to configure its control devices and machines to execute the manufacturing process described by the document 204. Some of this step information can be obtained from tables that were included in the original technology transfer document 204, and which were identified by the conversion component 108 as containing relevant process parameters for the corresponding step.

Since the navigation tree 2504 reflects the hierarchical structure of the underlying model 208, the tree 2504 conforms to the industrial standard (e.g., ISA-88) in which the model 208 is formatted. This allows a user familiar with the industrial standard to easily browse and locate element of interested within the tree 2504 by navigating a standardized organization of hierarchical layers (e.g., industrial enterprise, plant, area, production line, machine, device, etc.).

Figure 30:
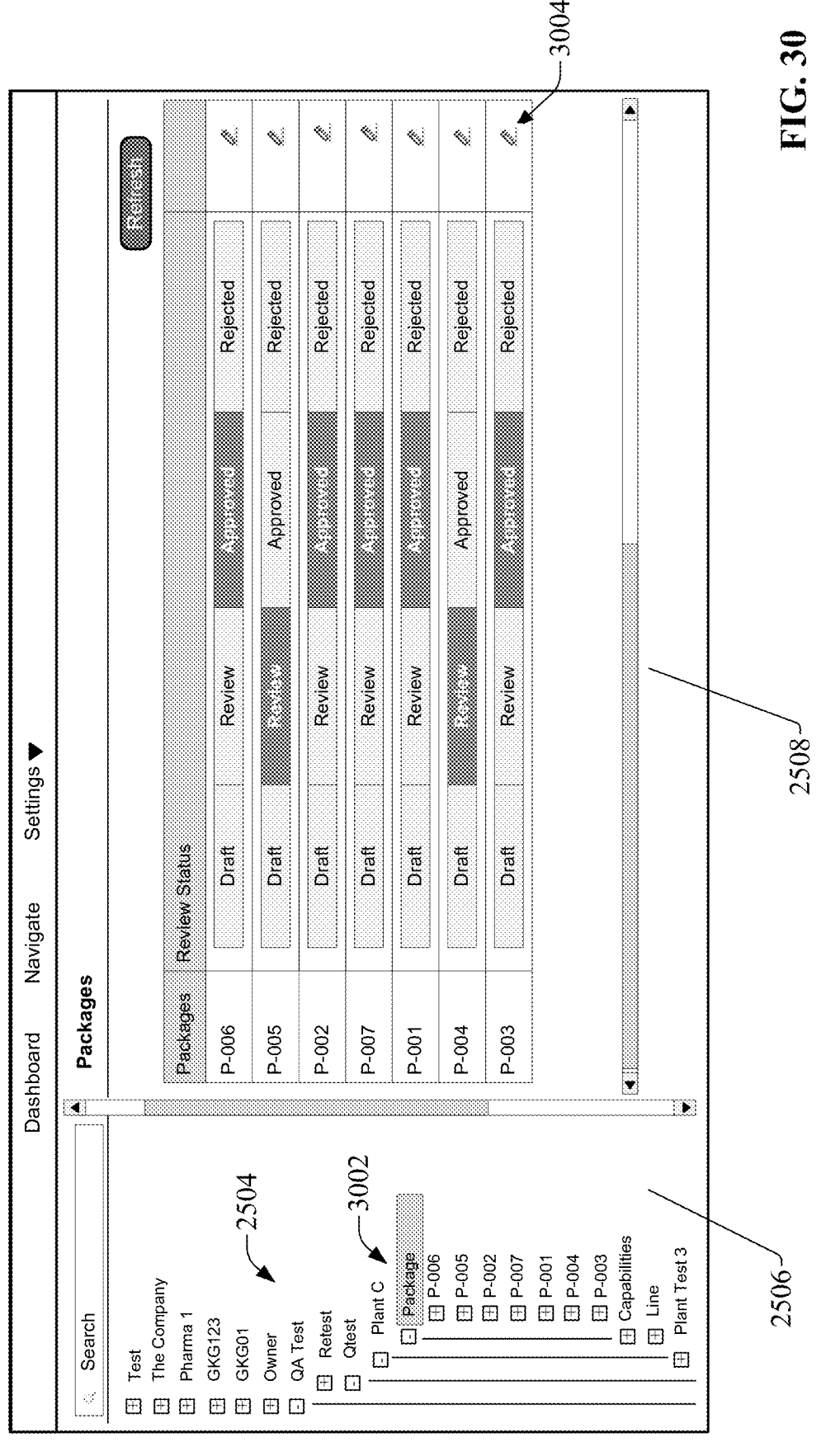
FIG. 30 is a view of the dashboard interface in which aggregate review statuses of multiple packages are displayed.

During the review phase, the reviewers can browse the content of the package as described above and submit results of their review—e.g., approved or rejected—to the system 102, which tracks the review status of each submitted package. FIG. 30 is a view of interface 2502 in which aggregate review statuses of multiple packages are displayed. In this example, selection of a Packages node 2102 below a selected plant facility (e.g., Plant C) in the navigation tree 2504 causes a list of active packages associated with plant to be displayed in the results window 2508, together with each package's current review status (e.g., Draft, Review, Approved, or Rejected). In some configurations, the package management component 116 may assign an Approved status to a package only if all designated reviewers of the package have submitted an Approved status for the package. If one or more designated reviewers submits a Rejected status for the package, the package management component 116 assigns a Rejected status to the package. In some embodiments, a reviewer can submit his or her review status via interaction with the review status display illustrated in FIG. 30; e.g., by selecting an edit icon 3004 next to the relevant package to invoke a status submission window.

In some embodiments, reviewers may also attach comments or submit edits to selected portions of the package via interaction with interface 2502. Once submitted, these comments or edits can be viewed by other reviewers. Example comments or edits can include, for example, correction of errors found in the recipe or manufacturing process for the product, concerns regarding clarity or accuracy of images that are associated with the package or its manufacturing process, or other such submissions.

Figure 31:
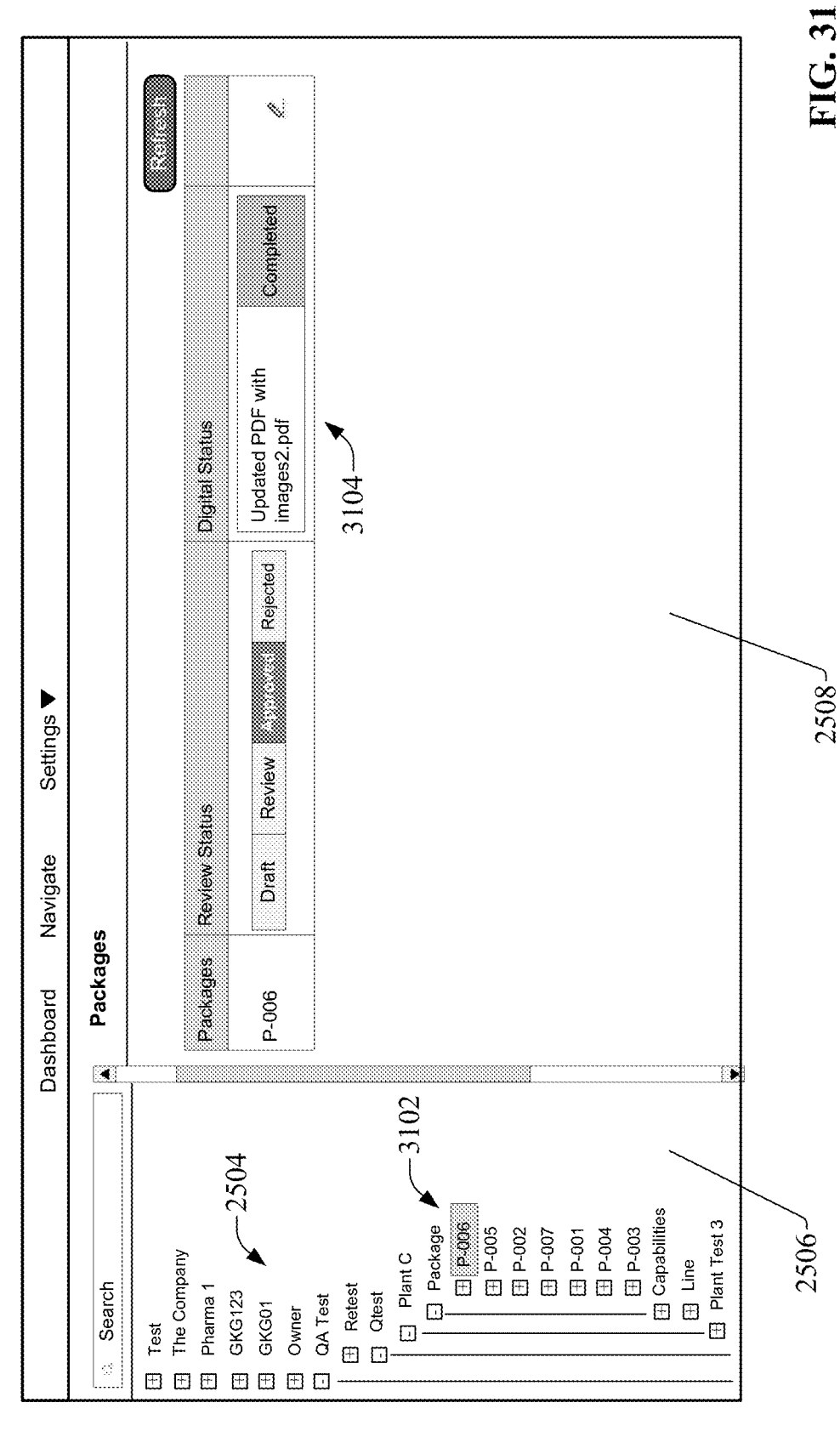
FIG. 31 is a view of the dashboard interface in which the user has selected a specific package node in the navigation tree.

FIG. 31 is a view of interface 2502 in which the user has selected a specific package node 3102 in the navigation tree 2504, which causes review status information for the selected package to be displayed in the results window 2508. In addition to displaying the current review status of the selected package, the results window 2508 also displays a document selection control 3104 that allows the user to open and view the original technology transfer document 204 that was submitted for the package.

Once a package has passed all reviews and received Approved status, the technology transfer system 102 can make the approved package available to the designated plant facilities for use in manufacturing the corresponding product. In some scenarios, this may involve making the package accessible to users of other user roles (e.g., plant managers, engineers, operators, etc.) who are responsible for putting the product into production at the plant facility.

Figure 32:
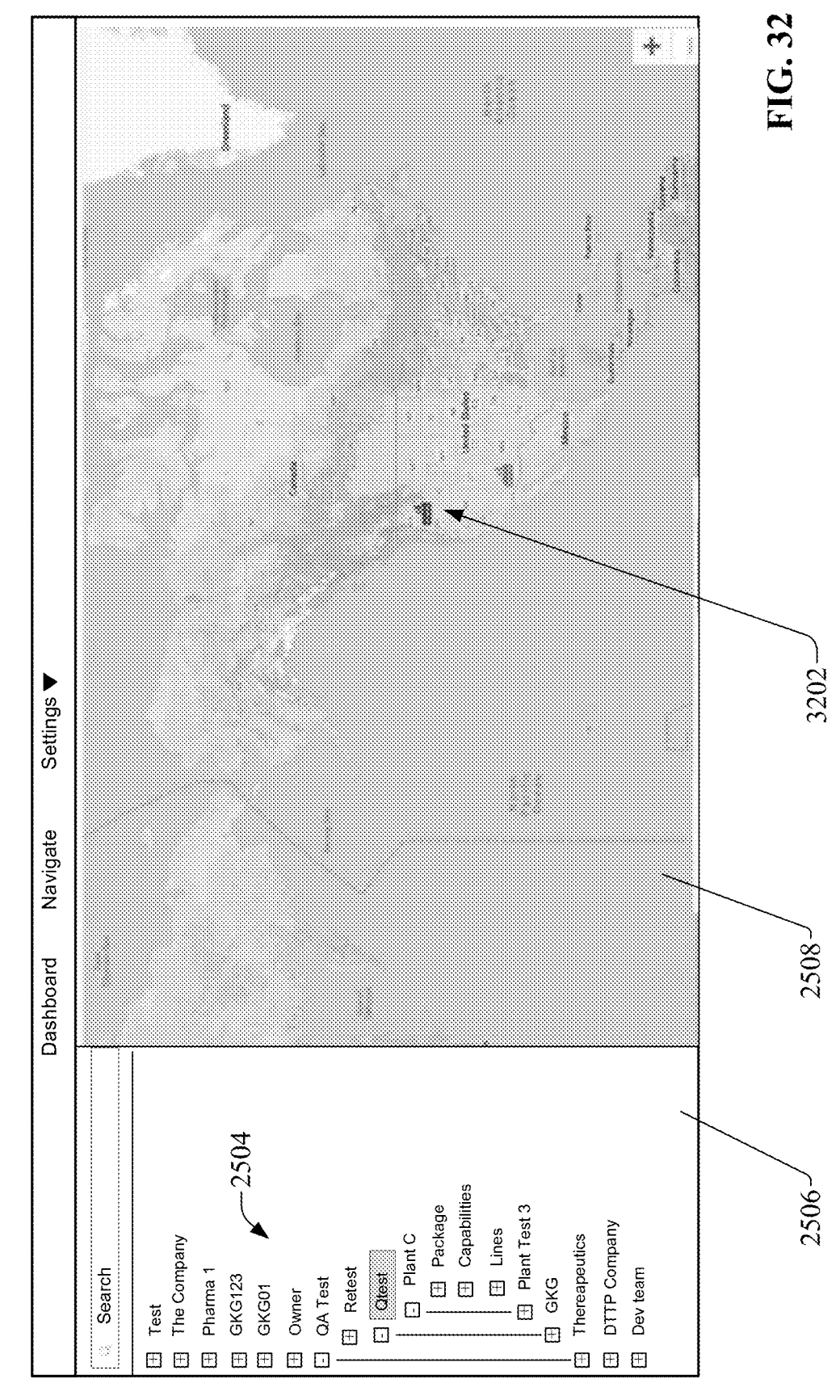
FIG. 32 is a view of the dashboard interface in which a geographical view of available plant facilities is rendered in the results window.
Figure 33:
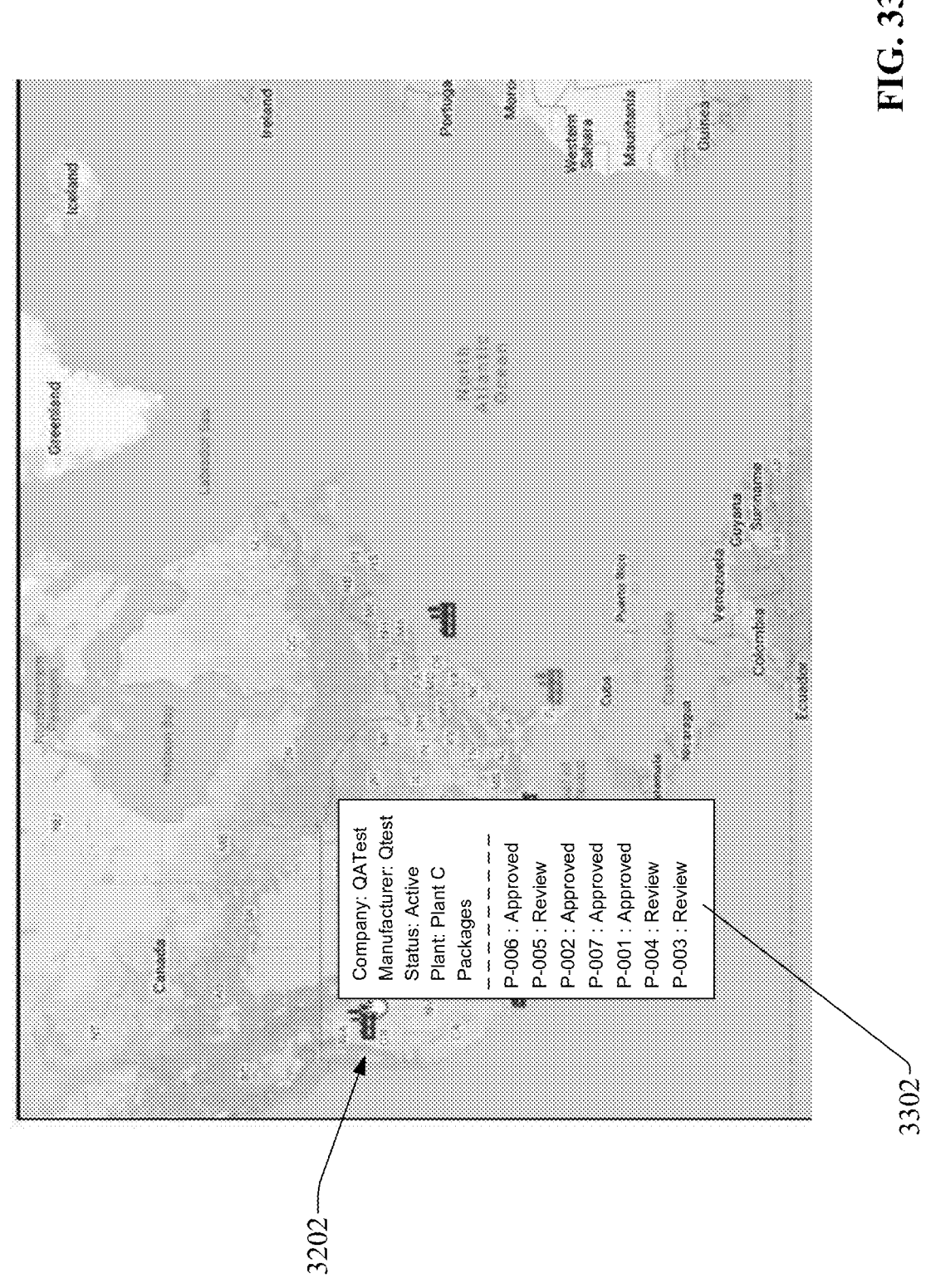
FIG. 33 is a view of a geographical map displayed by the dashboard interface in which the user has hovered a cursor over a selected one of the plant icons.
Figure 34:
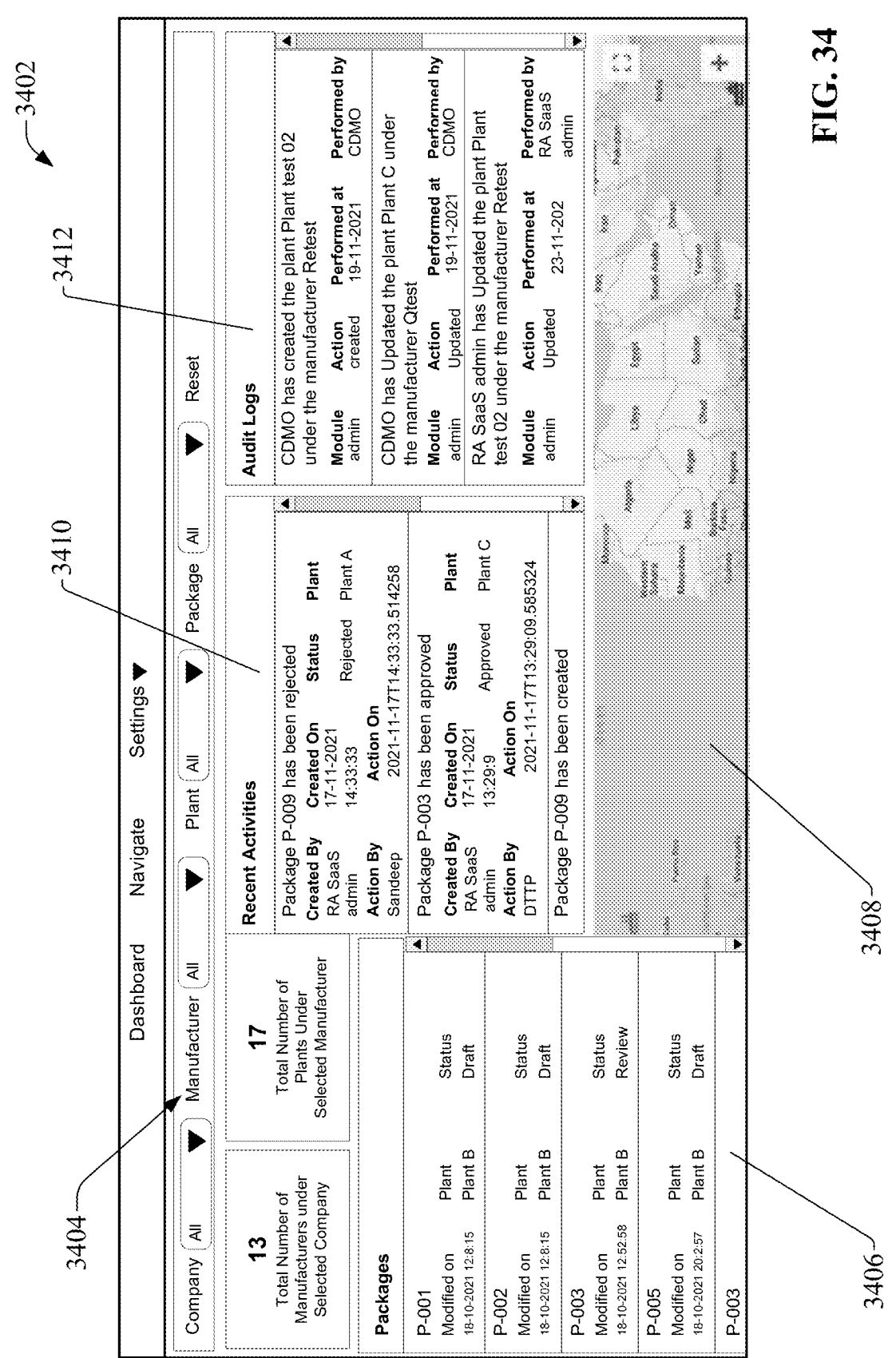
FIG. 34 is an example dashboard that can be generated by the technology transfer system and used to browse summary information for selected companies, manufacturers, plants, and packages.

FIGS. 32-34 are other example dashboards that can be generated by user interface component 104 and used to browse the ecosystem of manufacturing entities and packages that have been submitted to and registered with the technology transfer system 102. FIG. 32 is a view of interface 2502 in which a geographical view of available plant facilities is rendered in the results window 2508. In some embodiments, this geographical view can be invoked and used to browse the plant facilities that have a contractual relationship with the technology owner 202 based on the geographical locations of those plant facilities. To this end, a map is rendered in the results window 2508, and selection of a manufacturing entity within the navigation tree 2504 causes each plant facility owned by the selected manufacturing entity to be rendered on the map as a plant icon 3202 placed at the location of the physical plant. Selection of a specific plant facility in the navigation tree 2504 can cause the corresponding plant icon 3202 to be highlighted on the map.

FIG. 33 is a closer view of the geographical map displayed by interface 2502, in which the user has hovered a cursor over a selected one of the plant icons 3202. Hovering a cursor over a plant icon 3202 in this manner can cause a summary window 3302 for the corresponding plant to be overlaid on the map near the selected icon 3202. The summary window 3302 can include such information as the manufacturing entity that owns the plant, the company (technology owner) having a business relationship with manufacturing entity, and a name and current status of the plant. The summary window 3302 can also list the names of all packages that have been assigned to the plant and the respective review statuses of those packages.

FIG. 34 is an example dashboard 3402 that can be generated by the user interface component 104 and used to browse summary information for selected companies, manufacturers, plants, and packages. In this example, a selection bar 3404 is rendered near the top of the dashboard 3402 comprising drop-down selection boxes for selecting a desired company (technology owner), manufacturer, plant, and/or package to be viewed. Selections made in the selection bar 3404 filter the information presented on the dashboard 3402. The selection boxes are populated with selectable entities registered in each category. The selectable entities available in each selection box are also filtered based on the role of the user, such that only those entities that are within the scope of the user's access privileges (as defined by the user's assigned role or affiliation) are made available for selection. For example, a user affiliated with the technology owner 202 may be permitted to select from among all registered manufacturing entities having a business relationship with the technology owner 202, while a user affiliated with a manufacturing entity 214 may only be permitted to view information that is within the scope of that manufacturing entity 214 while being denied the ability to view information for other manufacturing entities. The selections may also be further filtered based on the user's role within the organization.

Dashboard 3402 comprises information windows that display respective different types of information based on the filter criteria set using the selection boxes. For example, for a selected company or technology owner 202, the dashboard 3402 may indicate a total number of manufacturing entities that are partnered with the company. Similarly, for a selected manufacturing entity, the dashboard 3402 may indicate a total number of plants owned by that manufacturer.

A Package summary window 3406 can list a filtered set of packages based on the filtering criteria, together with summary information for each package (e.g., a package name, the date of the most recent modification to the package, a plant to which the package has been assigned, a review status of the package, etc.). A Recent Activities window 3410 can display a log of most recent activities for the selected company, manufacturer, plant, and/or package. In an example embodiment, each entry can comprise information relating to a status update for a package, indicating when a package has been created, rejected, or approved. Each entry can also include a time and date of the status change, an identity of a user who initiated the status change, or other such informant.

An Audit Log window 3412 can display a log of auditing events relevant to the selected company, manufacturer, plant, and/or package. This audit information can log updates that were performed on the model 208 itself, including times and dates at which nodes are created or modified (e.g., manufacturer, plant, or package nodes), as well as identities of the users who implemented the modifications. Dashboard 3402 can also include a map window 3408 similar to that illustrated in FIG. 32, which renders a set of plant icons—filtered in accordance with the selection criteria—at respective map locations corresponding to the physical locations of those plants.

In some embodiments, the package management component 116 can support the use of blockchain technology to record the approved package data in a secure, immutable format. In such embodiments, the package management component 116 can also record audit information for the package in a blockchain ledger. This audit information can comprise a log of modifications to the technology transfer document 204, identities of the users who implemented the modifications, and the time and date of the modifications. Recording this information in a blockchain ledger yields a secure and immutable edit history for the document, while permitting the document to be modified in a regulated manner.

Figure 35:
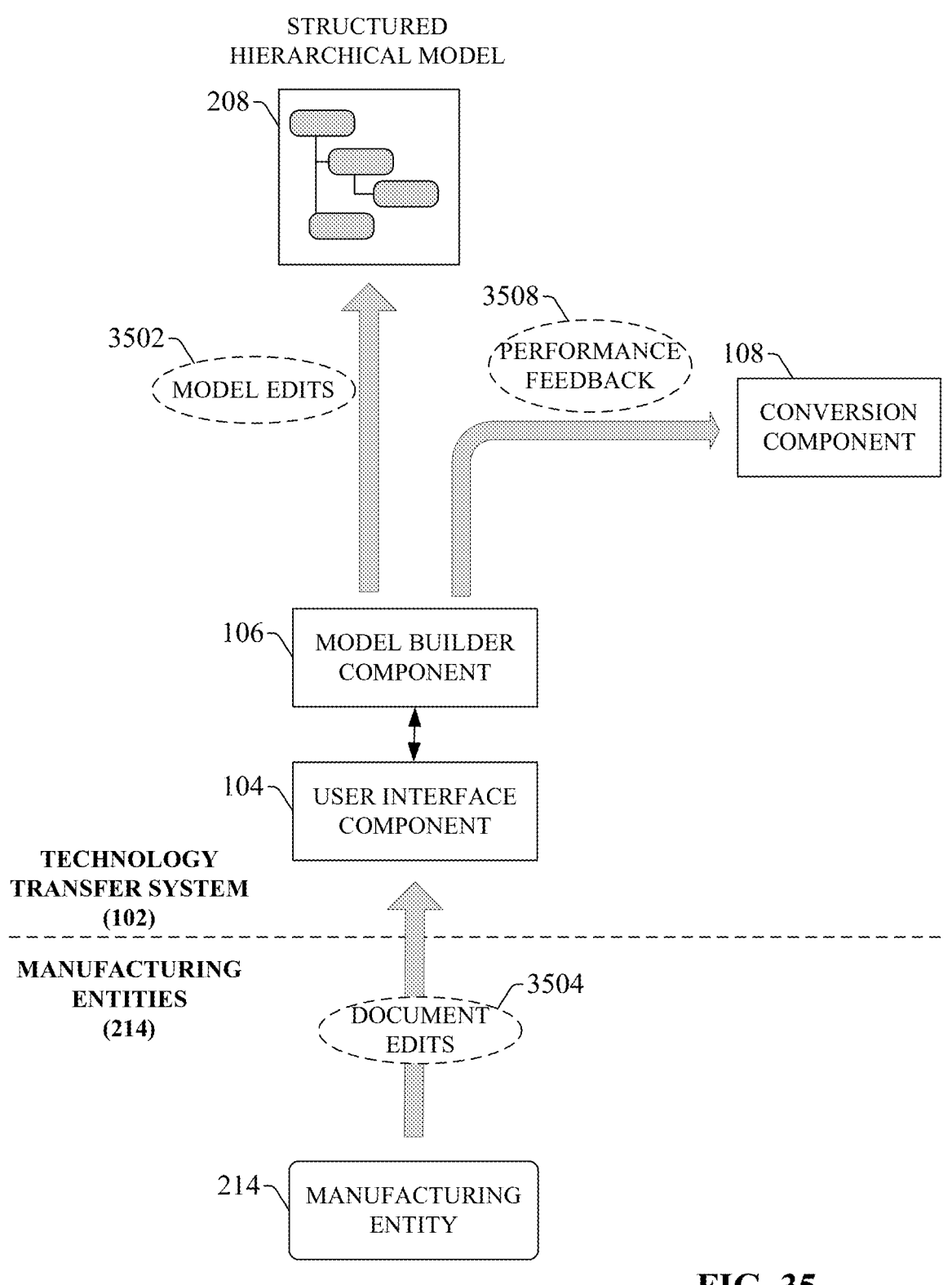
FIG. 35 is a diagram illustrating submission of document edits by a reviewer at a manufacturing entity.

As noted above, edits or feedback can be submitted to a package model 1106 during the review process via interactions with interface 2502. In some embodiments, the system 102 can translate some or all of these edits to performance metrics that can be provided as feedback to the conversion component 108 to improve subsequent translations of technology transfer documents 204. FIG. 35 is a diagram illustrating submission of document edits 3504 by a reviewer at a manufacturing entity 214. During the document review process, the reviewer may submit edits 3504 to the translated package model 1106 to alter descriptive text, modify process control parameters, re-order steps of a manufacturing stage, re-organize the hierarchical arrangement of nodes that make up the package model 1106, or implement other such updates. Some of these edits 3504, such as re-ordering of process steps, may result in modification of the hierarchical structure of the package model 1106 or otherwise serve to correct an error in the translation from the original technology transfer document 204 to the package model 1106.

Authorized edits 3504 submitted to the system 102 are applied to the package model 1106 (a subset of the larger aggregate model 208) by the model builder component 106. Additionally, if any of the edits 3504 correct a mistranslation of the original technology transfer document 204, these edits 3504 can translated to performance feedback 3508 and provided to the conversion component 108. This performance feedback 3508 can modify the parsing engine or algorithms used by the conversion component 108 to generate the neutral model 1302 for a technology transfer document 204. In particular, the performance feedback 3508 can configure the conversion component 108 to modify its translation algorithms so that subsequent document translations will preemptively implement the edit submitted by the reviewer (or an analogous edit depending on the nature of the original document 204). In this way, the package review process can also serve as a means for collecting performance metrics for the conversion component 108, which improve the accuracy of subsequent translations of technology transfer documents 204 to package models 1106.

Figure 36:
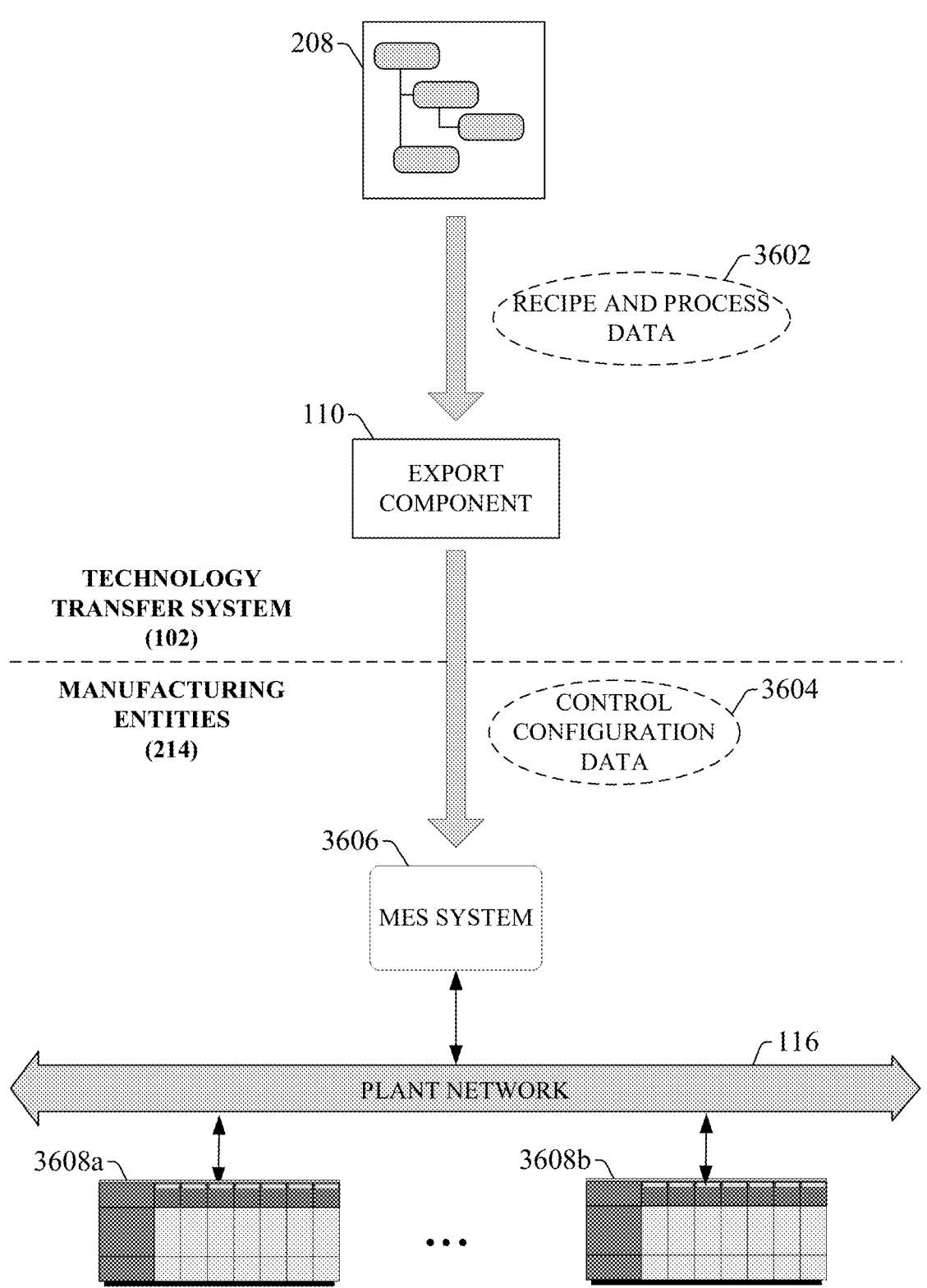
FIG. 36 is a diagram illustrating export of control configuration data to an MES system of a manufacturing entity.

Package data encoded in a package model 1106 can be exported to and consumed by various types of devices and systems to facilitate manufacture of the product defined by the originating technology transfer document 204. FIG. 36 is a diagram illustrating export of control configuration data 3604 to an MES system 3606 of a manufacturing entity 214. Once a package has been finalized and approved, data relating to the product defined by the package—including recipe information; details of the manufacturing processes, stages, and steps for producing the product, etc.—is made available to users, devices, and systems at the manufacturing entities 214 that have been assigned the task of manufacturing the product. In addition to making this package information accessible and viewable by relevant users (e.g., via interface 2502), the system 102 can translate portions of the model data to control configuration data 3604 that can be used to configure MES systems, ERP systems, industrial control devices such as industrial controllers 3608, product lifecycle management (PLM) systems, or other such equipment.

To this end, the export component 110 can extract recipe and process data 3602 from the package model 1106—that is, data relating to the manufacturing process—and translate this data 3602 to control configuration data 3604 formatted in accordance with a target device or system to which the configuration data 3604 will be sent. In the illustrated example, the export component 110 outputs the control configuration data to an MES system 3606 associated with a manufacturing entity 214, which performs supervisory monitoring and management of control operations on the control level. The configuration data 3604 provides the MES system 3606 with the recipe information, control parameters, step sequences, or other such process information for manufacturing the product. Based on this configuration data 3604, the MES system 3606 can direct control devices executing in the plant facility, such as industrial controllers 3608, to control their respective industrial assets in accordance with the production specifics encoded in the configuration data 3604.

Although FIG. 36 depicts configuration of an MES system 3606 using the control configuration data 3604, the technology transfer system 102 can export control configuration data 3604 to various types of industrial control devices or systems as needed, depending on how the manufacturing process for the product is to be partitioned among control systems, plant facilities, and manufacturing entities. For example, as noted above, a technology owner 202 may choose to partition the stages of a multi-stage manufacturing process between two or more different production lines, plant facilities, or manufacturing entities. To partition a process in this manner, a user affiliated with the technology owner 202 can interact with interface 2502 to designate each Stage node 2802 of the package model 1106 to a selected plant facility or production line. Based on these designations, users affiliated with the respective plant facilities are permitted to access and view the portions of the package model 1106 corresponding to their designated stage of the process, and in some scenarios may be prevented from accessing portions of the model 1106 that have been designated to other manufacturing entities 214 (thereby protecting the intellectual property of the technology owner by preventing any single manufacturing entity from viewing details of the manufacturing process in its entirety). Additionally, the export component 110 can export control configuration data 3604 obtained from the model 1106 to control devices and systems associated with the designated facilities or production areas, such that each target facility receives configuration data 3604 obtained solely from the portions of the model 1106 that have been designated to that facility. Export component 110 can be configured to support any suitable security protocol to ensure that the control configuration data 36 is delivered securely to its target devices and systems.

Figure 37:
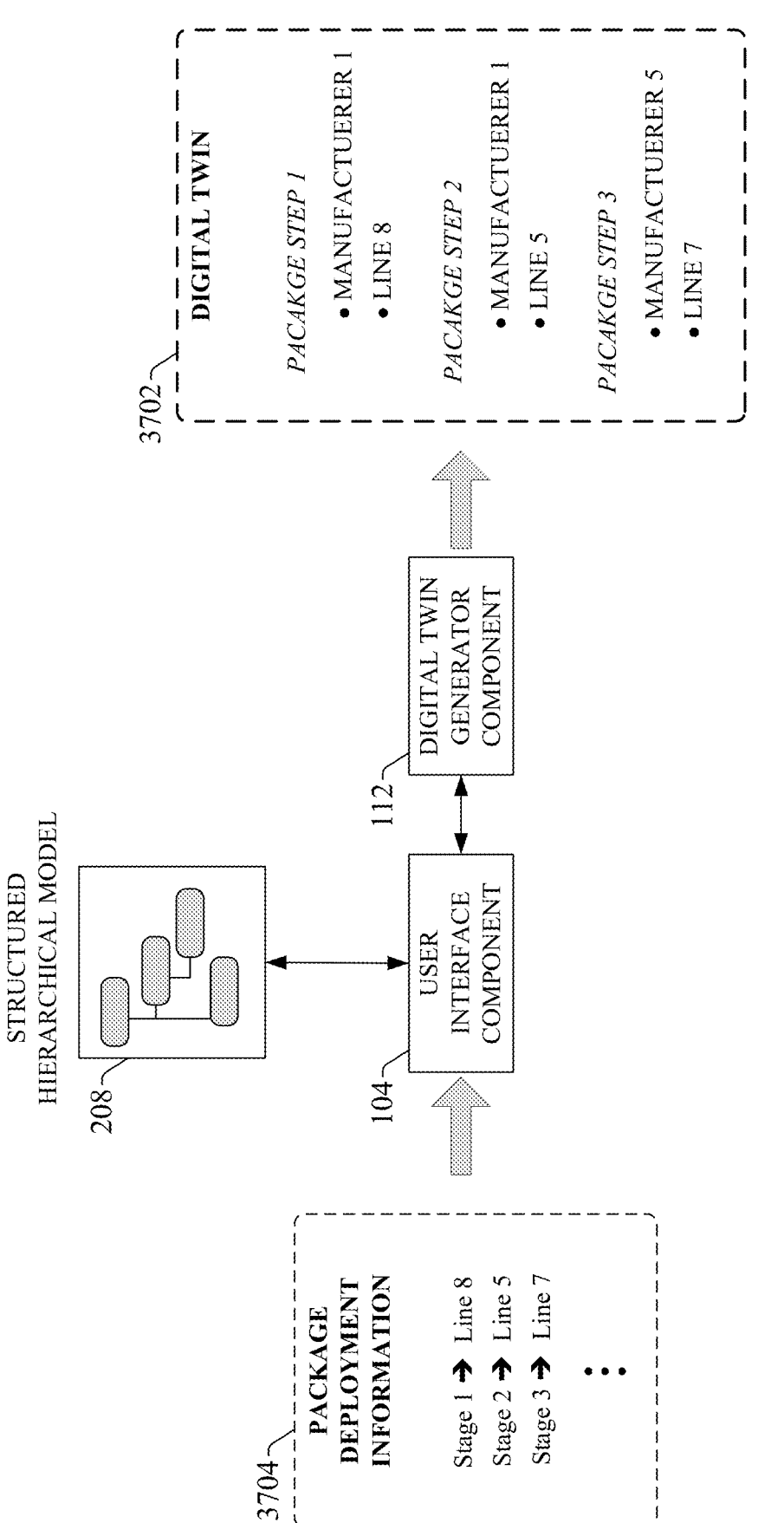
FIG. 37 is a diagram illustrating creation of a digital twin of a manufacturing process represented by a package model.

Some embodiments of technology transfer system 102 can also support creation and simulation of a digital twin of the package manufacturing process represented by the package model 1106, which can allow users to validate operation of the manufacturing process by the designated manufacturing entities 214 prior to carrying out the manufacturing process on the physical industrial assets. FIG. 37 is a diagram illustrating creation of a digital twin 3702 of a manufacturing process represented by a package model 1106. As noted above, a technology owner 202 can designate selected manufacturing processes or stages defined in the package model 1106 to respective different production lines; e.g., by submitting package deployment information 3704 to the system 102 (via interface 3402) that assigns nodes of the navigation tree 2504 representing the processes or stages to selected production lines. In the example depicted in FIG. 37, the user has assigned stages 1-3 of a manufacturing process to Production Lines 8, 5, and 7, respectively. These different production lines may reside in the same plant facility associated with a single manufacturing entity 214 or may be geographically distributed among different plant facilities associated with the same manufacturing entity 214 or multiple different manufacturing entities 214.

Once this partitioning of the manufacturing process has been defined, the user may choose to generate a digital twin 3702 and simulate operation of the manufacturing process prior to execution on the physical production lines. To this end, a digital twin generator component 112 can generate this digital twin 3702 based on the package deployment information 3704 submitted by the user—which defines which production lines defined in the model 208 are to execute the respective stages of the process—and information about the industrial equipment (e.g., mixers, presses, ovens, etc.) that make up those production lines. Returning briefly to the example model 208 illustrated in FIG. 23, the digital twin generator component 112 can obtain capability or specification information for the industrial equipment on each of the designated production lines from the Lines layer 2310 of the model 208 and use this equipment capability information to generate simulation-capable digital models of the equipment as part of the digital twin 3702. Example equipment capability information that can be obtained from the model 208 and used by the digital twin generator component 112 to generate the digital twin 3702 can include, but is not limited to, operating speeds, product throughput capacities, rated temperatures or flows, or other such equipment capability information. These digital equipment models can also be configured in accordance with any control or process parameters defined by the process steps that have been assigned to the corresponding equipment (that is, the control or process parameters obtained from the original technology transfer document and included in the package model 1106). The digital twin generator component 112 can aggregate equipment models for a given production line to yield a simulation capable production line model as part of the digital twin 3702.

Digital twin generator component 112 also assigns, to each of the production line models, the one or more stages or operations of the manufacturing process that have been assigned to that production line, as defined by the user-provided package deployment information 3704. These assignments configure the digital twin 3702 to simulate execution of each of the stages or operations of the manufacturing process by their assigned production lines. If the designated production lines encompass multiple different, geographically diverse production facilities, the scope of the digital twin 3702 can include transportation of product between plant facilities as part of a sequential staging of the product. Distances between these different plant facilities can be obtained from the model 208 based on the registered locations of the relevant plants and encode in the digital twin 3702 so that transportation times can be simulated.

Figure 38:
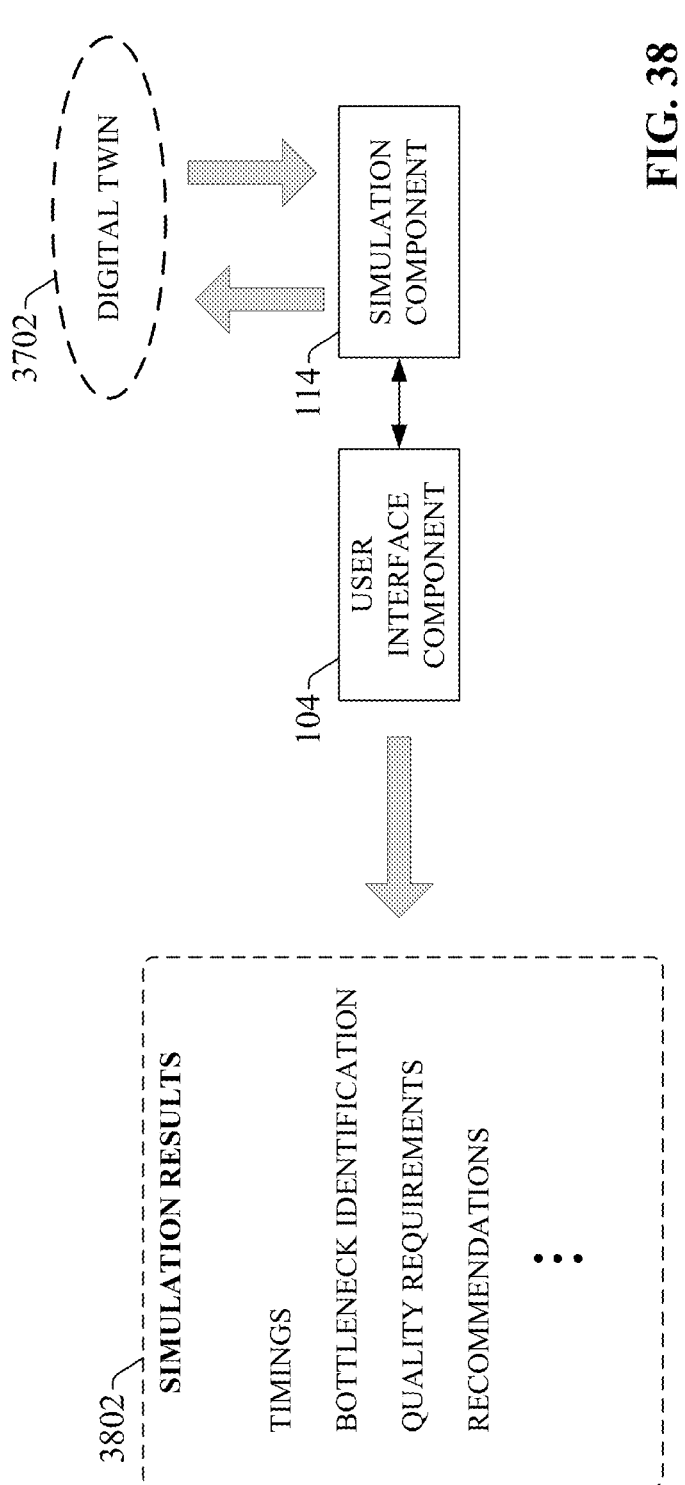
FIG. 38 is a diagram illustrating execution of the digital twin by the technology transfer system.

Once the digital twin 3702 has been created, the system's simulation component 114 can execute a simulation of the digital twin 3702 to predict operation of the manufacturing process by the designated production lines. FIG. 38 is a diagram illustrating execution of the digital twin 3702 by the technology transfer system 102. The simulation component 114 can consider the capabilities and specification data for the modeled industrial equipment together with the operations required of that equipment—as dictated by the portions of the manufacturing process to be carried out by the respective pieces of equipment—to simulate manufacture of the product and generate simulation results 3802 that quantify various aspects of the simulated process. Example simulation results 3802 that can be generated by the simulation component 114 based on simulation of the digital twin 3702 can include, but are not limited to, timings of various aspects of the product, identification of bottlenecks in the production flow, product quality estimations, estimated product throughput or output, or other such results 3802.

In some embodiments, the simulation component 114 can also be configured to generate recommendations for improving the manufacturing process based on the simulation and information contained in the model 208. In this regard, the recommendations can be designed to improve a performance metric for the manufacturing process, or to otherwise bring the performance metric within a specified range of acceptability. In an example scenario, the simulation component 114 may determine that the predicted rate of product throughput can be improved if a stage of the process that has been assigned to a first production line is instead carried out on a second production line capable of performing the same operation more quickly or with less potential machine downtime. In making this assessment, the simulation component 114 can refer to the model 208 to identify other available production lines with similar but improved capabilities. The user interface component 104 can render these recommendations, as well as other simulation results 3802, on a client device associated with an authorized user, who may choose to modify the partitioning of the package manufacturing process between production lines based on assessment of the simulation results 3802. In general, the manufacturing process for the package can be validated by the simulation of the digital twin 3702 prior to deploying the process to the physical production lines.

The technology transfer system described herein can simplify and automate many aspects of the technology transfer process using a centralized platform for translating, sharing, editing, and tracking technology documentation. The system's document translation features can transform the content of a technology transfer document to a structured hierarchical object-based model that can then be browsed and viewed by relevant parties. The system enforces role-based access privileges to the package model, affording a technology owner a great degree of control over the distribution of the document's contents. The system also manages and tracks approval statues for the document. Once approved, the system can export recipe data or control configuration information, including process control parameters, to industrial control systems to facilitate configuring those systems to manufacture the product defined by the document.

FIG. 39 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 39 illustrates an example methodology 3900 for translating a technology transfer document to a digitized hierarchical object model notation. Initially, at 3902, a technology transfer document describing a product to be manufactured is received at a technology transfer system from a technology owner. The technology transfer document can be submitted as a natural language document in any suitable file format (e.g., a PDF document) and can comprise sections and sub-sections delineated by headers or titles. The sections and subsections describe a product to be manufactured (e.g., a pharmaceutical product) and detailed information conveying how the product is to be manufactured. The document can include sections describing the stages of the manufacturing process and the steps for carrying out the respective stages. The document can also include values of process parameters associated with respective steps of the process, as well as any relevant images, tables, flow diagrams, or charts.

At 3904, content is extracted from the technology transfer document as modularized content of different content types based on general parsing instructions defined in a content indexer. The content indexer can be any type of software file or electronic document that defines instructions for locating different items of content within the document and keys to be associated with each item of content. The content indexer can also define which of multiple hierarchical levels each item of content is to be mapped to in a finalized package model. For example, for a given item of content, the content indexer can specify a level (e.g., level 0, level 1, level 2, etc.), a content key, start text for the content, and end text for the content. Content types that can be extracted in this manner include, but are not limited to, text blocks, images, tables, flow diagrams, or other types of content. Any suitable extraction tools can be used in connection with the content extraction, depending on the type of content being extracted. The generalized parsing and extraction performed in this step can export the extracted content to content modules that are organized hierarchically according to the instructions defined in the content indexer.

At 3906, a determination is made as to whether the content of the document includes a table. If so (YES at step 3906), the methodology proceeds to step 3908, where table data is extracted from the table, as part of the modularized content, based on customer-specific semantic rules defined for the technology owner. The semantic rules can be defined in a semantic rules file that defines sets of semantic rules for respective different technology owners. Each set of customer-specific semantic rules define directives for parsing tables within that technology owner's document to align with the target structure of the finalized package model, considering the technology owner's proprietary table formatting. The semantic rules can specify, for example, how to translate and map content of horizontally and/or vertically merged cells within the table, how to map cell content to the finalized package model relative to column or row header names, or other such rules.

In some embodiments, the sematic rules can be written using a condensed syntax in which different elements of the semantic rule are represented by 2-, 3-, or 4-letter codes or identifiers that are written as a string of rule elements, which are then translated into executable parsing code that is applicable to the table.

After all tables in the document have been processed in this manner, or if the document contains no tables (NO at step 3906), the methodology proceeds to step 3910, where a neutral model is generated comprising objects or nodes representing the modularized content extracted at steps 3904 and 3908, organized in a hierarchical structure that conforms to an industrial standard, such as ISA-88.

At 3912, the neutral model generated at step 3810 is translated to a hierarchical document or package model having a format that conforms to the industrial standard. The package model comprises nodes or objects representing manufacturing processes, stages, steps, and parameters for manufacturing the product. The document model can be browsed using suitable user interfaces to view respective sections of document content.

The resulting document model can also be integrated into an innovator model by assigning respective processes or steps of the manufacturing process defined in the document model to selected production lines defined in the innovator model. The resulting aggregate model can be browsed to view information about the plant facilities that make up the ecosystem of manufacturing entities and the document models (packages) associated with the respective plant facilities.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 40:
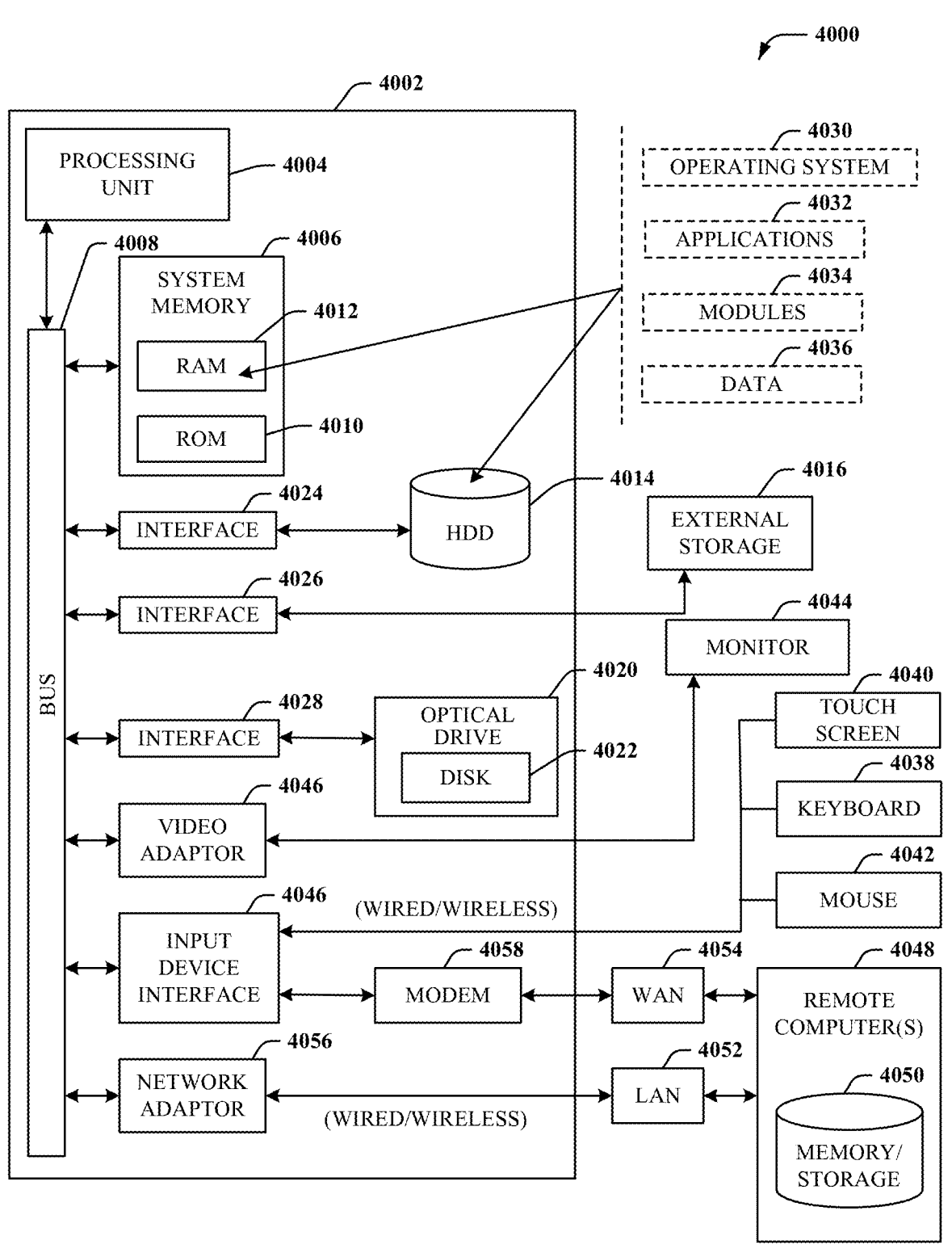
FIG. 40 is an example computing environment.
Figure 41:
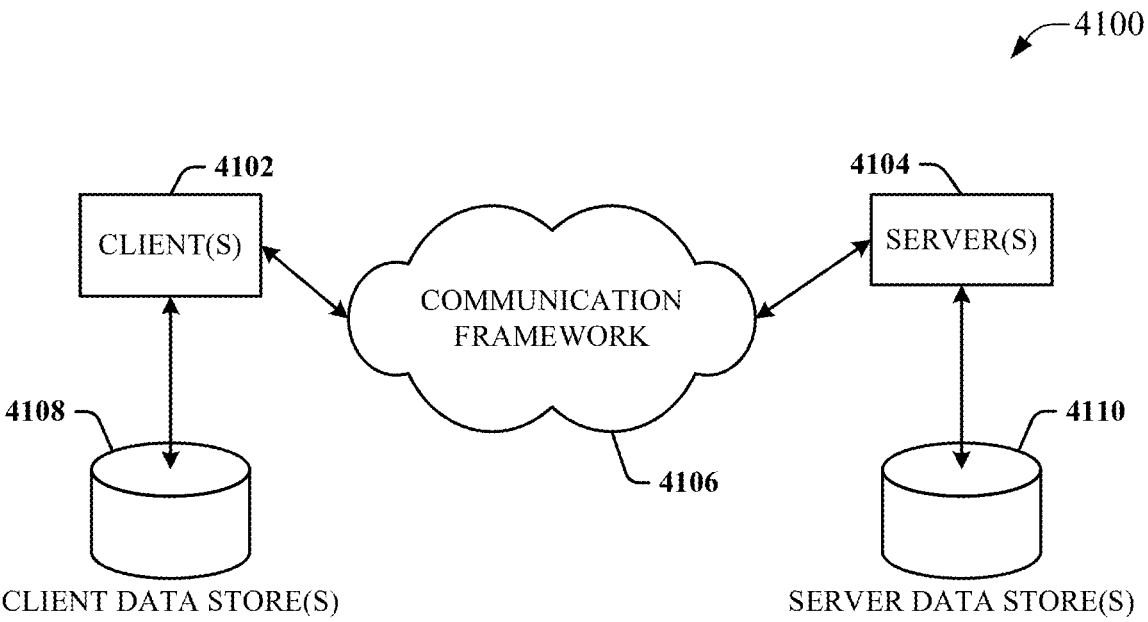
FIG. 41 is an example networking environment.

In order to provide a context for the various aspects of the disclosed subject matter, FIGS. 40 and 41 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 40, the example environment 4000 for implementing various embodiments of the aspects described herein includes a computer 4002, the computer 4002 including a processing unit 4004, a system memory 4006 and a system bus 4008. The system bus 4008 couples system components including, but not limited to, the system memory 4006 to the processing unit 4004. The processing unit 4004 can be any of various commercially available processors. Dual microprocessors and other multi-processor architectures can also be employed as the processing unit 4004.

The system bus 4008 can be any of several types of bus structure that can further interconnect to a memory bus (with or without a memory controller), a peripheral bus, and a local bus using any of a variety of commercially available bus architectures. The system memory 4006 includes ROM 4010 and RAM 4012. A basic input/output system (BIOS) can be stored in a non-volatile memory such as ROM, erasable programmable read only memory (EPROM), EEPROM, which BIOS contains the basic routines that help to transfer information between elements within the computer 4002, such as during startup. The RAM 4012 can also include a high-speed RAM such as static RAM for caching data.

The computer 4002 further includes an internal hard disk drive (HDD) 4014 (e.g., EIDE, SATA), one or more external storage devices 4016 (e.g., a magnetic floppy disk drive (FDD) 4016, a memory stick or flash drive reader, a memory card reader, etc.) and an optical disk drive 4020 (e.g., which can read or write from a CD-ROM disc, a DVD, a BD, etc.). While the internal HDD 4014 is illustrated as located within the computer 4002, the internal HDD 4014 can also be configured for external use in a suitable chassis (not shown). Additionally, while not shown in environment 4000, a solid state drive (SSD) could be used in addition to, or in place of, an HDD 4014. The HDD 4014, external storage device(s) 4016 and optical disk drive 4020 can be connected to the system bus 4008 by an HDD interface 4024, an external storage interface 4026 and an optical drive interface 4028, respectively. The interface 4024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 4002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 4012, including an operating system 4030, one or more application programs 4032, other program modules 4034 and program data 4036. All or portions of the operating system, applications, modules, and/or data can also be cached in the RAM 4012. The systems and methods described herein can be implemented utilizing various commercially available operating systems or combinations of operating systems.

Computer 4002 can optionally comprise emulation technologies. For example, a hypervisor (not shown) or other intermediary can emulate a hardware environment for operating system 4030, and the emulated hardware can optionally be different from the hardware illustrated in FIG. 40. In such an embodiment, operating system 4030 can comprise one virtual machine (VM) of multiple VMs hosted at computer 4002. Furthermore, operating system 4030 can provide runtime environments, such as the Java runtime environment or the .NET framework, for application programs 4032. Runtime environments are consistent execution environments that allow application programs 4032 to run on any operating system that includes the runtime environment. Similarly, operating system 4030 can support containers, and application programs 4032 can be in the form of containers, which are lightweight, standalone, executable packages of software that include, e.g., code, runtime, system tools, system libraries and settings for an application.

Further, computer 4002 can be enable with a security module, such as a trusted processing module (TPM). For instance with a TPM, boot components hash next in time boot components, and wait for a match of results to secured values, before loading a next boot component. This process can take place at any layer in the code execution stack of computer 4002, e.g., applied at the application execution level or at the operating system (OS) kernel level, thereby enabling security at any level of code execution.

A user can enter commands and information into the computer 4002 through one or more wired/wireless input devices, e.g., a keyboard 4038, a touch screen 4040, and a pointing device, such as a mouse 4042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 4004 through an input device interface 4044 that can be coupled to the system bus 4008, but can be connected by other interfaces, such as a parallel port, an IEEE 1394 serial port, a game port, a USB port, an IR interface, a BLUETOOTH® interface, etc.

A monitor 4044 or other type of display device can be also connected to the system bus 4008 via an interface, such as a video adapter 4048. In addition to the monitor 4044, a computer typically includes other peripheral output devices (not shown), such as speakers, printers, etc.

The computer 4002 can operate in a networked environment using logical connections via wired and/or wireless communications to one or more remote computers, such as a remote computer(s) 4048. The remote computer(s) 4048 can be a workstation, a server computer, a router, a personal computer, portable computer, microprocessor-based entertainment appliance, a peer device or other common network node, and typically includes many or all of the elements described relative to the computer 4002, although, for purposes of brevity, only a memory/storage device 4050 is illustrated. The logical connections depicted include wired/wireless connectivity to a local area network (LAN) 4052 and/or larger networks, e.g., a wide area network (WAN) 4054. Such LAN and WAN networking environments are commonplace in offices and companies, and facilitate enterprise-wide computer networks, such as intranets, all of which can connect to a global communications network, e.g., the Internet.

When used in a LAN networking environment, the computer 4002 can be connected to the local network 4052 through a wired and/or wireless communication network interface or adapter 4056. The adapter 4056 can facilitate wired or wireless communication to the LAN 4052, which can also include a wireless access point (AP) disposed thereon for communicating with the adapter 4056 in a wireless mode.

When used in a WAN networking environment, the computer 4002 can include a modem 4058 or can be connected to a communications server on the WAN 4054 via other means for establishing communications over the WAN 4054, such as by way of the Internet. The modem 4058, which can be internal or external and a wired or wireless device, can be connected to the system bus 4008 via the input device interface 4046. In a networked environment, program modules depicted relative to the computer 4002 or portions thereof, can be stored in the remote memory/storage device 4050. It will be appreciated that the network connections shown are example and other means of establishing a communications link between the computers can be used.

When used in either a LAN or WAN networking environment, the computer 4002 can access cloud storage systems or other network-based storage systems in addition to, or in place of, external storage devices 4016 as described above. Generally, a connection between the computer 4002 and a cloud storage system can be established over a LAN 4052 or WAN 4054 e.g., by the adapter 4056 or modem 4058, respectively. Upon connecting the computer 4002 to an associated cloud storage system, the external storage interface 4026 can, with the aid of the adapter 4056 and/or modem 4058, manage storage provided by the cloud storage system as it would other types of external storage. For instance, the external storage interface 4026 can be configured to provide access to cloud storage sources as if those sources were physically connected to the computer 4002.

The computer 4002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 41 is a schematic block diagram of a sample computing environment 4100 with which the disclosed subject matter can interact. The sample computing environment 4100 includes one or more client(s) 4102. The client(s) 4102 can be hardware and/or software (e.g., threads, processes, computing devices). The sample computing environment 3400 also includes one or more server(s) 4104. The server(s) 4104 can also be hardware and/or software (e.g., threads, processes, computing devices). The servers 4104 can house threads to perform transformations by employing one or more embodiments as described herein, for example. One possible communication between a client 4102 and servers 4104 can be in the form of a data packet adapted to be transmitted between two or more computer processes. The sample computing environment 4100 includes a communication framework 4106 that can be employed to facilitate communications between the client(s) 4102 and the server(s) 4104. The client(s) 4102 are operably connected to one or more client data store(s) 4108 that can be employed to store information local to the client(s) 4102. Similarly, the server (s) 4104 are operably connected to one or more server data store(s) 4110 that can be employed to store information local to the servers 4104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a processor, operatively coupled to a memory, that executes executable components stored on the memory, the executable components comprising:
   a user interface component configured to receive, from a technology owner, a technology transfer document containing information about a product to be manufactured and describing a manufacturing process for manufacturing the product; and
   a conversion component configured to
   extract a table contained in the technology transfer document,
   select a set of semantic rules, from multiple sets of semantic rules defined for respective different technology owners, corresponding to the technology owner,
   extract table data from the table in accordance with custom parsing instructions defined by the set of semantic rules, and
   generate at least a portion of a package model comprising a hierarchically structured organization of the table data organized based in part on the custom parsing instructions,
   wherein
   the custom parsing instructions are coded in a semantic rules file using a syntax that represents elements of the custom parsing instructions using codes of four characters or less, and
   the conversion component is configured to translate a string of the codes into a custom parsing instruction of the custom parsing instructions.

2. The system of claim 1, wherein the codes comprise at least one of codes for logical operators; codes for identifying rows, columns, or cells of the table; codes for translation actions to be applied to the table or selected elements of the table; codes that indicate parent-child relationships between elements of the table data to be recorded in the package model; or codes for specifying a vertically merged cell or a horizontally merged cell within the table.

3. The system of claim 1, wherein the codes comprise at least codes for translation actions to be applied to the table or selected elements of the table, and the translation actions comprise at least one of changing content of a cell of the table, copying content of a first cell of the table to a second cell of the table, deleting content of a cell of the table, dropping a row or column of the table, merging content of two cells into a single cell, moving a column or row of the table, renaming a column or row of the table, skipping a column or row of the table, or duplicating content of a merged cell into two component cells.

4. The system of claim 1, wherein the string of the codes of the custom parsing instruction delineates an IF statement and a THEN statement using a delineation character.

5. The system of claim 1, wherein the custom parsing instruction comprises one or more variables inserted between two of the codes.

6. The system of claim 5, wherein the one or more variables comprise at least one of a text string to be located within the table or a text string to be written to a cell of the table.

7. The system of claim 1, wherein the codes comprise at least codes for identifying a row number or a column number within the table comprising a row identifier or a column identifier appended with a number.

8. The system of claim 1, wherein the conversion component is further configured to extract content from the technology transfer document as content modules based on general parsing instructions defined in a content indexer and applicable to technology transfer documents from multiple different technology owners, and generate another portion of the package model comprising a hierarchically structured organization of the content modules representing content sections of the technology transfer document.

9. The system of claim 1, wherein the executable components further comprise an export component configured to translate information about the manufacturing process contained in the package model to control configuration data and to export the control configuration data to an industrial device or system, wherein the control configuration data configures the industrial device or system to execute a portion of the manufacturing process.

10. The system of claim 1, wherein the general parsing instructions define hierarchical levels in which respective content modules, of the content modules, are to be organized in the package model, keywords to be associated with respective items of content to be extracted to the content modules, and instructions for locating the respective items of content within the technology transfer documents.

11. A method, comprising:

receiving, by a system comprising a processor, a technology transfer document from a technology owner, the technology transfer document containing information about a product to be manufactured and describing a manufacturing process for manufacturing the product;

extracting, by the system, a table contained in the technology transfer document;

selecting, by the system, a set of semantic rules, from multiple sets of semantic rules defined for respective different technology owners, corresponding to the technology owner;

extracting, by the system, table data from the table in accordance with custom parsing instructions defined by the set of semantic rules; and generating, by the system, at least a portion of a package model comprising a hierarchically structured organization of the table data organized based in part on the custom parsing instructions;

translating, by the system, information about the manufacturing process contained in the package model to control configuration data; and exporting, by the system, the control configuration data to an industrial device or system, wherein the exporting of the control configuration data configures the industrial device or system to execute a portion of the manufacturing process, wherein the custom parsing instructions are coded using a syntax in which elements of the custom parsing instructions are represented by codes comprising four characters or less, and the extracting of the table data comprises translating a string of the codes into a custom parsing instruction and applying the custom parsing instruction to the table.

12. The method of claim 11, wherein the codes comprise at least one of codes for logical operators; codes for identifying rows, columns, or cells of the table; codes for translation actions to be applied to the table or selected elements of the table; codes that indicate parent-child relationships between elements of the table data to be recorded in the package model; or codes for specifying a vertically merged cell or a horizontally merged cell within the table.

13. The method of claim 11, wherein the codes comprise at least codes for translation actions to be applied to the table or selected elements of the table, and the translation actions comprise at least one of changing content of a cell of the table, copying content of a first cell of the table to a second cell of the table, deleting content of a cell of the table, dropping a row or column of the table, merging content of two cells into a single cell, moving a column or row of the table, renaming a column or row of the table, skipping a column or row of the table, or duplicating content of a merged cell into two component cells.

14. The method of claim 11, wherein the string of the codes of the custom parsing instruction delineates an IF statement and a THEN statement using a delineation character.

15. The method of claim 11, wherein the custom parsing instruction comprises one or more variables inserted between two of the codes.

16. The method of claim 15, wherein the one or more variables comprise at least one of a text string to be located within the table or a text string to be written to a cell of the table.

17. The method of claim 11, further comprising:

extracting, by the system, content from the technology transfer document as content modules based on general parsing instructions defined in a content indexer and applicable to technology transfer documents from multiple different technology owners; and generating, by the system, another portion of the package model comprising a hierarchically structured organization of the content modules representing content sections of the technology transfer document.

18. A non-transitory computer-readable medium having stored thereon instructions that, in response to execution, cause a technology transfer system comprising a processor to perform operations, the operations comprising:

importing a technology transfer document associated with a technology owner, the technology transfer document comprising information describing a product to be manufactured and a manufacturing process for manufacturing the product;

extracting a table contained in the technology transfer document;

selecting a set of semantic rules, from multiple sets of semantic rules defined for respective different technology owners, corresponding to the technology owner;

extracting table data from the table in accordance with custom parsing instructions defined by the set of semantic rules; and generating at least a portion of a package model comprising a hierarchically structured organization of the table data organized based in part on the custom parsing instructions;

translating information about the manufacturing process contained in the package model to control configuration data; and exporting the control configuration data to an industrial device or system, wherein the exporting of the control configuration data configures the industrial device or system to execute a portion of the manufacturing process, wherein the custom parsing instructions are coded in a semantic rules file using a syntax that represents elements of the custom parsing instructions using codes of four characters or less, and the conversion component is configured to translate a string of the codes into a custom parsing instruction.

19. The non-transitory computer-readable medium of claim 18, wherein the codes comprise at least one of codes for logical operators; codes for identifying rows, columns, or cells of the table; codes for translation actions to be applied to the table or selected elements of the table; codes that indicate parent-child relationships between elements of the table data to be recorded in the package model; or codes for specifying a vertically merged cell or a horizontally merged cell within the table.

20. The non-transitory computer-readable medium of claim 18, wherein the codes comprise at least codes for translation actions to be applied to the table or selected elements of the table, and the translation actions comprise at least one of changing content of a cell of the table, copying content of a first cell of the table to a second cell of the table, deleting content of a cell of the table, dropping a row or column of the table, merging content of two cells into a single cell, moving a column or row of the table, renaming a column or row of the table, skipping a column or row of the table, or duplicating content of a merged cell into two component cells.

\* \* \* \* \*